(12) United States Patent
Payne et al.

(10) Patent No.: US 10,316,769 B2
(45) Date of Patent: *Jun. 11, 2019

(54) ALTERNATE FUELING SYSTEMS AND ASSOCIATED METHODS

(71) Applicant: IMMIXT, LLC, Siler City, NC (US)

(72) Inventors: Edward A. Payne, Greensboro, NC (US); Rodger Karl Williams, Siler City, NC (US)

(73) Assignee: IMMIXT, LLC, Siler City, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,038

(22) Filed: May 7, 2018

(65) Prior Publication Data

US 2018/0252173 A1 Sep. 6, 2018

Related U.S. Application Data

(63) Continuation of application No. 14/878,582, filed on Oct. 8, 2015, now Pat. No. 9,964,054.

(60) Provisional application No. 62/061,404, filed on Oct. 8, 2014, provisional application No. 62/061,395, filed on Oct. 8, 2014, provisional application No. 62/061,412, filed on Oct. 8, 2014.

(51) Int. Cl.

| F02D 19/00 | (2006.01) |
|---|---|
| F02D 41/00 | (2006.01) |
| F02D 19/08 | (2006.01) |
| F02D 19/06 | (2006.01) |
| F02D 29/02 | (2006.01) |

(52) U.S. Cl.
CPC ..... *F02D 41/0025* (2013.01); *F02D 19/0676* (2013.01); *F02D 19/0684* (2013.01); *F02D 19/0694* (2013.01); *F02D 19/081* (2013.01); *F02D 29/02* (2013.01); *Y02T 10/36* (2013.01)

(58) Field of Classification Search
CPC ............. F02D 41/0025; F02D 19/0676; F02D 19/0694; F02D 29/02
See application file for complete search history.

(56) References Cited

U.S. PATENT DOCUMENTS

| 2,911,958 A | 11/1959 | Griep |
|---|---|---|
| 3,912,543 A | 10/1975 | Delahunt |

(Continued)

FOREIGN PATENT DOCUMENTS

| DE | 4131626 A1 | 3/1993 |
|---|---|---|
| DE | 19823335 A1 | 12/1999 |

(Continued)

OTHER PUBLICATIONS

Author Unknown, "The Frybrid System," Frybrid Diesel/Vegetable Oil, available at http://www.frybrid.com/frybrid.htm, accessed Aug. 23, 2005, 2 pages.

(Continued)

*Primary Examiner* — Kevin A Lathers
(74) *Attorney, Agent, or Firm* — Withrow & Terranova, PLLC

(57) ABSTRACT

An alternative fueling system configured to consume alternative fuels by renewable identification number (RIN) assignment to enforce neat consumption; or moreover and more specifically, to utilize that RIN assignment whenever neat consumption is possible, thereby lessening usage constraints upon the remaining stock(s) of renewable fuel as an example, and/or to provide purging of the alternative fuel from the engine on shutdown.

19 Claims, 30 Drawing Sheets

(56) References Cited

U.S. PATENT DOCUMENTS

| | | |
|---|---|---|
| 4,323,046 A | 4/1982 | Barber |
| 4,345,141 A | 8/1982 | Little |
| 4,413,604 A | 11/1983 | Tune |
| 4,471,744 A | 9/1984 | Holtz |
| 4,572,133 A | 2/1986 | Bago |
| 4,712,516 A | 12/1987 | Eberhardt |
| 4,865,005 A | 9/1989 | Griffith |
| 4,964,376 A | 10/1990 | Veach et al. |
| 5,105,063 A | 4/1992 | Hockemier |
| 5,237,978 A | 8/1993 | Bailey |
| 5,245,953 A | 8/1993 | Shimada et al. |
| 5,271,370 A | 12/1993 | Shimada et al. |
| 5,336,396 A | 8/1994 | Shetley |
| 5,443,053 A | 8/1995 | Johnson |
| 5,450,832 A | 9/1995 | Graf |
| 5,469,830 A | 11/1995 | Gonzalez |
| 5,505,177 A | 4/1996 | Herdin et al. |
| 5,662,090 A | 9/1997 | Ward |
| 5,775,308 A | 7/1998 | Headley |
| 5,911,210 A | 6/1999 | Flach |
| 6,016,457 A | 1/2000 | Toukura et al. |
| 6,035,837 A | 3/2000 | Cohen et al. |
| 6,112,151 A | 8/2000 | Kruse |
| 6,145,494 A | 11/2000 | Klopp |
| 6,260,539 B1 | 7/2001 | Minowa et al. |
| 6,370,472 B1 | 4/2002 | Fosseen |
| 6,382,170 B1 | 5/2002 | Mang et al. |
| 6,494,192 B1 | 12/2002 | Capshaw et al. |
| 6,668,804 B2 | 12/2003 | Dobryden et al. |
| 6,687,597 B2 | 2/2004 | Sulatisky et al. |
| 6,698,387 B1 | 3/2004 | McFarland et al. |
| 6,839,619 B2 | 1/2005 | Bellinger |
| 6,957,542 B1 | 10/2005 | Kido et al. |
| 7,019,626 B1 | 3/2006 | Funk |
| 7,044,103 B2 | 5/2006 | May |
| 7,107,942 B2 | 9/2006 | Weissman et al. |
| 7,353,810 B1 | 4/2008 | Blaschke |
| 7,581,528 B2 | 9/2009 | Stein et al. |
| 7,640,913 B2 | 1/2010 | Blumberg et al. |
| 7,650,878 B2 | 1/2010 | Kleinberger |
| 7,721,720 B2 | 5/2010 | Payne et al. |
| 7,841,317 B2 | 11/2010 | Williams et al. |
| 7,913,664 B2 | 3/2011 | Williams et al. |
| 8,006,677 B2 | 8/2011 | Williams et al. |
| 8,256,401 B2 | 9/2012 | Payne et al. |
| 8,485,165 B2 | 7/2013 | Payne et al. |
| 8,640,678 B2 | 2/2014 | Payne et al. |
| 8,726,893 B2 | 5/2014 | Williams et al. |
| 8,893,691 B2 | 11/2014 | Payne et al. |
| 9,458,772 B2 | 10/2016 | Williams et al. |
| 2002/0011491 A1 | 1/2002 | Rosen et al. |
| 2002/0152999 A1 | 10/2002 | Holder et al. |
| 2005/0028791 A1 | 2/2005 | Niimi |
| 2005/0072384 A1 | 4/2005 | Hadley et al. |
| 2006/0081230 A1 | 4/2006 | Kangler |
| 2007/0062496 A1 | 3/2007 | Snower et al. |
| 2007/0119429 A1 | 5/2007 | Jacquay |
| 2008/0262701 A1 | 10/2008 | Williams et al. |
| 2013/0304360 A1 | 11/2013 | Payne et al. |
| 2016/0102618 A1 | 4/2016 | Payne et al. |

FOREIGN PATENT DOCUMENTS

| | | |
|---|---|---|
| DE | 19922748 A1 | 11/2000 |
| DE | 10217664 A1 | 11/2003 |
| EP | 1790839 A2 | 5/2007 |
| JP | 2003065094 A | 3/2003 |
| JP | 2004190935 A | 7/2004 |
| WO | 2006005930 A2 | 1/2006 |

OTHER PUBLICATIONS

Author Unknown, "Deluxe Greasecar Conversion Kit," Product Detail, Greasecar Vegetable Fuel Systems, available at http://greasecar.com/product_detail.cfm, accessed Aug. 23, 2005, 2 pages.

Advisory Action for U.S. Appl. No. 11/748,022, dated Nov. 29, 2011, 3 pages.

Non-Final Office Action for U.S. Appl. No. 11/748,022, dated Nov. 29, 2010, 7 pages.

Non-Final Office Action for U.S. Appl. No. 11/696,765, dated May 28, 2009, 9 pages.

Final Office Action for U.S. Appl. No. 11/346,052, dated Nov. 30, 2010, 7 pages.

Non-Final Office Action for U.S. Appl. No. 11/346,052, dated Apr. 28, 2010, 7 pages.

Non-Final Office Action for U.S. Appl. No. 11/346,052, dated Nov. 30, 2007, 5 pages.

Final Office Action for U.S. Appl. No. 11/346,052, dated Apr. 17, 2008, 6 pages.

Non-Final Office Action for U.S. Appl. No. 11/346,052, dated Apr. 10, 2007, 6 pages.

Notice of Allowance for U.S. Appl. No. 12/105,823, dated Aug. 6, 2010, 5 pages.

Non-Final Office Action for U.S. Appl. No. 12/105,823 dated Apr. 13, 2010, 4 pages.

Non-Final Office Action for U.S. Appl. No. 13/073,242 dated Dec. 4, 2012, 8 pages.

Non-final Office Action for U.S. Appl. No. 12/718,722 dated Dec. 20, 2012, 10 pages.

Notice of Allowance for U.S. Appl. No. 12/718,722 dated May 1, 2013, 8 pages.

Final Office Action for U.S. Appl. No. 13/073,242, dated Mar. 13, 2013, 6 pages.

Advisory Action for U.S. Appl. No. 13/073,242, dated May 16, 2013, 3 pages.

Non-Final Office Action for U.S. Appl. No. 13/073,242, dated Jul. 1, 2013, 9 pages.

Non-Final Office Action for U.S. Appl. No. 13/567,315, dated Jul. 23, 2013, 9 pages.

Non-Final Office Action for U.S. Appl. No. 13/942,057, dated Jan. 14, 2014, 6 pages.

Final Office Action for U.S. Appl. No. 13/942,057, dated Jul. 3, 2014, 7 pages.

Non-Final Office Action for U.S. Appl. No. 14/281,313, dated Jun. 18, 2015, 12 pages.

Notice of Allowance for U.S. Appl. No. 14/281,313, dated Jun. 2, 2016, 5 pages.

Non-Final Office Action for U.S. Appl. No. 14/878,582, dated Mar. 22, 2017, 4 pages.

Final Office Action for U.S. Appl. No. 14/878,582, dated Nov. 13, 2017, 6 pages.

Notice of Allowance for U.S. Appl. No. 14/878,582, dated Jan. 22, 2018, 8 pages.

ALTERNATE FUELING SYSTEMS AND ASSOCIATED METHODS

PRIORITY APPLICATIONS

The present application is a continuation of U.S. patent application Ser. No. 14/878,582 filed on Oct. 8, 2015 entitled "Alternative Fueling Systems and Associate Methods," issued as U.S. Pat. No. 9,964,054, to which the benefit of priority under 35 U.S.C. § 120 is hereby claimed; which claims the benefit of priority under 35 U.S.C. § 119 to U.S. Provisional Patent Application No. 62/061,404 filed on Oct. 8, 2014 entitled "Systems and Methods for RIN Management With RIN and $CO_2$ Reporting;" and which also claims priority under 35 U.S.C. § 119 to U.S. Provisional Patent Application No. 62/061,395 filed on Oct. 8, 2014 entitled "Fast Purging and Thermal Management;" and which also claims priority under 35 U.S.C. § 119 to U.S. Provisional Patent Application No. 62/061,412 filed on Oct. 8, 2014 entitled "Systems and Methods for Purging;" the contents of all of which are relied upon and incorporated herein by reference in their entirety.

FIELD OF THE DISCLOSURE

The present disclosure relates to fuel systems for internal combustion engines used in both fixed and vehicle applications, and more particularly to fuel systems that provide both primary fuel and alternate fuel to an internal combustion engine.

BACKGROUND

For a variety of reasons, most of which relate to environmental and alternative energy pursuits, certain primary fuel engines, such as diesel engines, can be made to accommodate alternate fuels, such as straight vegetable oil (SVO), "biodiesel," and other fuel oils (hereinafter "alternate fuels"). However, practical applications have demonstrated that some alternate fuels cannot be used in their pure or neat form under all engine and environmental conditions and must be blended with the primary fuel.

Recently, one method for the creation of motor fuels with alternate fuel content has been accomplished by blending primary and alternate fuels at or before the end user distribution point at low ratio to ameliorate alternate fuel negative attributes such as higher viscosity and the tendency to congeal at low temperatures, a common example being twenty percent alternate fuel to eighty percent primary fuel by volume. While this has benefit in allowing most engines designed to run on diesel to utilize a degree of alternate fuel, this methodology constrains the end user to a fixed ratio designed for worst-case utilization conditions, and in doing so effectively forfeits optimal utilization of the alternate fuel as actual end use conditions would otherwise permit.

To fulfill the requirements of introducing renewable fuel into the national fuel supply, the U.S. Environmental Protection Agency (EPA) Renewable Fuel Standard of 2007 (RFS1) was enacted under the Energy Policy Act of 2005, and amended in 2008 (RFS2), increasing the amount of renewable fuel mandated by the requirements; said renewable fuel to be blended with fossil fuel.

Traditionally, EPA Renewable Fuel Standard (hereinafter, "RFS") compliant blending is performed in large batches during the process of filling a mobile tanker delivery vehicle at a fuel distribution facility. Pursuant to the RFS, a fossil fuel feedstock and a renewable fuel feedstock are blended to produce a motor fuel for distribution and sale, those feedstocks most commonly being gasoline and anhydrous ethanol, or diesel and biodiesel, each being added using a metered delivery mechanism to a mobile tanker delivery vehicle to simultaneously obtain both a desired blend ratio and a desired total volume. This process is commonly referred to as "splash blending" and/or "rack blending"; splash being vernacular for the two fuel types being summarily dispensed into tanker vessel, being mixed by splash turbulence and/or innate miscibility; "rack" being vernacular for the tanker delivery vehicle filling apparatus.

Also pursuant to RFS, by the process of having blended the two feedstocks, a fungible value that is associated with the renewable fuel's Renewable Identification Number (hereinafter, "RIN") is "detached" in one bulk step, with the detached RINs then becoming available for sale, and once posted for sale, "retired". Obligated parties, those being fossil fuel producers or fossil fuel importers, are required to purchase retired RINs at market value; with supply, demand, and other market forces determining price.

It is important to understand that the assigned RIN, (at time of" writing) a 36-digit number comprising multiple fields, remains with the renewable fuel until combusted or otherwise consumed. More specifically, the first digit of the RIN, whose field is designated using the letter "K", has the value of "1" (one) when the fungible portion is attached, and becomes "2" (two) once the fungible portion is detached upon blending. Consequently, the RIN, with K=2, continues forward with the renewable fuel until combustion. Nevertheless, in industry vernacular, the fungible detached and/or retired component is also commonly referred to as a RIN.

While splash blending of fossil and renewable fuels prior to delivery is accepted and commonplace, limitations occur.

The RIN, once detached during splash blending, is no longer forward traceable to time and place of consumption; therefore there is no record of traceability that it was consumed in proper manner, that being its utilization as an offset displacing fossil fuel consumption.

Correspondingly, the RIN not being traceable to time and place of consumption, the associated $CO_2$ offset provided by the renewable fuel is furthermore not traceable to time and place of offset.

For gasoline and anhydrous ethanol, the maximum ratio of the anhydrous ethanol feedstock is limited by the tolerance of the general population of vehicles to anhydrous ethanol, it being corrosive to aluminum, other metals, and some polymers. Consequently, its blend ratio for general consumption (at the time of this writing) is limited to 10%.

For diesel and biodiesel, the maximum ratio of the biodiesel is limited by the tendency of biodiesel to cloud at temperatures common during winter, and when heated by virtue of constant circulation with a diesel engine's fuel system, its tendency to form corrosive acids. Consequently, its blend ratio for general consumption is generally limited to 5% during winter months, and 20% during summer months.

SUMMARY

In certain aspects disclosed herein, systems and methods are provided for monitoring consumption of alternative fuels in an alternative fueling system by RIN assignment to enforce neat consumption; or moreover and more specifically, to utilize that RIN assignment whenever neat consumption is possible, thereby lessening usage constraints upon the remaining stock(s) of renewable fuel as an example.

As the $CO_2$ offset capability of renewable fuels differs, and various regional and geographic jurisdictions may offer credits or other financial incentives thereby rendering $CO_2$ offsets fungible. Therefore, in other aspects disclosed herein include an alternative fueling system configured to select a RIN assignment for consumption from those RIN assignments available within vehicle's renewable storage inventory to maximum credits and/or incentives; more specifically, to dynamically suspend, select and/or re-select RIN assignments by algorithm for such purposes.

During product transfer of a renewable fuel from RFS recognized supplier to vehicle, often the assignment of (numerical creation) and reporting to the EPA of the assigned RIN is delayed, while consumption may be near-term, and moreover as the vehicle and supplier become geographically separate. Therefore, other aspects disclosed herein include an alternative fueling system configured to reconcile the RIN to associated dispense when actual assignment data later becomes available.

DETAILED DESCRIPTION

In certain aspects disclosed herein, systems and methods are provided for monitoring consumption of alternative fuels in an alternative fueling system by RIN assignment to enforce neat consumption; or moreover and more specifically, to utilize that RIN assignment whenever neat consumption is possible, thereby lessening usage constraints upon the remaining stock(s) of renewable fuel as an example.

As the $CO_2$ offset capability of renewable fuels differs, and various regional and geographic jurisdictions may offer credits or other financial incentives thereby rendering $CO_2$ offsets fungible. Therefore, in other aspects disclosed herein include an alternative fueling system configured to select a RIN assignment for consumption from those RIN assignments available within vehicle's renewable storage inventory to maximum credits and/or incentives; more specifically, to dynamically suspend, select and/or re-select RIN assignments by algorithm for such purposes.

During product transfer of a renewable fuel from RFS recognized supplier to vehicle, often the assignment of (numerical creation) and reporting to the EPA of the assigned RIN is delayed, while consumption may be near-term, and moreover as the vehicle and supplier become geographically separate. Therefore, other aspects disclosed herein include an alternative fueling system configured to reconcile the RIN to associated dispense when actual assignment data later becomes available.

Figure 1:
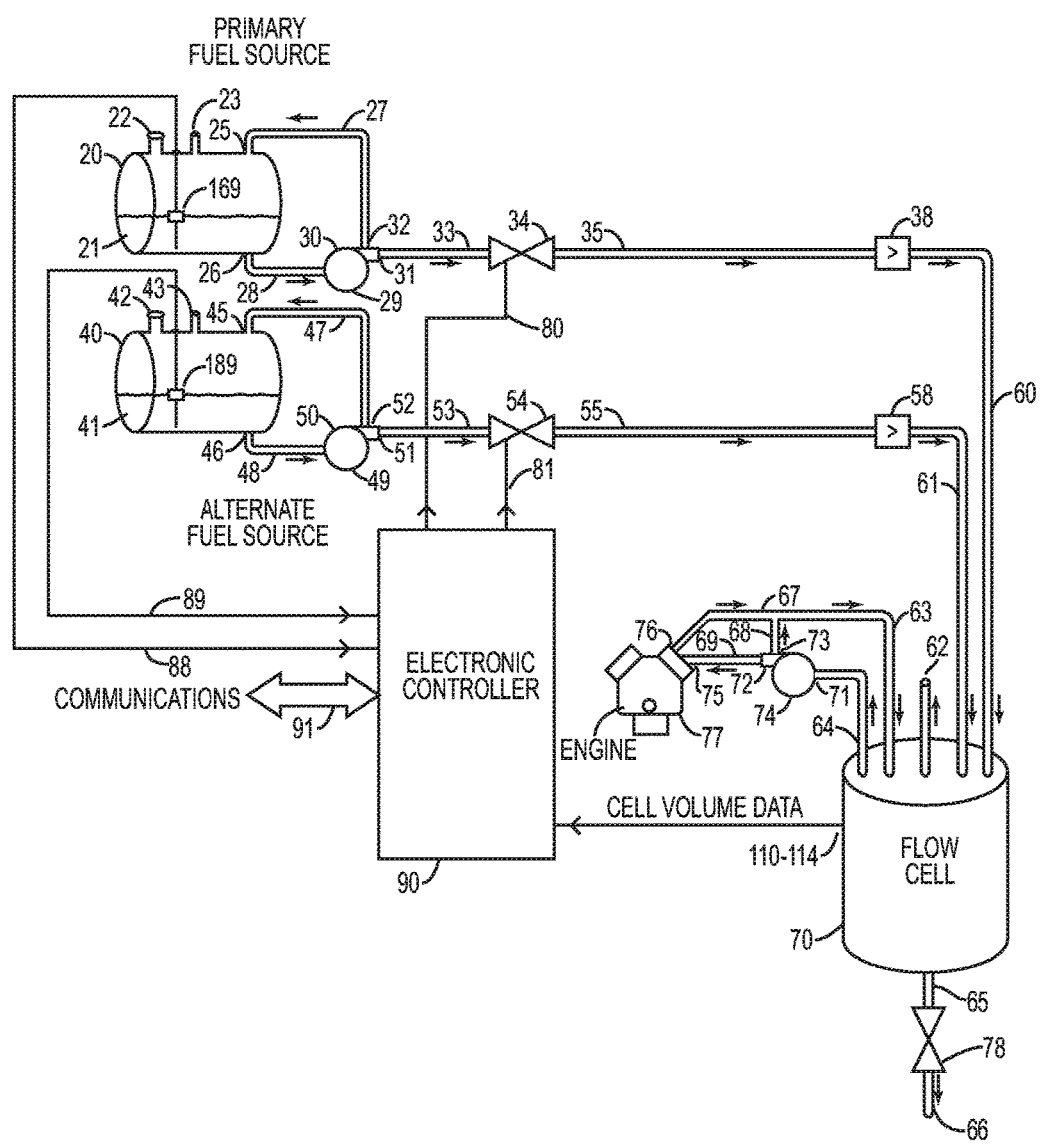
FIG. 1 is a schematic diagram of a blending system according to an embodiment of the present disclosure, the system shown ascertaining the volume of primary and alternate fuel consumed via metrics obtained from the primary and alternate fuel reservoirs.

Before discussing these particular aspects, examples of alternative fueling system are first discussed and described with regard to FIGS. 1-9. In this regard, FIG. 1 shows an exemplary fuel control system 1 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Primary fuel source 20 includes an outlet port 26.

Similarly, alternate fuel source 40 includes an outlet port 46.

Primary fuel source 20 may also include features common to fuel storage reservoirs, including but not limited to fill adapter 42, fuel bypass return port 25, and vent port 23 to permit the creation of ullage as primary fuel is consumed.

Similarly, alternate fuel source 40 may also include features common to fuel storage reservoirs, including but not limited to fill adapter 42, fuel bypass return port 45, and vent port 43 to permit the creation of ullage as alternate fuel is consumed.

Vent ports 23 and 43 may be vented to atmosphere. Alternately, vent ports 23 and 43 may be routed to an activated carbon canister, routed proximate to engine air intake for scavenge, and/or maintained at engine vacuum; these and other methods common to those skilled in the art being intended to mitigate vapor release into the atmosphere.

The fuel control system 1 depicted in FIG. 1 also includes electronic controller 90 that by internal algorithm and/or external command effects control of some elements of system 1, receives signals from other elements of system 1, and is further capable recording data into memory for later transmission or retrieval. Electronic controller 90 also includes communications interface 91 capable of communications and external interface. Electronics controller 90 may be self-contained, distributed, or function as a sub-element of a larger electronic controller. More specifics of electronic controller 90 will be enumerated with these teachings as it interacts with various elements of system 1.

The fuel control system 1 depicted in FIG. 1 also includes a primary fuel pump 29 whose inlet 30 is sourced from the primary fuel source supply outlet 26 via fuel transmission line 28. Primary fuel pump 29 may be of such type that during normal operation generates fuel bypass at its bypass outlet port 32, which, if and as required by pump type and bypass demand, is returned to the primary fuel source 20 at fuel bypass return port 25 via fuel return line 27. Outlet 31 of primary fuel pump 29 is connected to valve 34 via fuel transmission line 33, with the state of valve 34 being controlled by electronic controller 90, and therefore, effecting the status of primary fuel flow occurring as being transmitted into fuel transmission line 35.

Similarly, the fuel control system 1 depicted in FIG. 1 also includes an alternate fuel pump 49 whose inlet 50 is sourced from the primary fuel source supply outlet 46 via fuel transmission line 48. Alternate fuel pump 49 may likewise be of such type that during normal operation generates fuel bypass at its bypass outlet port 52, which, if and as required by pump type and bypass demand, is returned to the alternate fuel source 40 at bypass return port 45 via fuel return line 47. Outlet 51 of alternate fuel pump 49 is connected to valve 54 via fuel transmission line 53, with the state of valve 54 likewise controlled by electronic controller 90, and therefore, affecting the status of alternate fuel flow occurring as being transmitted into fuel transmission line 55.

Fuel transmission lines 35 and 55 may also contain check valves 38 and 58 respectively, desirable to prevent reverse flow due to gravity, siphoning or other causes; thus said check valves serving to prevent contamination of neat fuel types.

As will be discussed in more detail later within these teachings, the fuel control system 1 depicted in FIG. 1 also includes flow cell 70. Flow cell 70 by construct containing a volume, the volume therein sourced by primary fuel inlet line 60 and alternate fuel inlet line 61, whereupon any fuel sourced by inlet lines 60 and 61 being allowed to intermix within said volume.

Flow cell 70 also includes fuel outlet line 63 serving as fuel source for the engine, specifically the engine fuel control system, and in this embodiment doing so by sourcing engine fuel pump 74 inlet 71.

Engine fuel pump 74 may also produce bypass, in fact fuel pump 74 may be of multi-stage construction and thus produce bypass at a plurality of points, represented by bypass output port 73 as connected to fuel return line 68. Furthermore, the engine itself may produce bypass at one or more points, including but not limited to fuel injectors, control valves, and pressure relief ports, said bypass sources represented by bypass port 76 as connected to bypass fuel return line 67. While multiple fuel bypass return lines may be employed, in this embodiment bypass fuel return lines 67 and 68 are joined to form fuel return line 63.

To allow for the acceptance of prior mixed fuel as had occurred within the volume of flow cell 70 that was not combusted within engine 77 and instead returned as bypass, flow cell 70 also includes bypass fuel return line 63, thus flow cell 70 is rendered capable of re-accepting prior mixed fuel into said flow cell volume.

Importantly, this flow cell methodology eliminates the need to return bypassed fuel to one or both of primary fuel source 20 and/or alternate fuel source 40, thus preventing cross-contamination and therefore the preservation of neat fuel status and classification, as may be required for RIN extraction if blending, or compliance with of neat only usage restrictions if prescribed by RIN number or equivalent, other regulatory use restrictions, or user preference.

Importantly, this flow cell methodology and the elimination of returned bypassed fuel to one or both of primary fuel source 20 and/or alternate fuel source 40 allows for the separate and accurate metering of primary fuel 21 and secondary fuel 41, and the accurate determination of blend ratio at time of metering, as may be required for RIN extraction.

In effect, flow cell 70 serves as a surrogate fuel source for an engine designed to accept a single fuel supply source, providing both a source of fuel and the capability to accept bypass; however the volume within flow cell 70 is capable of selectively delivering either a primary fuel 21, an alternate fuel 41, or blend thereof.

Flow cell 70 also includes vent port 62 to allow for the free creation and removal of ullage within the volume of flow cell 70, and to maintain the volume within flow cell 70 at a lower pressure than fuel source and bypass sources to promote flow. Vent port 62 may be vented to atmosphere. Alternately, vent port 62 may be routed to an activated carbon canister, routed proximate to engine air intake for scavenge, and/or maintained at engine vacuum; these and other methods common to those skilled in the art being intended to mitigate vapor release into the atmosphere.

It should be noted that since the ullage within flow cell 70 is nominally maintained at atmospheric pressure or slight vacuum, and furthermore ideally at the same pressure as the ullage within primary fuel storage 20 and alternate fuel storage 40 via a common vent manifold, pumps 29 and 49, valves 45, 48, 54 and 58, and other common components likewise effectively work against slight vacuum, zero or minimal pressure differential, thus simplifying their design requirements, extending their useful life, and reducing system cost.

Flow cell 70 also includes at least one sensor indicating liquid volume contained therein and/or volume rate of change, represented by signal lines 110 through 114, which transmit this data to electronic controller 90 such that electronic controller 90 may by controlling valves 34 and 54 maintain a sufficient volume of fuel within flow cell 70 for both instantaneous and sustained engine demand.

Referring back to primary fuel source 20 within fuel control system 1 depicted in FIG. 1, primary fuel source 20 also includes a fuel volume measurement device 169 whose function is to measure the volume of primary fuel 21 as communicated to electronic controller 90 via signal line 88. Primary fuel volume measurement device 169 may any device suitable for direct or inferential volume measurement, including but not limited to float, Archimedes principal, mass of fuel, or tare mass of fuel and storage vessel combined. Primary fuel volume measurement device 169 may be continuous in its measurement, or quantized. Primary fuel volume measurement device 169 may also provide linear and/or digital output via signal line 88.

Similarly, Referring back to alternate fuel source 40 within fuel control system 1 depicted in FIG. 1, alternate fuel source 40 also includes a fuel volume measurement device 189 whose function is to measure the volume of alternate fuel 41 as communicated to electronic controller 90 via signal line 89. Alternate fuel volume measurement device 189 may any device suitable for direct or inferential volume measurement, including but not limited to float, Archimedes principal, mass of fuel, or tare mass of fuel and storage vessel combined. Alternate fuel volume measurement device 189 may be continuous in its measurement, or quantized. Alternate fuel volume measurement device 189 may also provide linear and/or digital output via signal line 89.

Within the embodiment of fuel control system 1 depicted in FIG. 1, electronic controller 90 utilizes volume data derived from primary fuel measurement device 169 and alternate fuel measurement device 189 to both perform blending of primary fuel 21 and alternate fuel 41 according to a desired ratio, and also extraction of one or more financial incentives in the form of RINs and/or determination of other financial incentives, such as tax credits and/or subsidies, as allowed and as applicable. Blend ratios enforced by the electronic controller 90 may be based on what is the most cost effective (i.e. lowest cost) fuel to be consumed by the engine. For example, it may be more cost effective to use alternate fuel based on not only the cost of the alternate fuel, but any financial incentives that may be available for use of alternate fuel. Primary fuel may still be blended with the alternate fuel if required to receive such financial incentives. Alternatively, primary fuel may be more cost effective to run the engine even in light of the financial incentives. Certain jurisdictions may still require use of some alternate fuel along with primary fuel even if the primary fuel is most cost effective. In summary, the electronic controller 90 can perform these calculations and enforce the desired blend ratio according to these parameters.

Also, if RINs are available for use of the alternate fuel, the electronic controller 90 may receive RIN information regarding the alternate fuel delivered to the alternate fuel storage 40 in the form of one or more RINs if the RINs have not been previously extracted. Such communication may be wired or wireless, and may come from an external system. A separate RIN may be available for each increment of alternate fuel delivered, such as for every gallon for example. The electronic controller 90 may control delivery of the primary and/or alternate fuel based on the RIN information. For example, if the RINs have already been extracted, the electronic controller 90 may operate in "neat" mode such that no blending of the primary fuel and alternate fuel is performed. Only primary or alternate fuel would be delivered to the flow cell 70. If RINs have not been extracted, RIN-based incentives may be available for blending alternate fuel with primary fuel for use by the engine. The RINs would be extracted by the electronic controller 90 as blending occurs.

As an example, if the usable volume within flow cell 70 is designed to be 100 milliliters and a blend ratio of 30 percent primary fuel and 70 percent alternate fuel is desired, electronic controller 90 would establish flow of primary fuel by enabling valve 34 until measurement device 169 indicated 30 milliliters had been dispensed into flow cell 70, at which time valve 34 would be disabled. Similarly, electronic controller 90 would establish flow of alternate fuel by enabling valve 54 until measurement device 189 indicated 70 milliliters had been dispensed into flow cell 70, at which time valve 54 would be disabled. As fuel is consumed by engine 77 and the volume of blended fuel within flow cell 70 becomes depleted, at a specified threshold of depletion the above process would repeat, with the depleted volume being replaced again according to ratio. As one example, if 50 milliliters is required to replenish the fuel volume within flow cell 70, electronic controller 90 would establish flow of primary fuel by enabling valve 34 until measurement device 169 indicated 15 milliliters had been dispensed into flow cell 70, at which time valve 34 would be disabled. Similarly, electronic controller 90 would establish flow of alternate fuel by enabling valve 54 until measurement device 189 indicated 35 milliliters had been dispensed into flow cell 70, at which time valve 54 would be disabled. And so on. Furthermore, during each blend operation, the volume of primary fuel 21 and alternate fuel 41 and the ratio at which the blend occurred may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data useful for extraction of RINs and/or determination of tax credits and/or subsidies, as allowed and as applicable.

With separate volume measurement devices available, specifically measurement device 169 determining volume of primary fuel 21 and measurement device 189 determining volume of alternate fuel 41, there is nothing to prohibit electronic controller 90 dispensing primary fuel 21 and alternate fuel 41 into the flow cell 70 simultaneously, or in any sequence of partial or full dispense operations.

Likewise, while electronic controller effected the blending of primary fuel 21 with alternate fuel 41 in the prior examples, there is nothing to prohibit electronic controller 90 from maintaining a reservoir volume of either primary fuel 21 or alternate fuel 41 within flow cell 70 in neat form. In this case, electronic controller 90 would be selecting operation between primary fuel 21 or alternate fuel 41, and therefore not performing a blending function. Similarly, during neat fuel selection operation, the volume of primary fuel 21 and alternate fuel 41 may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data, said blend being 0:100% or 100:0% in this case, useful for extraction of RINs and/or determination of tax credits and/or subsidies, as allowed and as applicable, and also for verification that neat utilization had in fact occurred, if and as prescribed.

Figure 2:
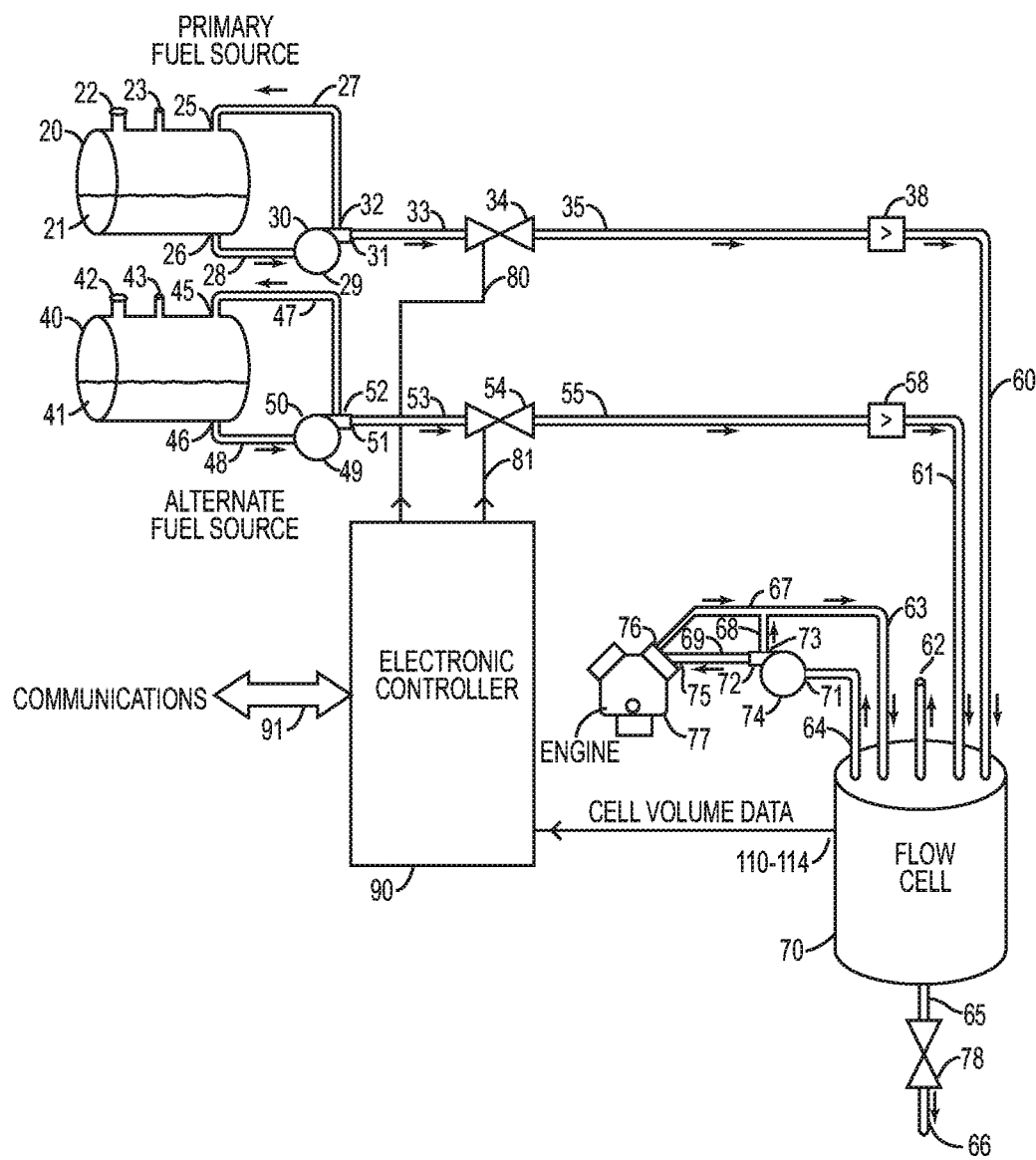
FIG. 2 is a schematic diagram of a blending system according to an embodiment of the present disclosure, the system shown ascertaining the volume of primary and alternate fuel consumed via metrics obtained at the flow cell.

Referring now to the drawings and, in particular, to FIG. 2, there is shown a fuel control system 2 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 2 depicted in FIG. 2 inherits identical elements and corresponding functional descriptions as fuel control system 1 depicted in FIG. 1, with like numbers referring to like elements throughout.

The fuel control system 2 depicted in FIG. 2 differs from fuel control system 1 depicted in FIG. 1 in that primary fuel 21 volume measurement device 169 and alternate fuel 41 volume measurement device 189 as elements of fuel control system 1 depicted in FIG. 1 have been deleted in fuel control system 2 depicted in FIG. 2. Furthermore, volume measurement data as was provided by primary fuel 21 volume measurement device 169 and alternate fuel 41 volume measurement device 189 fuel control system 1 depicted in FIG. 1 have been replaced by volume measurement within flow cell 70 in fuel control system 2 depicted in FIG. 2. This substitution becomes possible as the rate of fuel being consumed by engine 77, and therefore being withdrawn as volume from flow cell 70, is much less that the rate by which primary fuel 21 and alternate fuel 41 may be dispensed into flow cell 70, thereby minimizing error. Furthermore, under steady state operating conditions, the amount of withdrawal by engine 77 may be calculated, and therefore may optionally be compensated.

Within the embodiment of fuel control system 2 depicted in FIG. 2, electronic controller 90 utilizes volume data derived from flow cell 70 volume measurement device as communicated by signal lines 110-114 to both perform blending of primary fuel 21 and alternate fuel 41 according to a desired ratio, and also extraction of RINs and/or determination of tax credits and/or subsidies, as allowed and as applicable. As an example, if the usable volume within flow cell 70 is designed to be 100 milliliters and a blend ratio of 30 percent primary fuel and 70 percent alternate fuel is desired, electronic controller 90 would establish flow of primary fuel by enabling valve 34 until flow cell 70 volume signal lines 110-114 indicated 30 milliliters had been dispensed into flow cell 70, at which time valve 34 would be disabled. Similarly, electronic controller 90 would establish flow of alternate fuel by enabling valve 54 until flow cell 70 volume signal lines 110-114 indicated 70 milliliters had been dispensed into flow cell 70, at which time valve 54 would be disabled. As fuel is consumed by engine 77 and the volume of blended fuel within flow cell 70 becomes depleted, at a specified threshold of depletion the above process would repeat, with the requite volume being replaced according to ratio. As one example, if 50 milliliters is required to replenish the fuel volume within flow cell 70, electronic controller 90 would establish flow of primary fuel by enabling valve 34 until flow cell 70 cell volume signal lines 110-114 indicated 15 milliliters had been dispensed into flow cell 70, at which time valve 34 would be disabled. Similarly, electronic controller 90 would establish flow of alternate fuel by enabling valve 54 until flow cell 70 cell volume signal lines 110-114 indicated 35 milliliters had been dispensed into flow cell 70, at which time valve 54 would be disabled. And so on. Furthermore, during each blend operation, the volume of primary fuel 21 and alternate fuel 41 and the ratio at which the blend occurred may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data useful for extraction of RINs and/or determination of tax credits and/or subsidies, as allowed and as applicable.

With a single volume measurement point serving for both primary fuel 21 and alternate fuel 41 present within this embodiment, specifically measurement derived from flow cell 70 cell volume signal lines 110-114, primary fuel 21 and alternate fuel 41 must be dispensed into flow cell 70 as separate operations, however there is nothing to prohibit electronic controller 90 dispensing primary fuel 21 and alternate fuel 41 into the flow cell 70 in any sequence of partial or full dispense operations.

Likewise, while electronic controller 90 effected the blending of primary fuel 21 with alternate fuel 41 in the prior examples, there is nothing to prohibit electronic controller 90 from maintaining a reservoir volume of either primary fuel 21 or alternate fuel 41 within flow cell 70 in neat form. In this case, electronic controller 90 would be selecting operation between primary fuel 21 or alternate fuel 41, and therefore not performing a blending function. Similarly, during neat fuel selection operation, the volume of primary fuel 21 and alternate fuel 41 may be recorded by electronic controller 90 for later transmission or retrieval, or may be immediately transmitted by communications methods to an external system by electronic controller 90, said volume data useful for extraction of RINs and and/or determination of tax credits and/or subsidies, as allowed and as applicable, and also for verification that neat utilization had in fact occurred, if and as prescribed.

At this point in these teachings, both fuel control system 1 depicted in FIG. 1 and fuel control system 2 depicted in FIG. 2 have utilized volume measurement methods derived from storage vessel and/or intermediate storage vessel volume sensing, specifically primary fuel 21 volume measurement device 169 and alternate fuel 41 volume measurement device 189 and/or measurement derived from flow cell 70 cell volume signal lines 110-114. While being desirable embodiments in that primary fuel 21 volume measurement device 169 and alternate fuel 41 volume measurement device 189 would nominally preexist to provide on-hand fuel volume indication to the system user, further useful to provide the capability for electronic controller 90 to automatically select the remaining fuel type should one fuel type become depleted, and that mathematical and statistical methods exist to those familiar with the art to obtain precise measurements, and/or likewise that flow cell 70 cell volume signal lines 110-114 preexist to allow electronic controller 90 the ability to maintain a sufficient reservoir of fuel within flow cell 70 and that mathematical and statistical methods similarly exist to those familiar with the art to obtain precise measurement, nevertheless such embodiments constrain themselves best to stationary operation. If employed on a vehicle, inertial forces imposed on the liquid fuels complicate accurate measurement for use in controlling blend ratio and the extraction of RINs and/or determination of tax credits and/or subsidies, especially where specific and verifiable calibration standards may be imposed, whereby the system may further require seal by various governmental weights and measures entities, may require tamper resistance, and/or may require tamper evidence. Therefore, a more preferred set of embodiments are also taught.

Figure 3:
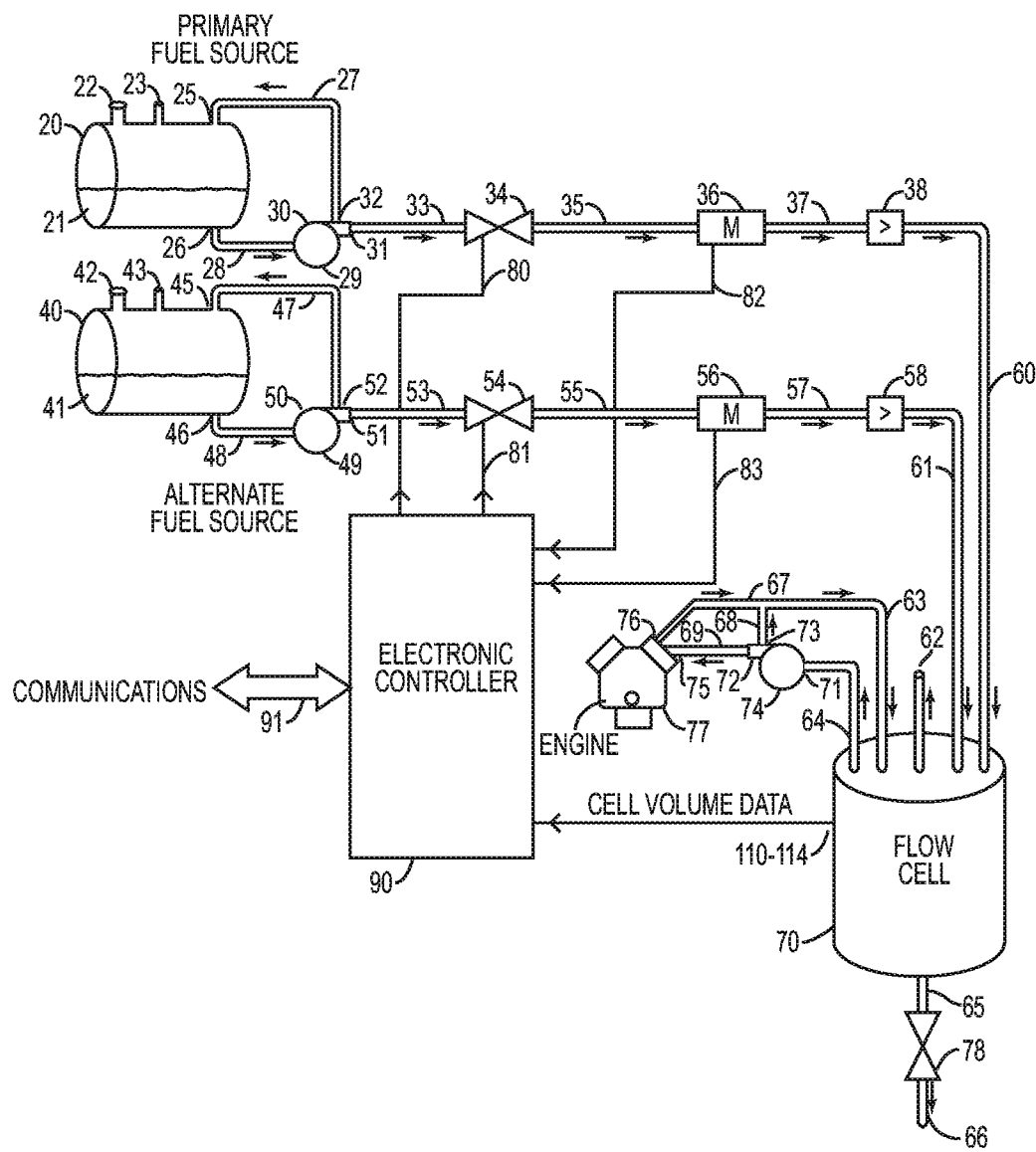
FIG. 3 is a schematic diagram of a blending system according to an embodiment of the present disclosure, the system shown ascertaining the volume of primary and alternate fuel consumed via metrics obtained by metering devices.

Referring now to the drawings and, in particular, to FIG. 3, there is shown a fuel control system 3 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 3 depicted in FIG. 3 inherits identical elements and corresponding functional descriptions as fuel control system 1 depicted in FIG. 1, with like numbers referring to like elements throughout.

The control system 3 depicted in FIG. 3 differs from fuel control system 1 depicted in FIG. 1 in that primary fuel 21 volume measurement device 169 and alternate fuel 41 volume measurement device 189 as elements of fuel control system 1 depicted in FIG. 1 have been deleted in control system 3 depicted in FIG. 3. Furthermore, the function of volume measurements as originally provided by primary fuel 21 volume measurement device 169 and alternate fuel 41 volume measurement device 189 in fuel control system 1 depicted in FIG. 1 have been respectively replaced by primary fuel volume measurement device 36 and alternate fuel measurement device 56 in control system 3 depicted in FIG. 3.

Volume measurement devices 36 and 56 may be of a broad construct of possible metering devices including but not limited to positive displacement in nature such as piston, screw, roots or gear, and/or metering devices inferential in nature such as turbine, pressure differential, thermal, or stagnation against an element. Furthermore, while volume measurement is being sought, there is nothing to prevent the utilization of metering devices that instead measure flow rate by nature, said flow rate being converted into volume by the inclusion of time by electronic controller 90, or by the metering device itself.

Volume measurement devices 36 and 56 may be made capable to accept calibration to defined or prescribed standards, or be of such fixed or stable nature by construct such that their characteristics may be classified against defined or prescribed standards. Furthermore, electronic controller 90 may be made programmable to accept said calibration and/or characteristic data pertaining to devices 36 and 56, and therefore able to include said calibration and/or characteristic data within internal calculations to establish a known and verifiable accuracy in compliance with defined or prescribed standards.

Volume measurement devices 36 and 56 may be of such construct as to be sealed once calibrated and/or characterized. Volume measurement devices 36 and 56 may further be of such construct as to resist tampering, display evidence of tampering, cease function and/or signal occurrence if tampered.

Electronic controller 90 may be of such construct as to be sealed once programmed with calibration and/or characterization data. Electronic controller 90 may further be of such construct as to resist tampering, display evidence of tampering, cease function and/or signal occurrence if tampered.

Referring back to primary fuel source 20 within fuel control system 3 depicted in FIG. 3, primary fuel source 20 also includes within downstream path pump 29 to promote flow, valve 34 to control flow, and a fuel volume measurement device 36 whose function is to measure the volume of primary fuel 21 transferred from primary fuel source 40 to flow cell 70 and communicate this volume to electronic controller 90 via signal line 82.

Similarly, Referring back to alternate fuel source 40 within fuel control system 3 depicted in FIG. 3, primary fuel source 40 also includes within downstream path pump 49 to promote flow, valve 54 to control flow, and a fuel volume measurement device 56 whose function is to measure the volume of alternate fuel 41 transferred from alternate fuel source 40 to flow cell 70 and communicate this volume to electronic controller 90 via signal line 83.

Within the embodiment of fuel control system 1 depicted in FIG. 1, electronic controller 90 utilizes volume data derived from primary fuel measurement device 36 via signal line 82 and alternate fuel measurement device 56 via signal line 83 to perform blending of primary fuel 21 and alternate fuel 22 according to a desired ratio, and also extraction of RINs and/or determination of tax credits and/or subsidies, as allowed and as applicable. As an example, if the usable volume within flow cell 70 is designed to be 100 milliliters and a blend ratio of 30 percent primary fuel and 70 percent alternate fuel is desired, electronic controller 90 would establish flow of primary fuel by enabling valve 34 via control line 80 until measurement device 36 indicated 30 milliliters had been dispensed into flow cell 70, at which time valve 34 would be disabled via control line 80. Similarly, electronic controller 90 would establish flow of alternate fuel by enabling valve 54 via control line 81 until measurement device 56 indicated 70 milliliters had been dispensed into flow cell 70, at which time valve 54 would be disabled via control line 81. As fuel is consumed by engine 77 and the volume of blended fuel within flow cell 70 becomes depleted, at a specified threshold of depletion the above process would repeat, with the requisite volume being replaced according to ratio. As one example, if 50 milliliters is required to replenish the fuel volume within flow cell 70, electronic controller 90 would establish flow of primary fuel by enabling valve 34 via control line 80 until measurement device 36 indicated 15 milliliters had been dispensed into flow cell 70, at which time valve 34 would be disabled via control line 80. Similarly, electronic controller 90 would establish flow of alternate fuel by enabling valve 54 via control line 81 until measurement device 189 indicated 35 milliliters had been dispensed into flow cell 70, at which time valve 54 would be disabled via control line 81. And so on. Furthermore, during each blend operation, the volume of primary fuel 21 and alternate fuel 41 and the ratio at which the blend occurred may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data useful for extraction of RINs and/or determination of tax credits and/or subsidies, as allowed and as applicable.

With separate volume measurement devices available, specifically measurement device 36 determining volume of primary fuel 21 and measurement device 56 determining volume of alternate fuel 41, there is nothing to prohibit electronic controller 90 dispensing primary fuel 21 and alternate fuel 41 into the flow cell 70 simultaneously, or in any sequence of partial or full dispense operations.

Likewise, while electronic controller effected the blending of primary fuel 21 with alternate fuel 41 in the prior examples, there is nothing to prohibit electronic controller 90 from maintaining a reservoir volume of either primary fuel 21 or alternate fuel 41 within flow cell 70 in neat form. In this case, electronic controller 90 would be selecting operation between primary fuel 21 or alternate fuel 41, and therefore not performing a blending function. Similarly, during neat fuel selection operation, the volume of primary fuel 21 and alternate fuel 41 may be recorded by electronic controller 90 for later transmission or retrieval, or by predetermined time, elapsed time interval, or accumulation of data may be immediately transmitted by communications methods to an external system or communications network, wired or wireless, by electronic controller 90, said volume and blend data, said blend being 0:100% or 100:0% in this case, useful for extraction of RINs and/or determination of tax credits and/or subsidies, as allowed and as applicable, and also for verification that neat utilization had in fact occurred, if and as prescribed.

Within the embodiments prior described, certain elements may be easily combined and will be described for completeness. The combined element embodiments that follow should not be construed as limited to the embodiments set forth herein; rather, these embodiments are provided so that this disclosure will satisfy applicable legal requirements.

Figure 4:
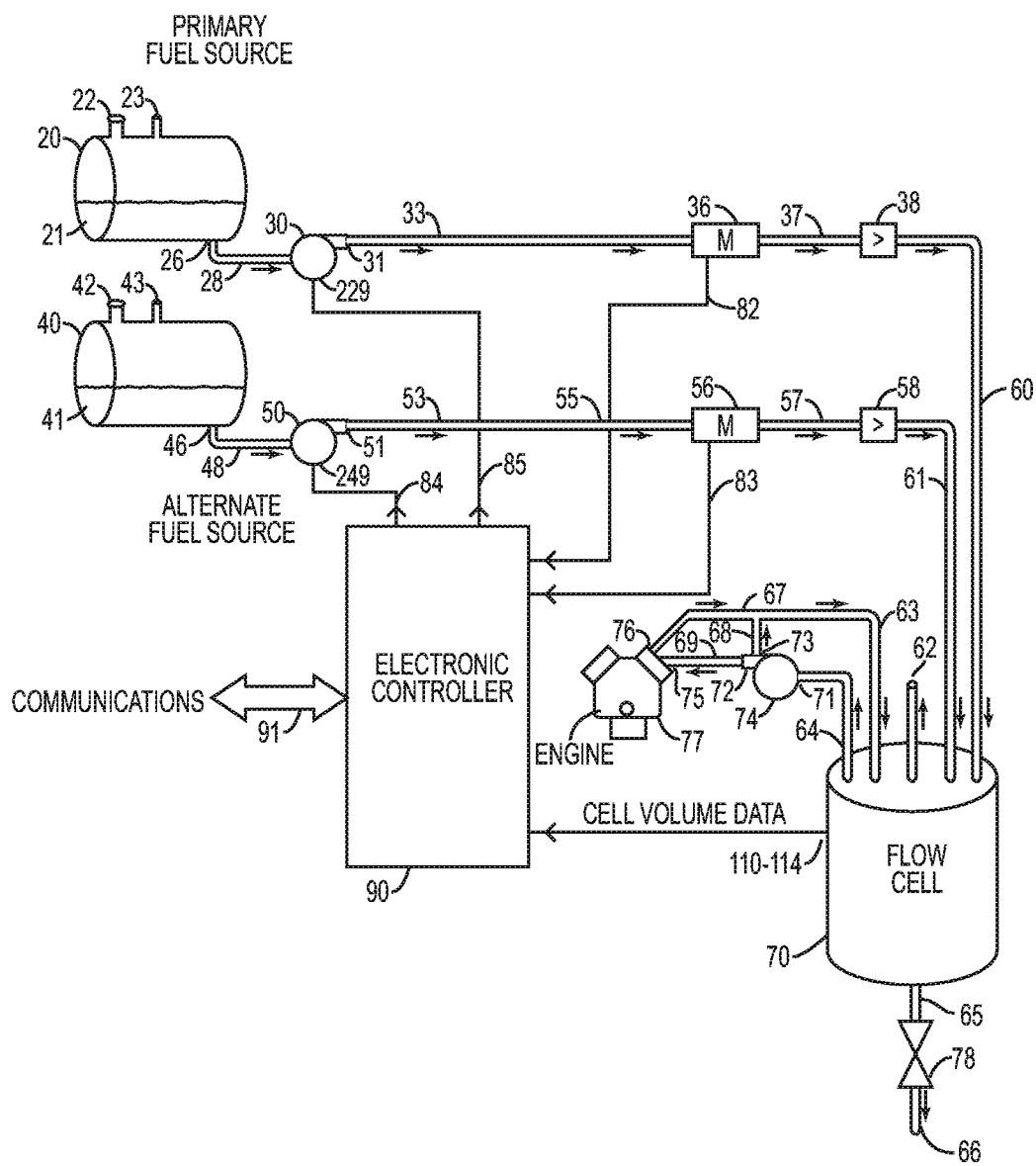
FIG. 4 is a schematic diagram of a blending system according to an embodiment of the present disclosure, the system depicting the possible elimination of the valve devices by utilization of a positive displacement pumps.

Referring now to the drawings and, in particular, to FIG. 4, there is shown a fuel control system 4 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 4 depicted in FIG. 4 inherits identical elements and corresponding functional descriptions as fuel control system 3 depicted in FIG. 3, with like numbers referring to like elements throughout.

The control system 4 depicted in FIG. 4 differs from fuel control system 3 depicted in FIG. 3 in that primary fuel pump 29, primary fuel valve 34, alternate fuel pump 49 and alternate fuel valve 54 elements of fuel control system 3 depicted in FIG. 3 have been deleted in control system 4 depicted in FIG. 4 and replaced in function by primary fuel pump 229 and alternate fuel pump 249 in system 4 depicted in FIG. 4, each pump now serving both pump and flow control functions.

Primary fuel pump 229 and alternate fuel pump 249 in system 4 depicted in FIG. 4 are of a positive displacement construct, and are further prohibited from being free-running, and instead are controlled by electronic controller 90 via control lines 85 and 84, respectively. Whereas system 3 depicted in FIG. 3 exercised control of primary fuel valve 34 and alternate fuel valve 54 to permit or prohibit flow of the respective fuel types, system 4 depicted in FIG. 4 exercises control of primary pump 229 and alternate fuel pump 249 to induce or prohibit flow, and therefore achieve the same function.

Figure 5:
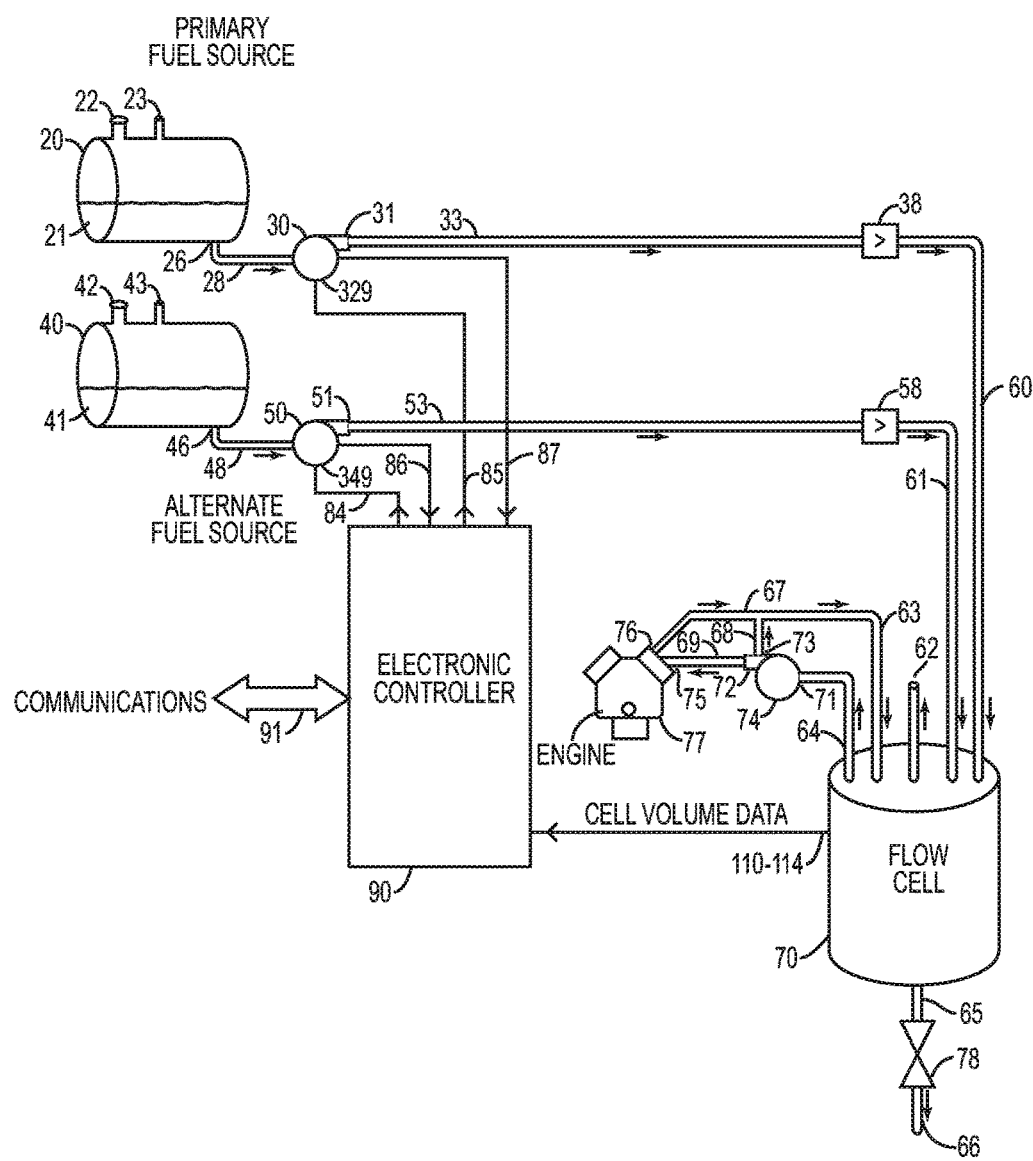
FIG. 5 is a schematic diagram of a blending system according to an embodiment of the present disclosure, the system depicting the possible elimination of the valve and metering devices by utilization of a positive displacement pump providing encoded control and/or feedback.

Referring now to the drawings and, in particular, to FIG. 5, there is shown a fuel control system 5 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 5 depicted in FIG. 5 inherits identical elements and corresponding functional descriptions as fuel control system 4 depicted in FIG. 4, with like numbers referring to like elements throughout.

The control system 5 depicted in FIG. 5 differs from fuel control system 4 depicted in FIG. 4 in that primary fuel pump 229, primary fuel measurement device 36, alternate fuel pump 249 and alternate fuel measurement device 56 have been deleted in control system 5 depicted in FIG. 5 and respectively replaced in function by primary fuel pump 329 and alternate fuel pump 349 in system 5 depicted in FIG. 5, each pump now serving pumping, flow control and volume metering functions.

Primary fuel pump 329 and alternate fuel pump 349 in system 5 depicted in FIG. 5 are of a positive displacement construct, are prohibited from being free-running and controlled by electronic controller 90 via control lines 85 and 84, respectively. Primary fuel pump 329 and alternate fuel pump 349 further are of such construct that the volume transmitted is encoded and returned via signal lines 87 and 86 respectively to electronic controller 90. Primary fuel pumps 329 and alternate fuel pump 349 may further be of such construct as the motor or prime moving device is controllable in burst or discrete step by electronic controller 90 via control lines 85 and 84 respectively, with said burst or discrete step representing a known volume.

Returning now to a preferred embodiment, in particular, to control system 3 depicted in FIG. 3, where specific and verifiable calibration standards may be imposed or prescribed, where the system may require seal by various governmental weights and measures entities, may require tamper resistance, reveal tamper attempt, and/or response to tamper attempt, it becomes desirable to utilize discrete and separate volume measurement devices, and several such embodiments follow that expand upon control system 3 depicted in FIG. 3. The embodiments that follow should not be construed as limited to the embodiments set forth herein; rather, these embodiments are provided so that this disclosure will satisfy applicable legal requirements.

Figure 6:
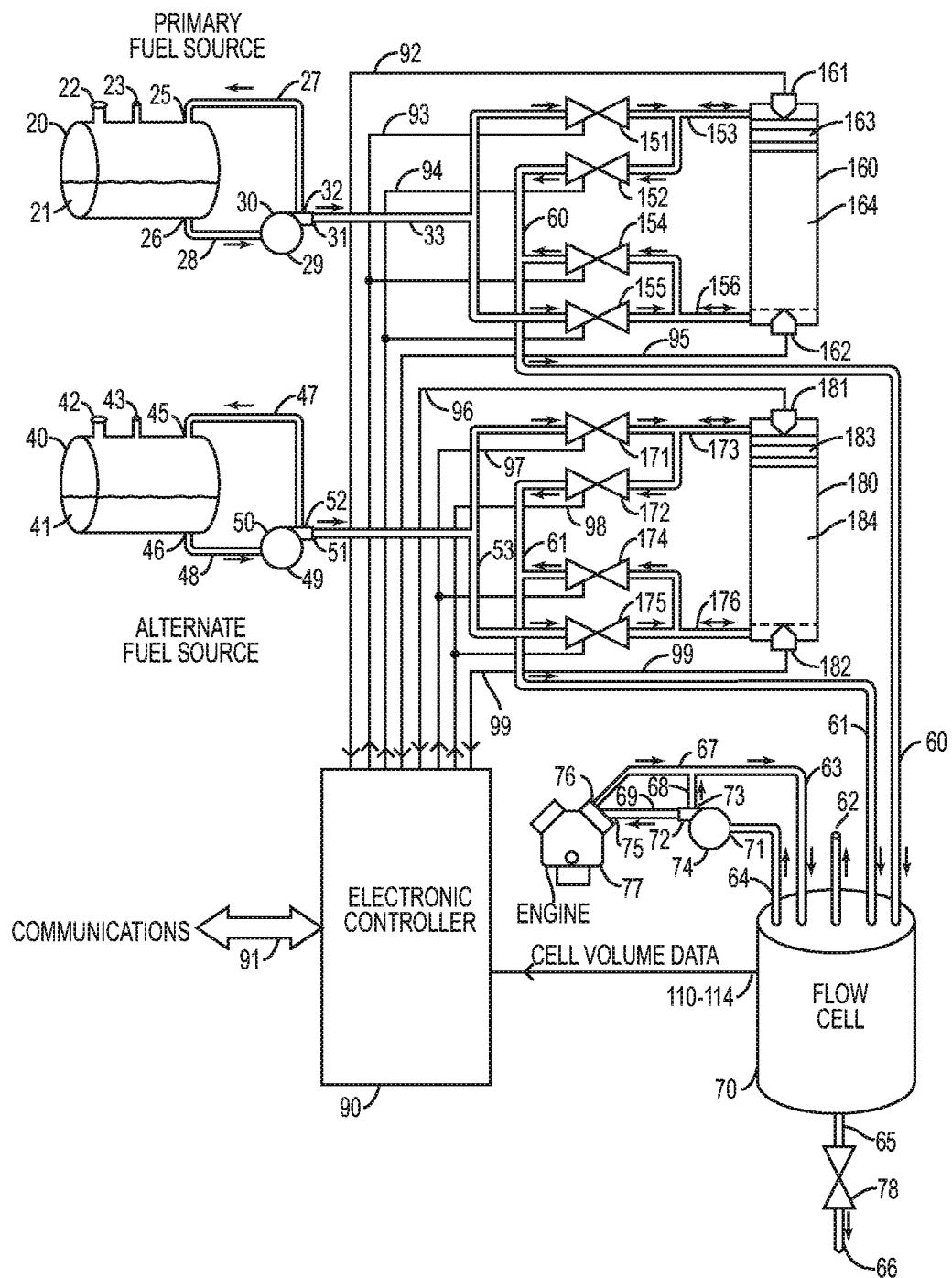
FIG. 6 is a schematic diagram of a blending system according to an embodiment of the present disclosure, the system shown ascertaining the volume of primary and alternate fuel consumed via metrics obtained by cylinders of known volume as controlled by discrete valves.

Referring now to the drawings and, in particular, to FIG. 6, there is shown a fuel control system 6 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 6 depicted in FIG. 6 inherits identical elements and corresponding functional descriptions as fuel control system 3 depicted in FIG. 3, with like numbers referring to like elements throughout.

The control system 6 depicted in FIG. 6 differs from fuel control system 3 depicted in FIG. 3 in that primary fuel valve 34, primary volume measurement device 36 and primary fuel check valve 38 of fuel control system 3 depicted in FIG. 3 have been deleted in control system 6 depicted in FIG. 6 and replaced in function by primary fuel control valves 151, 152, 154 and 155, cylinder 160 piston 163 assembly, sensor 161 and sensor 162, said primary fuel control valves 151, 152, 154 and 155, cylinder 160 piston 163 assembly, sensor 161 and sensor 162 in system 6 depicted in FIG. 6 now serving flow control, volume measurement and check valve functions.

Similarly, control system 6 depicted in FIG. 6 differs from fuel control system 3 depicted in FIG. 3 in that alternate fuel valve 54, alternate volume measurement device 56 and alternate fuel check valve 58 of fuel control system 3 depicted in FIG. 3 have been deleted in control system 6 depicted in FIG. 6 and replaced in function by alternate fuel control valves 171, 172, 174 and 175, cylinder 180 piston 183 assembly, sensor 181 and sensor 182, said alternate fuel control valves 171, 172, 174 and 175, cylinder 180 piston 183 assembly, sensor 181 and sensor 182 in system 6 depicted in FIG. 6 now serving flow control, volume measurement and check valve functions.

Within the embodiment in control system 6 depicted in FIG. 6, measurement of primary fuel volume is effected by allowing piston 163 to cyclically transverse within a constrained length of cylinder 160, said length being defined as the distance traversed by piston 163 between contact with sensor 161 and sensor 162 occurring at each cycle extremity, said volume being the three dimensional volume traversed during said length less the volume occupied by piston 163, with electronic controller 90 counting said occurrences of contact with sensor 161 via signal line 92 and/or 163 via signal line 95 and multiplying the count of said sensor contact occurrences to obtain the total volume of primary fuel measured. Also, upon each occurrence of sensor contact, electronic controller 90 further effects control of valves 151, 152, 154 and 155 via valve control signal lines 93 and 94 in a manner to reverse the travel of piston 163 as appropriate and thus effect cycling. For example, with piston 163 starting in contact with sensor 161 and electronic controller 90 having determined the requirement that a volume of primary fuel 21 be dispensed into flow cell 70, electronic controller 90 enables valve control signal line 93 to open valves 151 and 154, and disables control signal line 94, if prior enabled, to close valves 152 and 155, thus allowing the piston to move from the direction of sensor 161 toward the direction of sensor 162, the piston being driven under force of primary fuel pressure present within connecting manifold fuel line 33, effecting flow through valve 151 and connecting manifold fuel line 153, said force thereby transmitted to piston 163 effecting motion of piston 163. The said motion of piston 163 expels the quantity of entrained fuel prior existing on the opposite side of piston 163 via manifold fuel line 156, valve 154, and to flow cell 70 via fuel inlet line 60 while simultaneously entraining new primary fuel on its driven side as piston 163 travels from its initial contact with sensor 161 until such time sensor 162 becomes contacted. At such time of contact with sensor 162 as conveyed to electronic controller 90 via signal line 95, if electronic controller 90 requires additional quanta of primary fuel be dispensed into flow cell 70, valve control signal line 93 is disabled by electronic controller 90 to close valves 151 and 154, and valve control signal line 94 is enabled to open valves 152 and 155, thus allowing the piston to move from the direction of sensor 162 toward sensor 161, and the cycle is repeated. And so on. If, however, electronic controller 90 requires that no additional quanta of primary fuel be dispensed into flow cell 70, valve control signal lines 93 and 94 are disabled, closing valves 151, 152, 154 and 155, and thus halting further flow of primary fuel 21.

Similarly, within the embodiment in control system 6 depicted in FIG. 6, measurement of alternate fuel volume is effected by allowing piston 183 to cyclically transverse within a constrained length of cylinder 180, said length being defined as the distance traversed by piston 183 between contact with sensor 181 and sensor 182 occurring at each cycle extremity, said volume being the three dimensional volume traversed during said length less the volume occupied by piston 183, with electronic controller 90 counting said occurrences of contact with sensor 181 via signal line 96 and/or 182 via signal line 99 and multiplying the count of said sensor contact occurrences to obtain the total volume of primary fuel measured. Also, upon each occurrence of sensor contact, electronic controller 90 further effects control of valves 171, 172, 174 and 175 via valve control signal lines 97 and 98 in a manner to reverse the travel of piston 180 as appropriate and thus effect cycling. For example, with piston 183 starting in contact with sensor 181 and electronic controller 90 having determined the requirement that a volume of alternate fuel 41 be dispensed into flow cell 70, electronic controller 90 enables valve control signal line 97 to open valves 171 and 174, and disables control signal line 98, if prior enabled, to close valves 172 and 175, thus allowing the piston to move from the direction of sensor 181 toward the direction of sensor 182, the piston being driven under force of primary fuel pressure present within connecting manifold fuel line 53, effecting flow through valve 171 and connecting manifold fuel line 173, said force thereby transmitted to piston 183 effecting motion of piston 183. The said motion of piston 183 expels the quantity of entrained fuel prior existing on the opposite side of piston 183 via manifold fuel line 176, valve 174, and to flow cell 70 via fuel line 61 while simultaneously entraining new alternate fuel on its driven side as piston 183 travels from its initial contact with sensor 181 until such time sensor 182 becomes contacted. At such time of contact with sensor 182 as conveyed to electronic controller 90 via signal line 99, if electronic controller 90 requires additional quanta of alternate fuel be dispensed into flow cell 70, valve control signal line 99 is disabled by electronic controller 90 to close valves 171 and 174, and valve control signal line 98 is enabled to open valves 172 and 175, thus allowing the piston to move from the direction of sensor 182 toward sensor 181, and the cycle is repeated. And so on. If, however, electronic controller 90 requires that no additional quanta of alternate fuel be dispensed into flow cell 70, valve control signal lines 97 and 98 are disabled, closing valves 171, 172, 174 and 175, and thus halting further flow of alternate fuel 41.

Contact sensors 161, 162, 181 and/or 183 may be made physically and/or electrically adjustable to vary the effective length of cylinders 160 and/or 180 to effect adjustment and/or calibration of volume. Contact sensors 161, 162, 181 and/or 183, electronic controller 90, and/or their associated embodiments may also be made sealable by mechanical device or indicia to certify calibrated status and/or to reveal tampering.

Contact sensors 161, 162, 181 and/or 183 may be made physically and/or electrically fixed, with calibration effected by comparing cylinder volume displacement to a known standard volume or by measurement device, where the resulting measurement, measurement error and/or calibration factor associated with individual cylinder displacements is stored within electronic controller 90 in nonvolatile fashion. Contact sensors 161, 162, 181 and/or 183, electronic controller 90, and/or their associated embodiments may still be made sealable by mechanical device or indicia to certify calibrated status and/or to reveal tampering due to their ability to modify apparent cylinder volume if modified or changed.

Electronic controller 90 may further be made cryptographically secure, both in stored calibration data, if used and if any, but also in stored information such as primary and alternate fuel totals, blend ratios, including the ability to preset or clear these values.

While contact sensors 161, 162, 181 and 182 are shown within the embodiment in control system 6 depicted in FIG. 6, there is nothing to preclude the measurement and/or detection of piston 160 and 180 traversal within respective cylinders 160 and 180 by substitution of linear or digital measurement or encoding devices measuring said traversal.

While piston 160 and 180 traversal within respective cylinders 160 and 180 as shown within the embodiment in control system 6 depicted in FIG. 6 is effected by pressure provided by external pumps 29 and 49 respectively, there is nothing to preclude a prime mover being attached to pistons 160 and 180, and the piston-cylinder assembles further serving as a pumping devices, either in assist capacity, or in serving for the elimination of pumps 29 and 49. The prime mover may further be measured and/or encoded as to its motion such that sensors 161, 162, 181 and 182, or of linear or digital measurement or encoding devices replacing them are eliminated.

In the alternate embodiments above, sensors 161, 162, 181 and 182 may be retained as useful for full-travel detection, serving as limit switches to prevent piston 160 and 180 over-travel, said detection especially desired in systems employing prime movers of force sufficient to render damage if traverse motion is left unchecked.

Figure 7:
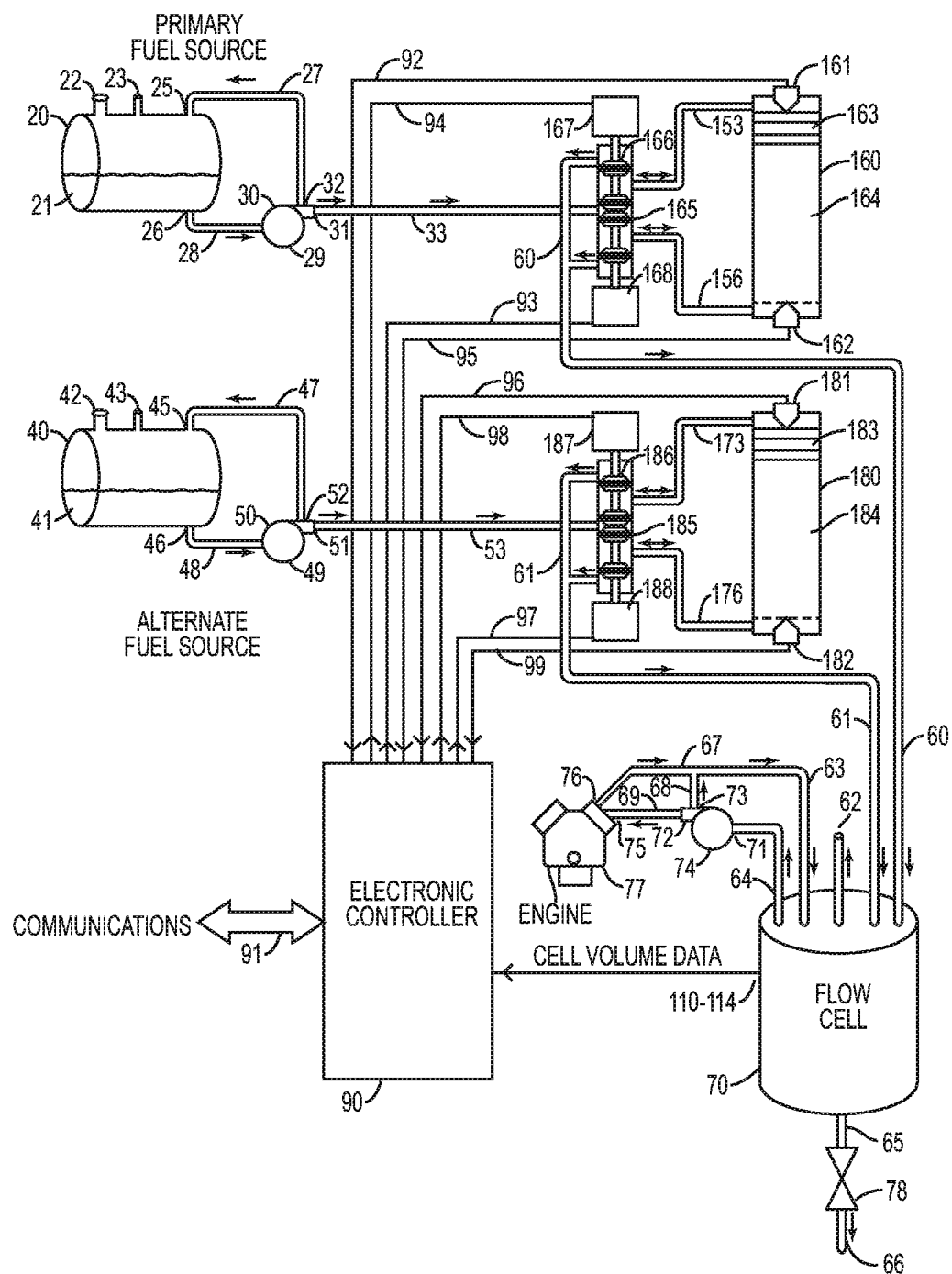
FIG. 7 is a schematic diagram of a blending system according to an embodiment of the present disclosure, the system shown ascertaining the volume of primary and alternate fuel consumed via metrics obtained by cylinders of known volume as controlled by compound valves.

Referring now to the drawings and, in particular, to FIG. 7, there is shown a fuel control system 7 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 7 depicted in FIG. 7 inherits identical elements and corresponding functional descriptions as fuel control system 6 depicted in FIG. 6, with like numbers referring to like elements throughout.

The control system 7 depicted in FIG. 7 differs from fuel control system 6 depicted in FIG. 6 in that primary fuel valves 151, 152, 154 and 155, and alternate fuel valves 171, 172, 174 and 175 have been deleted in control system 7 depicted in FIG. 7 and respectively replaced in function by primary fuel five-way valve 165 driven by opposing solenoids 167 and 168, and alternate fuel five-way valve 185 driven by opposing solenoids 187 and 188, each five-way valve now replacing the function of four discrete valves, thus reducing cost and component count.

Five-way valves 165 and 185 are of such construct that when their corresponding solenoids are disabled, respective valve flow control elements 166 and 186 return to their center positions as depicted in FIG. 7, thus disabling any flow of fuel. Regarding further description of system behavior, valve control signal lines 93, 94, 97 and 98 as controlled by electronic controller 90 effect identical fuel flow control and measurement enablement function as described for system 6 depicted in FIG. 6.

Figure 8:
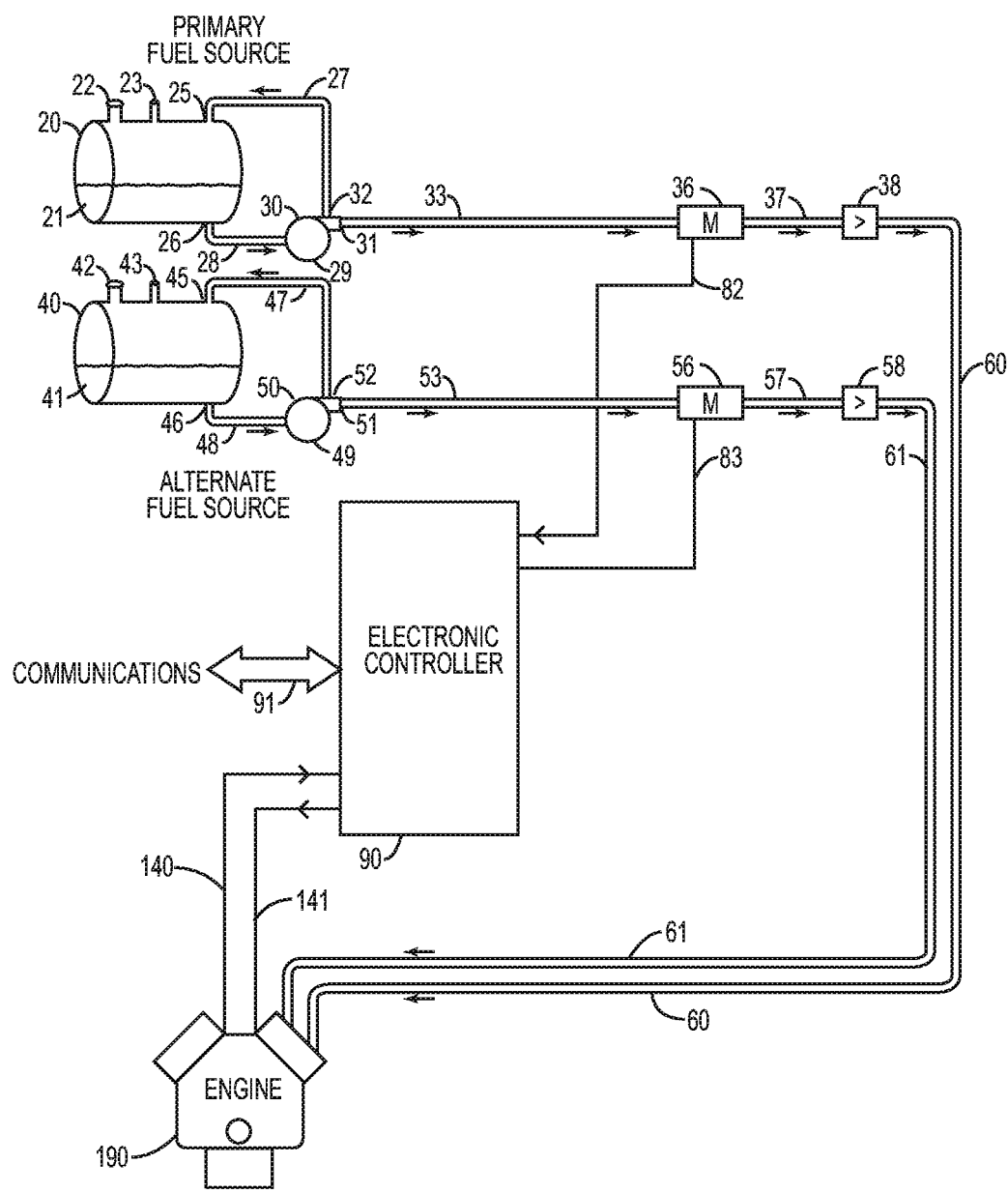
FIG. 8 is a schematic diagram of a blending system according to an embodiment of the present disclosure, the system shown for an internal combustion engine capable of operating on separate primary and alternate fuels without production of bypass at the engine and capable of ascertaining the volume of primary and alternate fuel consumed by at least one of metrics prior enumerated.

Referring now to the drawings and, in particular, to FIG. 8, there is shown a fuel control system 8 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 8 depicted in FIG. 8 inherits identical elements and corresponding functional descriptions as fuel control system 3 depicted in FIG. 3, with like numbers referring to like elements throughout.

The control system 8 depicted in FIG. 8 differs from fuel control system 3 depicted in FIG. 3 in that engine 77 has been deleted and replaced with engine 190, said engine 190 capable of receiving both a primary fuel 21 and an alternate fuel 41, and performing blending of primary fuel 21 and alternate fuel 41 at the engine.

The control system 8 depicted in FIG. 8 further differs from fuel control system 3 depicted in FIG. 3 in that primary fuel control valve 34, alternate fuel control valve 54 and flow cell 70 have been deleted, with primary fuel 21 and alternate fuel 41 being made continuously and directly available to engine 190.

Within the embodiment of control system 8 depicted in FIG. 8, electronic controller 90 utilizes volume data derived from primary fuel measurement device 36 and alternate fuel measurement device 56 for extraction of RINs and/or determination of tax credits and/or subsidies, as allowed and as applicable.

Also within the embodiment of control system 8 depicted in FIG. 8, electronic controller 90 utilizes blend ratio data derived from engine 190 via signal line(s) 140. Alternately, or in conjunction, electronic controller 90 may specify the desired blend ratio to engine 190 via signal line(s) 141, or may provide direct injector timing and/or control of engine 190, thus effecting desired blend ratio. Said blend ratio is coupled with primary fuel 21 and alternate fuel 41 volume derived from primary fuel measurement device 36 and alternate fuel measurement device 56 for extraction of RINs and/or determination of tax credits and/or subsidies, as allowed and as applicable.

At this point in these teachings, fuel control system 8 depicted in FIG. 8 utilized engine 190 capable of operating from both primary fuel 21 and alternate fuel 41, and therefore flow cell 70 was omitted as an intermediary blending cell. While being a desirable embodiment due to simplicity, multiple limitations nevertheless exist. Specifically, no provision is allotted for primary fuel and/or alternate fuel bypass occurring at engine 190, as may be desired and generated at the fuel injector rails for pressure management, and/or desired and generated at the fuel injectors themselves to provide pressure differential or pressure relief. Secondly, primary fuel measurement device 36 and alternate fuel measurement device 56 operate at high pressure and also may experience significant pressure pulsation due to normal injector operation, which makes accurate measurement of volume difficult as internal metering elements may vibrate as pressure gradients are reflected and/or distributed throughout the system. Lastly, actual flow rates experienced by primary fuel measurement device 36 and alternate fuel measurement device 56 are small; being dictated by actual real-time engine fuel consumption, not batch dispense, and further diminished in that usage may be distributed over two fuel types, which places further engineering demands on the construct and cost of fuel measurement device 36 and alternate fuel measurement device 56. Therefore, a more preferred embodiment is taught.

Figure 9:
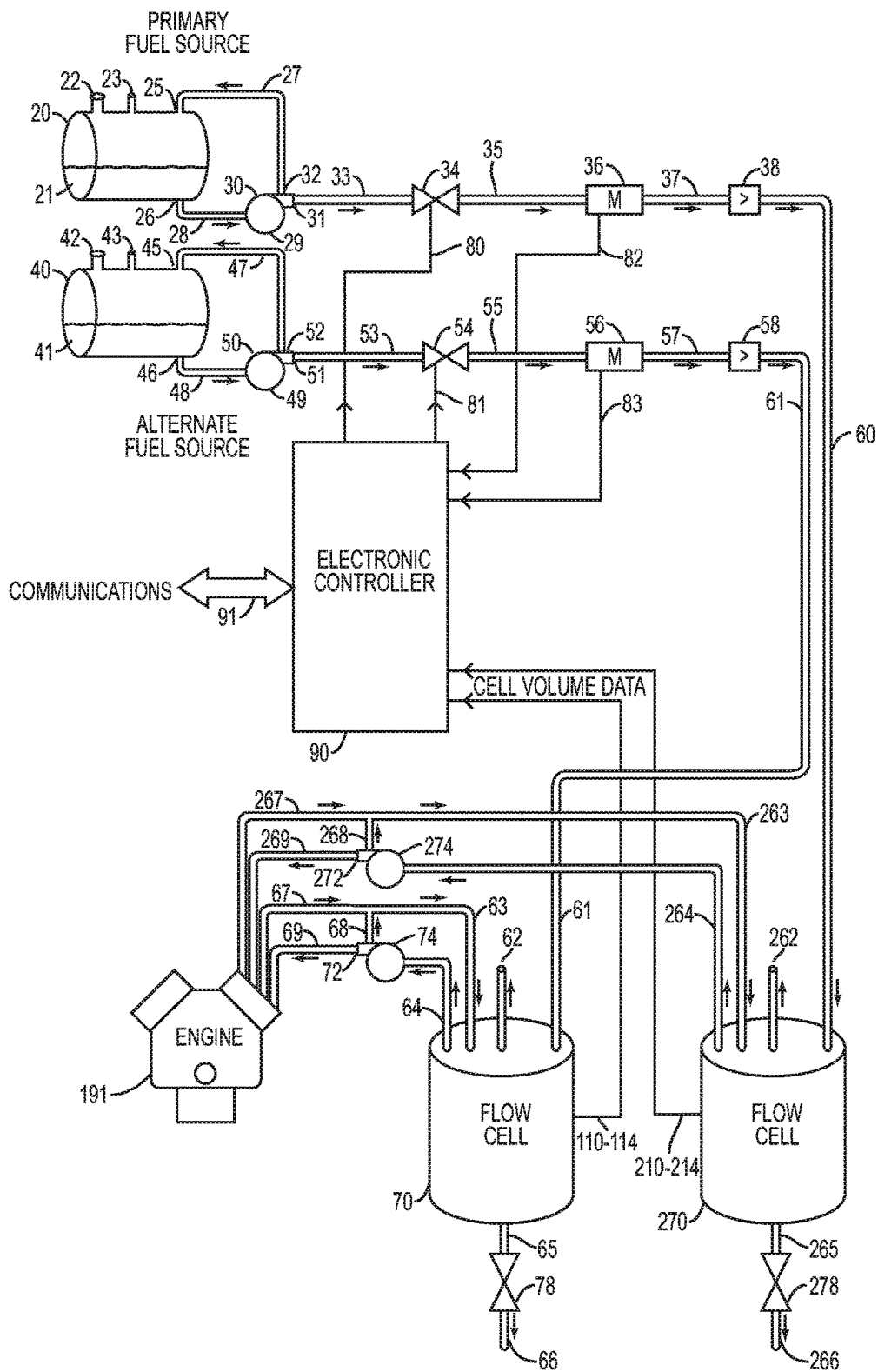
FIG. 9 is a schematic diagram of a blending system according to an embodiment of the present disclosure, the system shown for an internal combustion engine capable of operating on separate primary and alternate fuels with allotment for the production of bypass at the engine and capable of ascertaining the volume of primary and alternate fuel consumed by at least one of metrics prior enumerated.

Referring now to the drawings and, in particular, to FIG. 9, there is shown a fuel control system 9 for use in providing fuel to an internal combustion engine in accordance with one embodiment of the present disclosure. The fuel used by the engine may be a primary fuel 21 contained in a first fuel source 20, an alternate fuel 41 contained in a second fuel source 40, or, as will be described in more detail below, any combination of the primary fuel 21 and the alternate fuel 41.

Unless otherwise specifically stated, fuel control system 9 depicted in FIG. 9 inherits identical elements and corresponding functional descriptions as fuel control system 3 depicted in FIG. 3, with like numbers referring to like elements throughout.

The control system 9 depicted in FIG. 9 differs from fuel control system 3 depicted in FIG. 3 in that engine 77 has been deleted and replaced with engine 191, said engine 191 capable of receiving both a primary fuel 21 and an alternate fuel 41, and performing blending of primary fuel 21 and alternate fuel 41 at the engine.

The control system 9 depicted in FIG. 9 further differs from fuel control system 3 depicted in FIG. 3 in that separate flow cells exist, thus requiring the addition of flow cell 270. Specifically, flow cell 270 is now dedicated for primary fuel 21, whereas flow cell 70 is now dedicated to alternate fuel 41. Accordingly, the dual inlet nature of the flow cells has been modified, and now only a single inlet is provided, specifically fuel inlet line 60 for primary fuel 21 dispense into flow cell 270, and fuel inlet line 61 for alternate fuel 41 dispense into flow cell 70.

Likewise, a second set of flow cell volume signal lines 210-214 exist for flow cell 270 for electronic controller 90 to maintain a sufficient reservoir of primary fuel within flow cell 270, in similar fashion as flow cell volume signal lines 110-114 exist for flow cell 70 for electronic controller 90 to maintain a sufficient reservoir of alternate fuel within flow cell 70, as also described earlier in these teachings.

Primary fuel flow cell 270 also includes fuel outlet line 264 serving as primary fuel source for the engine, specifically the engine fuel control system, and in this embodiment doing so by sourcing engine fuel pump 274.

Engine primary fuel pump 274 may also produce bypass, in fact pump 274 may be of multi-stage construction and thus produce primary fuel bypass at a plurality of points, said bypass connected to bypass fuel return line 268. Furthermore, the engine itself may produce primary fuel bypass at one or more points, including but not limited to fuel injectors, control valves, and pressure relief ports, said bypass sources represented and returned via bypass fuel return line 267. While multiple primary fuel bypass return lines may be employed, in this embodiment bypass fuel return lines 267 and 268 are joined to form fuel return line 263.

To allow for the acceptance of primary fuel that was not combusted within engine 191 and instead returned as bypass, flow cell 270 also includes bypass fuel return line 263, thus flow cell 270 is rendered capable of re-accepting bypassed fuel into said flow cell volume.

Similarly, engine alternate fuel pump 74 may also produce bypass, in fact pump 74 may be of multi-stage construction and thus produce alternate fuel bypass at a plurality of points, said bypass connected to bypass fuel return line 68. Furthermore, the engine itself may produce alternate fuel bypass at one or more points, including but not limited to fuel injectors, control valves, and pressure relief ports, said bypass sources represented and returned via bypass fuel return line 67. While multiple alternate fuel bypass return lines may be employed, in this embodiment bypass fuel return lines 67 and 68 are joined to form fuel return line 63.

To allow for the acceptance of alternate fuel that was not combusted within engine 191 and instead returned as bypass, flow cell 70 also includes bypass fuel return line 63, thus flow cell 70 is rendered capable of re-accepting bypassed fuel into said flow cell volume.

Importantly, this flow cell methodology eliminates the need to return bypassed fuel to a single flow cell, thus preventing cross-contamination before actual blending at engine 191, and therefore the preservation of neat fuel status and classification, as may be required for RIN extraction if blending, or compliance with of neat only usage restrictions if prescribed by RIN number or equivalent, other regulatory use restrictions, or user preference.

Importantly, this flow cell methodology and the elimination of returned bypassed fuel to one or both of primary fuel source 20 and/or alternate fuel source 40 allows for the separate and accurate metering of primary fuel 21 and secondary fuel 41, as may be required for RIN extraction.

In effect, flow cells 70 and 270 serve as a surrogate fuel sources for an engine designed to accept a dual fuel supply source, providing both a source of differentiated fuel types and the capability to accept separate bypass, therefore preserving differentiation and neatness, as may be required for RIN extraction and/or compliance with neat mode operation if prescribed by RIN number or equivalent, other regulatory use restrictions, or user preference.

Flow cells 70 and 270 also includes respective vent ports 62 and 262 to allow for the free creation and removal of ullage within the volume of flow cells 70 and 270, and to maintain the volume within flow cells 70 and 270 at a lower pressure than fuel source and bypass source to promote flow. Vent ports 62 and 262 may be vented to atmosphere. Alternately, vent ports 62 and 262 may be routed to an activated carbon canister, routed proximate to engine air intake for scavenge, and/or maintained at engine vacuum; these and other methods common to those skilled in the art being intended to mitigate vapor release into the atmosphere.

It should be noted that since the ullage within flow cells 70 and 270 are nominally maintained at atmospheric pressure or slight vacuum, and furthermore ideally at the same pressure as the ullage within primary fuel source 20 and alternate fuel storage 40 via a common vent manifold, pumps 29 and 49, valves and other common components likewise effectively work against slight vacuum, zero or minimal pressure, thus simplifying their design requirements, extending their useful life, and reducing system cost.

Within the embodiment of control system 9 depicted in FIG. 9, electronic controller 90 utilizes volume data derived from primary fuel measurement device 36 and alternate fuel measurement device 56 for extraction of RINs and/or determination of tax credits and/or subsidies, as allowed and as applicable.

Also within the embodiment of control system 9 depicted in FIG. 9, electronic controller 90 utilizes blend ratio data derived from engine 190 via signal line(s) 140. Alternately, or in conjunction, electronic controller 90 may specify the desired blend ratio to engine 190 via signal line(s) 141, or may provide direct injector timing and/or control of engine 190, thus effecting desired blend ratio. Said blend ratio is coupled with primary fuel 21 and alternate fuel 41 volume derived from primary fuel measurement device 36 and alternate fuel measurement device 56 for extraction of RINs and/or determination of tax credits and/or subsidies, as allowed and as applicable. Alternately, electronic controller 90 may specify neat mode utilization if prescribed by RIN number or equivalent, other regulatory use restrictions, or user preference, by mandating blend ratios of 0:100% or 100:0%.

With a renewable fuel storage tank commonly expected to be refilled before depletion, typical of any vehicle whose fuel storage capability is used for motive energy, stacking of various renewable fuel RIN assignments may need to occur. Thus, it may be desired to provide an automated management mechanism for such stacking, when needed or required.

Furthermore, while RIN values associated with assignments (their starting and ending values, described later) are constrained to integers, the refueling operation is not, and more often than not will involve fractional gallons. Consequently, a separate but parallel fractional-volume accounting mechanism may be employed to accurately transition from one assigned RIN to the next. Importantly, this problem occurs for any vehicle system used to facilitate the consumption of renewable fuel types with RINs appertaining, i.e. is not constrained to the Flow Cell embodiment.

Further continuing with importance, the monetization of $CO_2$ offset separate from the marketable component of the RIN can also be considered. For example, consider California presently offering $55 per 1,000 Kg, with fossil diesel outputting 10.8 kilograms $CO_2$ per gallon, i.e. upon 92.6 gallons of offsetting consumption.

Specifically, while the "RR" field of the RIN (described later) is fixed at RR=15 (representing a multiplier of 1.5) for "D" field D=4 biodiesel (industry vernacular "type D4 RIN"), the actual $CO_2$ offset of a particular biodiesel product transfer to vehicle varies greatly both by feedstock and productions process, approaching 84% offset for soy biodiesel. This, taken with geographic and/or jurisdictional incentives, whereby the $CO_2$ offset achieved may separately and additionally be fungible, requires that stacked biodiesel product transfers may be (and should be) dynamically selected by algorithm for maximized capture of other financial incentives where provided.

Consequently, while the RIN stack may be processed first-in-first-used, or by any rote algorithm, the art herein should specifically permit the dynamic selection of stacked RIN assignment by additional criteria, including, but not limited to, associated $CO_2$ offset as determined by geographic and/or jurisdictional incentives.

As background, a RIN comprises a 36-digit number with the structure (normally with hyphens omitted): K-YYYY-CCCC-FFFFF-BBBBB-RR-D-SSSSSSSS-EEEEEEEE, where K=1 if not detached, K=2 if detached; YYYY being the year of renewable fuel creation, cccc being the producer's, blender's or other EPA-authorized entity's identification number as assigned by the EPA; FFFFF being the entity's facility number; BBBBB being the renewable fuel batch number, RR being its RIN multiplier per gallon. For example, corn-derived ethanol's RR value is 10, representing 1.0 RINs/gallon; therefore, 10 gallons of ethanol blended would detach 10 RINs. Correspondingly, biodiesel's RR value is 15, representing 1.5 RINs/gallon; therefore, 10 gallons of biodiesel blended would detach 15 RINs. Lastly, D represents the renewable fuel type, also implying feedstock. For example, common biodiesel, D=4. Often, in industry vernacular, especially when referencing market value or trade, the term "Type D4 RIN" is used to identify fuel type.

In this regard, a RIN stack-like file-based data structure can be created in an alternative fueling system, wherein each stack entry (hereinafter, "RIN index") corresponding to a discrete receipt of renewable fuel within the vehicle (hereinafter, "product transfer"), with each stack index associated with that product transfer containing the longitudinally associated variable contents:
Q,K-YYYY-CCCC-FFFFF-BBBBB-RR-D-SSSSSSSS-EEEEEEEE, vvv.vvv,rrr.rrr,mm/dd/yyyy,hh:mm:ss,mm/dd/yyyy,hh:mm:ss The first placeholder, "Q", defines the disposition of each fueling event. Presently, may be:

"Q", representing a quantity of renewable fuel available with the vehicle's storage tank queued for future utilization.

"A", representing a quantity of renewable fuel currently under utilization.

"P", representing a quantity of renewable fuel that has been fully utilized.

Note that "Q", while representing a quantity of renewable fuel with the vehicle's storage tank available for utilization, may represent either a product transfer whose associated RIN has not yet utilized, may represent a product transfer whose associated RIN has been partially utilized but whose disposition has been transitioned back to "Q" in deference to a more preferential stack index. Preference may be given by, but not limited to, K value constraints (discussed further down), and/or $CO_2$ offset; and as determined by, but not limited to, vehicle operation and tolerance renewable content thereby permitting neat operation, and/or geographic location.

The next placeholder in the RIN entry, K-YYYY-CCCC-FFFFF-BBBBB-RR-D-SSSSSSSS-EEEEEEEE, defines the RIN value associated with the renewable fuel as received by the vehicle during product transfer. (Hyphens are automatically included within this stored variable for the separation of fields and therefore readability when viewed or printed, however hyphens are not part of the EPA RFS RIN specification).

Within the RIN value component, only the K value has significance as program control criteria, that being the prevention of blending for K=2 (pre-detached) renewable fuel per EPA rules. Nevertheless, all fields are required for report generation and overall RIN management.

EPA sanctioned renewable fuel suppliers will often immediately supply a Product Transfer Document (hereinafter, "PTD") upon product transfer to vehicle, and therefore effect transfer of custody and ownership; nevertheless, suppliers often delay processing the transfer of the actual RIN assignment pertaining to that PTD, including the numerical creation of RIN starting and ending fields, as this serialization is typically a human administrative process, and is often more easily performed once covering multiple PTDs, including the administrative input or transfer of the assigned RIN data via EPA's reporting mechanism. Resultantly, for the purchaser, actual numerical RIN assignments are often only realized after having been made available via the purchaser's own EPA account.

Therefore, an alternate provided herein allows for a "token" to be substituted for actual the RIN numerical field at time of product transfer, to be later reconciled and substituted with the actual RIN value becomes available, either within the stack, or external to the stack, therefore at any point (cloud).

There are different methods that may suffice for a token, thereby denoting its substitutional presence as a RIN substitute within the stack. As one such example, with the value of K being constrained to being either 1 (one) or 2 (two), by using K+2 (two) stored within the K variable space, a K value of 3 (three) could designate a RIN token having non-detached RINs, and a K value of 4 (four) could designate a RIN token having detached RINs. Again, many methods exist and could suffice within the 36-digit field allotment, or longitudinal to or external to the stack index allotment.

Returning to the RIN entry above, the next placeholder, vvv.vvv, designates the actual renewable fuel volume dispensed during the product transfer, with those values preceding the decimal point designating gallons, and those following designating thousandths of gallons, an accuracy typical of a fuel dispenser. This value remains unchanged, and serves for record generation and is used in the calculation of net $CO_2$ reduction for that RIN Stack entry.

The next placeholder in the RIN entry, rrr.rrr, designates the volume remaining for that RIN Stack Index, with each dispense into the Flow Cell (or other blending mechanism) subtracting therefrom until zero. Importantly, this is the primary mechanism for the detection of RIN Stack Index depletion, and initiates the disposition transition from "A" active, to "P" processed. It also indicates that the associated renewable fuel RIN has been fully detached, and may be retired for financial return; however, there is nothing to prohibit partial detachment and retirement, as long as so accounted for.

Also possibly important to disposition transition, with high probability the volume dispensed to the Flow Cell likely exceeded the volume remaining in the now depleted stack entry, and upon its transition to a "P" processed disposition, the portion of volume drawn from the next available RIN Stack entry must be accounted. Consequently, when the next available stack entry is transitioned from "Q" queued to "A" active, this fractional volume is initially subtracted from the newly instantiated stack entry's rrr.rrr field.

For record generation, specifically verification of blend ratio by ratio of fuel type volumes as dispensed into the Flow Cell, the fossil portion, must be properly subdivided across both RIN entries.

Consequently, two record entries are generated during a stack transition, one for the consumed RIN entry transitioning to processed, and one representing that "borrowed" from the newly activated RIN entry, both records in summation representing the renewable fuel volume as was necessary to reflect the total volume as demanded by the Flow Cell, and the total volume of fossil fuel that was spilt between them, if blending.

The next two placeholders in the RIN entry, mm/dd/yyyy and hh:mm:ss, designate the date and time of the renewable fuel dispense associated with that RIN.

The final two placeholders in the RIN entry, similarly mm/dd/yyyy and hh:mm:ss, designate the date and time of the renewable fuel depletion associated with that RIN.

Departing again to a more preferred embodiment, an additional field containing the $CO_2$ offset coefficient for the renewable fuel product transfer associated with stack index would be desirable to more accurately calculate and report the $CO_2$ offset.

In some aspects, additional field(s) containing the feedstock type(s) pertaining to the renewable fuel product transfer, which may be a blend of various renewable fuels and/or may further be subdivided by various feedstocks used during fuel manufacture, may be desirable to include in the RIN entry to more accurately calculate and report, including but not limited to, $CO_2$ offset, fuel performance within a diesel engine, constraints, if any, of use within a diesel engine, clouding potential, and energy density per unit volume, or energy density equivalency to a standardized fuel.

Further, an additional field containing the GPS coordinates can be added to the RIN entry where the renewable fuel dispense occurred would further confirm supplier association to RIN.

Further, an additional field containing a cryptographically secured digital signature or cryptographically secured hash of longitudinal contents, excluding rrr.rrr and the second mm/dd/yyyy and hh:mm:ss pair (they being a variable dependent upon future consumption), or more specifically those variables normally undergoing change or modification, would aid in detection of modification and/or fraud (RINs having financial value).

Lastly, while RIN entry in the alternative fueling system upon product transfer of renewable fuel was accomplished manually via touch-screen and/or keyboard entry into a form, it is highly preferred that this be accomplished by automated electronic means (see preface).

Figure 10:
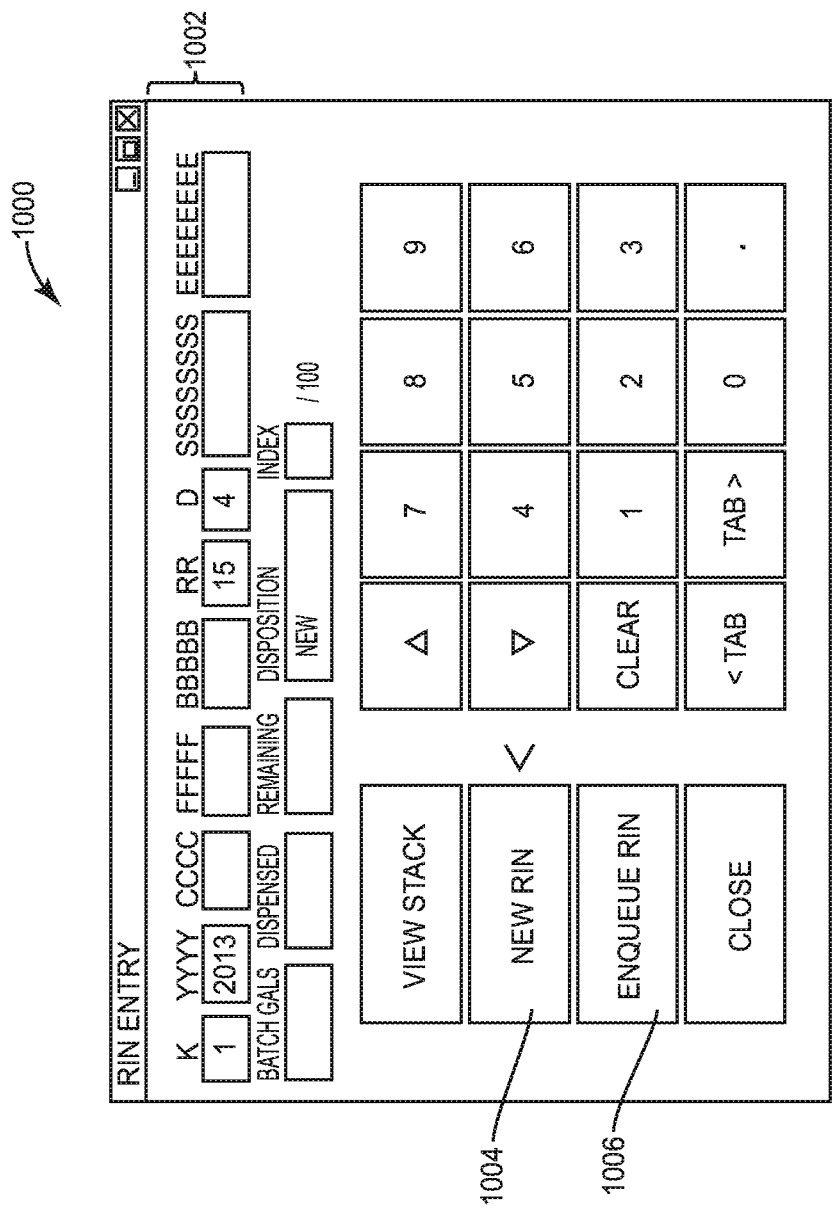
FIG. 10 is a diagram of an exemplary user interface that can be provided by an alternative fueling system to allow for manual entry of RIN entry.

Turning now to FIG. 10, a user interface 1000 can be provided by an alternative fueling system to allow for manual entry of RIN entry 1002, as discussed above. The form allows for new RIN data associated with a product transfer to be entered by selecting the "New RIN" button 1004 as shown beneath, entering the appropriate data, and then selecting "Enqueue RIN" button to formally add it to the RIN Stack's file structure. Once written, it cannot be edited or removed (except by manually editing the file) in this example. The form also allows viewing of RIN Stack contents by index by selecting "View Stack", and then by indexing up or down to select and display contents for that index.

While the primary motivation resides in providing a method for RIN Stack management itself, multiple forms of records are generated by actions therefrom, and are included for completeness. Three record types are automatically generated during vehicle operation, those being "Log File", "RIN Output File", and "RIN Output File". Of these three, the most pertinent to RIN Stack operation is the RIN Output File.

The Log File is the most decoupled from the RIN Stack, is largely for diagnostic and software audit purposes; however, does contain messages generated by the RIN Stack. The Log File comprises eight entry types; those being prefixed with "S" for "System", being system oriented messages; "I for "Informational", being software version, copyright and other informational content; "G" for "GPS", indicating a GPS subsystem related operation or status; "U"

for "User", being records of user command issuances or the result of user actions, e.g. ignition key; "C" for "Cell", indicating a Flow Cell state machine related operation or status; "D" for "Dispense", indicating dispense operations into the Flow Cell; and "R" for "RIN", denoting RIN metrological operations derived from the RIN Stack. Additional RIN Stack operations are performed by "S" System during software initialization, and "C being those performed within the Flow Cell state machine. Lastly, there is "E" for Error, denoting exception conditions.

Time and date stamps are can be included, and log entries generated within a specific machine state also include machine state within parenthesis.

As one example, the vehicle control software executed without renewable fuel present, or more specifically with the RIN Stack being void (no active or queued RIN found), therefore unable to blend or use renewable fuel in neat form, and automatically invoking usage constraints at the system level, that being the system constrained to B0 (neat diesel) operation only. Records have been truncated for brevity, with deletions denoted by ellipsis:

```
S Apr. 25, 2013 8:52:37 AM Program Started
I Apr. 25, 2013 8:52:37 AM Software Version 1.11.0.0
I Apr. 25, 2013 8:52:37 AM Copyright © 2013. Immixt, LLC. All Rights Reserved.
S Apr. 25, 2013 8:52:37 AM No Active Or Queued RIN Found
S Apr. 25, 2013 8:52:37 AM B0 Neat Diesel Selected By System
G Apr. 25, 2013 8:52:37 AM Garmin USB Device Found (GPS_ENTRY)
C Apr. 25, 2013 8:52:37 AM Safe Parameters Command Sent (CS_ENTRY)
G Apr. 25, 2013 8:52:37 AM GPS 18x USB Software Version 2.60
C Apr. 25, 2013 8:52:38 AM All Relays Off Command Sent (CS_RESET_RELAYS)
C Apr. 25, 2013 8:52:38 AM All AD Channels Read (CS_INITIAL_AD_READ)
U Apr. 25, 2013 8:53:30 AM System Enable Selected By Operator
C Apr. 25, 2013 8:53:30 AM Start Flag Detected (CS_WAIT_USER_ENABLE)
C Apr. 25, 2013 8:53:31 AM Diesel Pump Started (CS_INITIAL_POWER_UP_A)
C Apr. 25, 2013 8:53:32 AM Biodiesel Pump Started (CS_INITIAL_POWER_UP_B)
C Apr. 25, 2013 8:53:33 AM Engine Connected To Cell (CS_ENABLE_CELL_TO_ENGINE)
C Apr. 25, 2013 8:55:14 AM Operational Dispense Required (CS_ACTIVE_TEST_LOWER_LEVEL)
D Apr. 25, 2013 8:55:14 AM Dispense Biodiesel 0.000 gal (0 sec)/Diesel 0.024 gal (6 sec)
D Apr. 25, 2013 8:55:21 AM Dispense Completed, 1 Cycles
R Apr. 25, 2013 8:55:22 AM RIN Records Generated (CS_ACTIVE_RIN_MANAGEMENT)
C Apr. 25, 2013 8:56:10 AM Operational Dispense Required (CS_ACTIVE_TEST_LOWER_LEVEL)
D Apr. 25, 2013 8:56:10 AM Dispense Biodiesel 0.000 gal (0 sec)/Diesel 0.024 gal (6 sec)
D Apr. 25, 2013 8:56:17 AM Dispense Completed, 1 Cycles
R Apr. 25, 2013 8:56:18 AM RIN Records Generated (CS_ACTIVE_RIN_MANAGEMENT)
C Apr. 25, 2013 8:56:47 AM Operational Dispense Required (CS_ACTIVE_TEST_LOWER_LEVEL)
D Apr. 25, 2013 8:56:47 AM Dispense Biodiesel 0.000 gal (0 sec)/Diesel 0.024 gal (6 sec)
D Apr. 25, 2013 8:56:55 AM Dispense Completed, 1 Cycles
R Apr. 25, 2013 8:56:55 AM RIN Records Generated (CS_ACTIVE_RIN_MANAGEMENT)
C Apr. 25, 2013 8:57:23 AM Operational Dispense Required (CS_ACTIVE_TEST_LOWER_LEVEL)
D Apr. 25, 2013 8:57:23 AM Dispense Biodiesel 0.000 gal (0 sec)/Diesel 0.024 gal (6 sec)
D Apr. 25, 2013 8:57:31 AM Dispense Completed, 1 Cycles
R Apr. 25, 2013 8:57:31 AM RIN Records Generated (CS_ACTIVE_RIN_MANAGEMENT)
. . .
C Apr. 25, 2013 9:03:14 AM Operational Dispense Required (CS_ACTIVE_TEST_LOWER_LEVEL)
D Apr. 25, 2013 9:03:14 AM Dispense Biodiesel 0.000 gal (0 sec)/Diesel 0.024 gal (6 sec)
D Apr. 25, 2013 9:03:22 AM Dispense Completed, 1 Cycles
R Apr. 25, 2013 9:03:22 AM RIN Records Generated (CS_ACTIVE_RIN_MANAGEMENT)
C Apr. 25, 2013 9:03:48 AM Operational Dispense Required (CS_ACTIVE_TEST_LOWER_LEVEL)
D Apr. 25, 2013 9:03:48 AM Dispense Biodiesel 0.000 gal (0 sec)/Diesel 0.024 gal (6 sec)
D Apr. 25, 2013 9:03:56 AM Dispense Completed, 1 Cycles
R Apr. 25, 2013 9:03:56 AM RIN Records Generated (CS_ACTIVE_RIN_MANAGEMENT)
C Apr. 25, 2013 9:05:20 AM Operational Dispense Required (CS_ACTIVE_TEST_LOWER_LEVEL)
D Apr. 25, 2013 9:05:20 AM Dispense Biodiesel 0.000 gal (0 sec)/Diesel 0.024 gal (6 sec)
D Apr. 25, 2013 9:05:28 AM Dispense Completed, 1 Cycles
R Apr. 25, 2013 9:05:28 AM RIN Records Generated (CS_ACTIVE_RIN_MANAGEMENT)
U Apr. 25, 2013 9:05:34 AM Engine Shut Down By Operator (CS_ACTIVE_TEST_LOWER_LEVEL)
U Apr. 25, 2013 9:06:14 AM System Terminate Selected By Operator
```

As another example, the vehicle control software executed with renewable fuel present, moreover with two RIN Stack Indexes populated, one previously transitioned active, and one queued.

Included are system start up at 4:23:28 including RIN instantiation, a RIN Stack related operation; a blend ratio change request by the user at 4:47:56; and a final segment representing operation before and after user engine shutoff, the ignition key having transitioned false at 7:51:32. Representing a four hour period of operation, records have been truncated for brevity with deletions denoted by ellipsis.

Each row designates a dispense operation into the Flow Cell of fossil fuel, renewable fuel, or both (a blend).

Each column designates fuel types, volumes, RIN, locations, and other associated data for each row-wise dispense operation into the Flow Cell, sufficient to document and recover other fungible aspects of RIN detachments and $CO_2$ offset volumes, where and when applicable. Note that only that essential data is provided, and nothing is to prohibit additional calculations from being made separately and/or externally.

```
S Apr. 25, 2013 4:23:28 PM Program Started
I Apr. 25, 2013 4:23:28 PM Software Version 1.11.0.0
I Apr. 25, 2013 4:23:28 PM Copyright © 2013. Immixt, LLC. All Rights Reserved.
S Apr. 25, 2013 4:23:28 PM Active RIN Found And Instantiated
S Apr. 25, 2013 4:23:28 PM Active 1-2013-3272-80011-40002-15-4-00000001-00000006
S Apr. 25, 2013 4:23:28 PM Queued RIN Found And Available
S Apr. 25, 2013 4:23:28 PM Queued 1-2013-3272-80011-40004-15-4-00000001-00000015
G Apr. 25, 2013 4:23:28 PM Garmin USB Device Found (GPS_ENTRY)
C Apr. 25, 2013 4:23:28 PM Safe Parameters Command Sent (CS_ENTRY)
G Apr. 25, 2013 4:23:28 PM GPS 18x USB Software Version 2.60
C Apr. 25, 2013 4:23:28 PM All Relays Off Command Sent (CS_RESET_RELAYS)
C Apr. 25, 2013 4:23:29 PM All AD Channels Read (CS_INITIAL_AD_READ)
U Apr. 25, 2013 4:23:59 PM System Enable Selected By Operator
C Apr. 25, 2013 4:23:59 PM Start Flag Detected (CS_WAIT_USER_ENABLE)
C Apr. 25, 2013 4:23:59 PM Diesel Pump Started (CS_INITIAL_POWER_UP_A)
C Apr. 25, 2013 4:24:00 PM Biodiesel Pump Started (CS_INITIAL_POWER_UP_B)
C Apr. 25, 2013 4:24:02 PM Engine Connected To Cell (CS_ENABLE_CELL_TO_ENGINE)
C Apr. 25, 2013 4:28:01 PM Operational Dispense Required (CS_ACTIVE_TEST_LOWER_LEVEL)
D Apr. 25, 2013 4:28:02 PM Dispense Biodiesel 0.020 gal (5 sec)/Diesel 0.004 gal (1 sec)
D Apr. 25, 2013 4:28:07 PM Dispense Completed, 1 Cycles
R Apr. 25, 2013 4:28:08 PM RIN Records Generated (CS_ACTIVE_RIN_MANAGEMENT)
C Apr. 25, 2013 4:28:25 PM Operational Dispense Required (CS_ACTIVE_TEST_LOWER_LEVEL)
D Apr. 25, 2013 4:28:26 PM Dispense Biodiesel 0.020 gal (5 sec)/Diesel 0.004 gal (1 sec)
D Apr. 25, 2013 4:28:32 PM Dispense Completed, 1 Cycles
R Apr. 25, 2013 4:28:32 PM RIN Records Generated (CS_ACTIVE_RIN_MANAGEMENT)
. . .
U Apr. 25, 2013 4:47:36 PM B100 Neat Biodiesel Selected By Operator
C Apr. 25, 2013 4:47:44 PM Operational Dispense Required (CS_ACTIVE_TEST_LOWER_LEVEL)
D Apr. 25, 2013 4:47:44 PM Dispense Biodiesel 0.024 gal (6 sec)/Diesel 0.000 gal (0 sec)
D Apr. 25, 2013 4:47:52 PM Dispense Completed, 1 Cycles
R Apr. 25, 2013 4:47:52 PM RIN Records Generated (CS_ACTIVE_RIN_MANAGEMENT)
C Apr. 25, 2013 4:48:11 PM Operational Dispense Required (CS_ACTIVE_TEST_LOWER_LEVEL)
D Apr. 25, 2013 4:48:12 PM Dispense Biodiesel 0.024 gal (6 sec)/Diesel 0.000 gal (0 sec)
D Apr. 25, 2013 4:48:19 PM Dispense Completed, 1 Cycles
R Apr. 25, 2013 4:48:20 PM RIN Records Generated (CS_ACTIVE_RIN_MANAGEMENT)
. . .
C Apr. 25, 2013 7:48:43 PM Operational Dispense Required (CS_ACTIVE_TEST_LOWER_LEVEL)
D Apr. 25, 2013 7:48:43 PM Dispense Biodiesel 0.012 gal (3 sec)/Diesel 0.012 gal (3 sec)
D Apr. 25, 2013 7:48:47 PM Dispense Completed, 1 Cycles
R Apr. 25, 2013 7:48:47 PM RIN Records Generated (CS_ACTIVE_RIN_MANAGEMENT)
C Apr. 25, 2013 7:50:00 PM Operational Dispense Required (CS_ACTIVE_TEST_LOWER_LEVEL)
D Apr. 25, 2013 7:50:00 PM Dispense Biodiesel 0.012 gal (3 sec)/Diesel 0.012 gal (3 sec)
D Apr. 25, 2013 7:50:05 PM Dispense Completed, 1 Cycles
R Apr. 25, 2013 7:50:05 PM RIN Records Generated (CS_ACTIVE_RIN_MANAGEMENT)
U Apr. 25, 2013 7:51:32 PM Engine Shut Down By Operator (CS_ACTIVE_TEST_LOWER_LEVEL)
C Apr. 25, 2013 8:01:33 PM Purge Delay Expired (CS_ACTIVE_IGNITION_DROPPED)
C Apr. 25, 2013 8:01:33 PM Main Fuel Pump Restarted (CS_ACTIVE_RESTART_MAIN_PUMP)
C Apr. 25, 2013 8:01:49 PM Pressurization Complete (CS_ACTIVE_WAIT_MAIN_PUMP_PRE_DELAY)
C Apr. 25, 2013 8:01:49 PM Begin Purge Interval (CS_ACTIVE_PURGE_POLL_GATE)
C Apr. 25, 2013 8:01:56 PM Purge Interval Complete (CS_ACTIVE_PURGE_POLL_GATE)
C Apr. 25, 2013 8:02:55 PM Post Purge Cycle Complete (CS_ACTIVE_WAIT_MAIN_PUMP_POST_DELAY)
C Apr. 25, 2013 8:02:55 PM Cell Level Before Shutdown 44 Percent (CS_CLEAN_UP)
C Apr. 25, 2013 8:02:55 PM Blend Before Shutdown B50 Percent (CS_CLEAN_UP)
C Apr. 25, 2013 8:02:57 PM Shutdown (CS_WINDOWS_SHUTDOWN)
U Apr. 25, 2013 8:03:13 PM Program Closed By Operator
```

The RIN Output File is for metrological purposes, containing sufficient data to precisely document RIN detachment from one or more fractional detachments to the point of full detachment, including the blend ratio, fuel volumes and geographic position associated with each detachment event. When not detaching yet still operationally functioning, for example neat diesel or biodiesel operation, events are similarly logged.

As an example of data sufficiency, RIN 1-2013-3272-80011-40002-15-4-00000001-00000006 as represented beneath has an associated product transfer volume of 3.90 gallons. That RIN being associated to a specific batch of biodiesel is thereby known to be of soy feedstock having a $CO_2$ offset factor of 84%, and an energy density equivalency by volume of 96%. Consequently, consumption of -2013-3272-80011-40002-15-4-00000001-00000006 will displace 3.7 gallons of fossil diesel, whose $CO_2$ volume at 10,800 grams $CO_2$ per gallon would have been 39.96 kilograms. At 84% displacement efficiency (reflecting non-renewable content in feedstock and/or processing), this would yield a vehicle operational $CO_2$ offset of 33.57 kilograms upon full detachment.

As a further example, RIN 1-2013-3272-80011-40002-15-4-00000001-00000006 as represented beneath has an associated product transfer volume of 3.90 gallons, however a RIN content of 4 gallons (Ending field—Starting field—1), and RIN multiplier of 1.5 (RR value of 15), yielding an integer value of 6 RINs upon full detachment for retirement and market trade.

Pertaining to fields, as shown in the example following, the first column contains a type identifier; "C" designating "Comment"; "D" designating a "Dispense" into the Flow Cell; "P" designating a completed detachment of a stack index and therefore its associated RIN being "Processed"; and "I" designating a new stack index and associated RIN being "Instantiated".

The second and third columns contain date and time stamps, respectively.

Column four contains the associated RIN for the active stack index.

Column five contains the initial (unconsumed) volume for the product transfer of renewable fuel associated with that RIN.

Column six contains the blend ratio specified by the user (or system, as the system may have so chosen and/or constrained).

Column seven represents the renewable fuel volume dispensed into the Flow Cell for that Flow Cell dispense operation.

Column eight represents the remaining volume of renewable fuel for that RIN. Whereupon being exhausted to zero, a new stack index and associated RIN, if any are available, must be instantiated, or the system will automatically select and constrain B0 operation only (neat diesel).

Column nine represents the fossil fuel volume dispensed into the Flow Cell for that Flow Cell dispense operation.

Column ten represents GPS receiver status. In this example, sufficient satellites have been obtained for three-dimensional accuracy.

Columns eleven and twelve represent GPS latitude and longitude, respectively, at the time and place of that Flow Cell operation.

An example RIN Output File depicting B0 (neat diesel), B80 (20% diesel and 80% biodiesel blend), and B100 (neat biodiesel) operation within a moving vehicle follows. A fixed stack index remains throughout:

| | | | | | | | | | | | |
|---|---|---|---|---|---|---|---|---|---|---|---|
| D | Apr. 25, 2013 | 17:48:39 | 1-2013-3272-80011-40002-15-4-00000001-00000006 | B0  | 3.900 | 0.000 | 1.384 | 0.024 | 3D | 36.00046752 | −79.86668846 |
| D | Apr. 25, 2013 | 17:49:53 | 1-2013-3272-80011-40002-15-4-00000001-00000006 | B0  | 3.900 | 0.000 | 1.384 | 0.024 | 3D | 35.99798490 | −79.86535784 |
| D | Apr. 25, 2013 | 17:50:19 | 1-2013-3272-80011-40002-15-4-00000001-00000006 | B80 | 3.900 | 0.040 | 1.344 | 0.008 | 3D | 35.99397193 | −79.86995473 |
| D | Apr. 25, 2013 | 17:50:44 | 1-2013-3272-80011-40002-15-4-00000001-00000006 | B80 | 3.900 | 0.020 | 1.324 | 0.004 | 3D | 35.98961438 | −79.87717019 |
| D | Apr. 25, 2013 | 17:51:06 | 1-2013-3272-80011-40002-15-4-00000001-00000006 | B80 | 3.900 | 0.020 | 1.304 | 0.004 | 3D | 35.98612250 | −79.88303975 |
| D | Apr. 25, 2013 | 17:51:27 | 1-2013-3272-80011-40002-15-4-00000001-00000006 | B80 | 3.900 | 0.020 | 1.284 | 0.004 | 3D | 35.98236490 | −79.88761158 |
| D | Apr. 25, 2013 | 17:51:57 | 1-2013-3272-80011-40002-15-4-00000001-00000006 | B80 | 3.900 | 0.020 | 1.264 | 0.004 | 3D | 35.97480375 | −79.89115701 |
| D | Apr. 25, 2013 | 17:52:17 | 1-2013-3272-80011-40002-15-4-00000001-00000006 | B80 | 3.900 | 0.020 | 1.244 | 0.004 | 3D | 35.96936401 | −79.89253095 |
| D | Apr. 25, 2013 | 17:52:33 | 1-2013-3272-80011-40002-15-4-00000001-00000006 | B80 | 3.900 | 0.020 | 1.224 | 0.004 | 3D | 35.96505581 | −79.89361906 |
| D | Apr. 25, 2013 | 17:52:49 | 1-2013-3272-80011-40002-15-4-00000001-00000006 | B80 | 3.900 | 0.020 | 1.204 | 0.004 | 3D | 35.96070269 | −79.89499932 |
| D | Apr. 25, 2013 | 17:53:09 | 1-2013-3272-80011-40002-15-4-00000001-00000006 | B80 | 3.900 | 0.020 | 1.184 | 0.004 | 3D | 35.95541418 | −79.89752717 |
| D | Apr. 25, 2013 | 17:53:42 | 1-2013-3272-80011-40002-15-4-00000001-00000006 | B80 | 3.900 | 0.020 | 1.164 | 0.004 | 3D | 35.94666909 | −79.90180669 |
| D | Apr. 25, 2013 | 17:54:19 | 1-2013-3272-80011-40002-15-4-00000001-00000006 | B80 | 3.900 | 0.020 | 1.144 | 0.004 | 3D | 35.93901616 | −79.90830190 |
| D | Apr. 25, 2013 | 17:54:41 | 1-2013-3272-80011-40002-15-4-00000001-00000006 | B80 | 3.900 | 0.020 | 1.124 | 0.004 | 3D | 35.93578629 | −79.91381305 |
| D | Apr. 25, 2013 | 17:54:55 | 1-2013-3272-80011-40002-15-4-00000001-00000006 | B80 | 3.900 | 0.020 | 1.104 | 0.004 | 3D | 35.93359740 | −79.91757352 |
| D | Apr. 25, 2013 | 17:55:13 | 1-2013-3272-80011-40002-15-4-00000001-00000006 | B80 | 3.900 | 0.020 | 1.084 | 0.004 | 3D | 35.93073017 | −79.92249081 |
| D | Apr. 25, 2013 | 17:55:39 | 1-2013-3272-80011-40002-15-4-00000001-00000006 | B80 | 3.900 | 0.020 | 1.064 | 0.004 | 3D | 35.92685494 | −79.92911334 |
| D | Apr. 25, 2013 | 17:55:58 | 1-2013-3272-80011-40002-15-4-00000001-00000006 | B80 | 3.900 | 0.020 | 1.044 | 0.004 | 3D | 35.92387378 | −79.93422700 |
| D | Apr. 25, 2013 | 17:56:31 | 1-2013-3272-80011-40002-15-4-00000001-00000006 | B80 | 3.900 | 0.020 | 1.024 | 0.004 | 3D | 35.91934109 | −79.94196215 |
| D | Apr. 25, 2013 | 17:57:02 | 1-2013-3272-80011-40002-15-4-00000001-00000006 | B80 | 3.900 | 0.020 | 1.004 | 0.004 | 3D | 35.91363317 | −79.94867115 |
| D | Apr. 25, 2013 | 17:57:24 | 1-2013-3272-80011-40002-15-4-00000001-00000006 | B80 | 3.900 | 0.020 | 0.984 | 0.004 | 3D | 35.90841180 | −79.95162620 |
| D | Apr. 25, 2013 | 17:57:42 | 1-2013-3272-80011-40002-15-4-00000001-00000006 | B80 | 3.900 | 0.020 | 0.964 | 0.004 | 3D | 35.90409589 | −79.95402390 |

-continued

| | | | | | | | | | | |
|---|---|---|---|---|---|---|---|---|---|---|
| D | Apr. 25, 2013 17:58:08 | 1-2013-3272-80011-40002-15-4-00000001-00000006 | B80 | 3.900 | 0.020 | 0.944 | 0.004 | 3D | 35.89935417 | −79.95947201 |
| D | Apr. 25, 2013 17:58:30 | 1-2013-3272-80011-40002-15-4-00000001-00000006 | B80 | 3.900 | 0.020 | 0.924 | 0.004 | 3D | 35.89751794 | −79.96619893 |
| D | Apr. 25, 2013 17:58:47 | 1-2013-3272-80011-40002-15-4-00000001-00000006 | B80 | 3.900 | 0.020 | 0.904 | 0.004 | 3D | 35.89633177 | −79.97194166 |
| D | Apr. 25, 2013 17:59:11 | 1-2013-3272-80011-40002-15-4-00000001-00000006 | B80 | 3.900 | 0.020 | 0.884 | 0.004 | 3D | 35.89325058 | −79.97862928 |
| D | Apr. 25, 2013 17:59:28 | 1-2013-3272-80011-40002-15-4-00000001-00000006 | B80 | 3.900 | 0.020 | 0.864 | 0.004 | 3D | 35.89085982 | −79.98344086 |
| D | Apr. 25, 2013 17:59:51 | 1-2013-3272-80011-40002-15-4-00000001-00000006 | B100 | 3.900 | 0.020 | 0.844 | 0.004 | 3D | 35.88733123 | −79.99047012 |
| D | Apr. 25, 2013 18:00:22 | 1-2013-3272-80011-40002-15-4-00000001-00000006 | B100 | 3.900 | 0.024 | 0.820 | 0.000 | 3D | 35.88163024 | −79.99932338 |

Beneath is another example RIN Output File segment depicting one RIN Stack Index being depleted and type flagged "P" for "Processed" upon depletion, while another RIN from a previously queued RIN Stack Index is automatically selected, activated, and type flagged "I" for "Instantiated". Once instantiated, subsequent dispense operations into the Flow Cell are again type flagged "D" for "Dispense", and will continue as such until its volume is similarly depleted within that stack index, whereupon another queued stack index will be sought:

| | | | | | | | | | | |
|---|---|---|---|---|---|---|---|---|---|---|
| D | Apr. 25, 2013 18:14:40 | 1-2013-3272-80011-40002-15-4-00000001-00000006 | B100 | 3.900 | 0.024 | 0.076 | 0.000 | 3D | 35.83538485 | −80.13651823 |
| D | Apr. 25, 2013 18:14:50 | 1-2013-3272-80011-40002-15-4-00000001-00000006 | B100 | 3.900 | 0.024 | 0.052 | 0.000 | 3D | 35.83439079 | −80.13949686 |
| D | Apr. 25, 2013 18:15:08 | 1-2013-3272-80011-40002-15-4-00000001-00000006 | B100 | 3.900 | 0.048 | 0.004 | 0.000 | 3D | 35.83251835 | −80.14502620 |
| P | Apr. 25, 2013 18:15:19 | 1-2013-3272-80011-40002-15-4-00000001-00000006 | B100 | 3.900 | 0.004 | 0.000 | 0.000 | 3D | 35.83095025 | −80.14816743 |
| I | Apr. 25, 2013 18:15:19 | 1-2013-3272-80011-40004-15-4-00000001-00000015 | B100 | 10.140 | 10.120 | 10.120 | 0.000 | 3D | 35.83095025 | −80.14816743 |
| D | Apr. 25, 2013 18:15:29 | 1-2013-3272-80011-40004-15-4-00000001-00000015 | B100 | 10.140 | 0.024 | 10.096 | 0.000 | 3D | 35.82941847 | −80.15055021 |

While metrologically sufficient, an expanded RIN Output File embodiment could include the carry forward of one or more preferred data expansions within the RIN Stack data structure as aforementioned, those being feedstock type(s) pertaining to the renewable fuel product transfer, which may be a blend of various renewable fuels and/or may further be subdivided by various feedstocks used during fuel manufacture, $CO_2$ offset, fuel performance within a diesel engine, constraints, if any, of use within a diesel engine, clouding potential, and energy density per unit volume, or energy density equivalency to a standardized fuel.

More preferably however, preferred data expansions within the RIN Stack could be used to provide additional pre-calculated values within each RIN Output File row without requiring external reconciliation of data from multiple sources, including, but not limited to, computed $CO_2$ offset.

Again referring to a more preferred embodiment, an additional field containing a cryptographically secured digital signature or cryptographically secured hash of each row contents and/or the entire RIN Output File would aid in the detection of modification and/or fraud (RINs and $CO_2$ offset having financial value).

While an alternative fueling system can utilize both manual and semi-automated Bluetooth methods of RIN Output File transfer to a secondary device, it is highly preferred that this be accomplished by automated electronic means over a variety of media, including but not limited to wired and wireless methods, both upon demand in response to an action or command, or by automated initiation by the vehicle. As one example, RIN Output File reporting could be automatically initiated and transmitted when a RIN becomes fully detached.

The Map File primarily consists of elements contained within the RIN Output File, and consequently could be separately derived externally by using the RIN Output File. Being largely for visualization, additional information was pre-computed and also presented, those values within this example representing estimates using non-real-time data, and therefore not metrologically fungible; however, nothing is to preclude metrologically improved or metrologically accurate values from being introduced during Map File generation, both those from RIN Stack data field expansion, and/or the inputting of reasonably current (metrologically improved) or real-time market values (metrologically accurate at the time of Map File generation) for both RIN and $CO_2$ offset.

A Map File is constructed using Keyhole Markup Language (hereinafter, "KML") as a container for its data, and is capable of being uploaded to various mapping utilities, including Google Maps, wherefrom a rendering is produced with Points of Interest (hereinafter, "POI"). Hovering a cursor over, or otherwise selecting a POI reveals additional information, as was encoded within the KML.

POI information is denoted within KML as a "Placemark", including GPS coordinates, and associated title information, but not limited to, vehicle ID, time and date. Additional information can be included, but is not limited to, (partial) RIN identifier (originating from Stack Index), blend setting, renewable gallons consumed (originating from Stack Index), credits (estimated), CO2 offset POI to POI (estimated), RINs detached (originating from Stack Index), cumulative CO2 offset (estimated) for that RIN identifier (originating from RIN Stack Index), etc.

An example KML Map File follows. For brevity, the file has been truncated to include start, data and end, with deletions denoted by ellipsis:

```xml
<?xml version="1.0" encoding="UTF-8"?>
<kml xmlns="http://www.opengis.net/kml/2.2">
    <Document>
        <Placemark>
            <name>Vehicle IMX00001: 04-25-2013 08:55:22 AM</name>
            <description>
                <![CDATA[
                    <h1><font color="blue"><b>0000-00000-00000-0001, Blend B0</b></h1>
                    <p><font color="green"><b>Renewable 0.000Gal, Credits $0.00</b></font></p>
                    <p><font color="green"><b>POI-POI: CO2 Offset -0.0Kg, RIN 0.000</b></font></p>
                    <p><font color="green"><b>Total: CO2 Offset -0.0Kg, RIN 0.000</b></font></p>
                ]]>
            </description>
            <Point>
                <coordinates>-79.89979909,36.07816992</coordinates>
            </Point>
        </Placemark>
        <Placemark>
            <name>Vehicle IMX00001: 04-25-2013 08:56:18 AM</name>
            <description>
                <![CDATA[
                    <h1><font color="blue"><b>0000-00000-00000-0002, Blend B0</b></h1>
                    <p><font color="green"><b>Renewable 0.000Gal, Credits $0.00</b></font></p>
                    <p><font color="green"><b>POI-POI: CO2 Offset -0.0Kg, RIN 0.000</b></font></p>
                    <p><font color="green"><b>Total: CO2 Offset -0.0Kg, RIN 0.000</b></font></p>
                ]]>
            </description>
            <Point>
                <coordinates>-79.89750878,36.07697853</coordinates>
            </Point>
        </Placemark>
        . . .
        <Placemark>
            <name>Vehicle IMX00001: 04-25-2013 07:48:47 PM</name>
            <description>
                <![CDATA[
                    <h1><font color="blue"><b>3272-80011-40004-0223, Blend B50</b></h1>
                    <p><font color="green"><b>Renewable 0.012Gal, Credits $25.06</b></font></p>
                    <p><font color="green"><b>POI-POI: CO2 Offset -212.3Kg, RIN 0.018</b></font></p>
                    <p><font color="green"><b>Total: CO2 Offset -228.5Kg, RIN 19.487</b></font></p>
                ]]>
            </description>
            <Point>
                <coordinates>-79.89852665,36.08043222</coordinates>
            </Point>
        </Placemark>
        <Placemark>
            <name>Vehicle IMX00001: 04-25-2013 07:50:05 PM</name>
            <description>
                <![CDATA[
                    <h1><font color="blue"><b>3272-80011-40004-0224, Blend B50</b></h1>
                    <p><font color="green"><b>Renewable 0.012Gal, Credits $25.10</b></font></p>
                    <p><font color="green"><b>POI-POI: CO2 Offset -212.3Kg, RIN 0.018</b></font></p>
                    <p><font color="green"><b>Total: CO2 Offset -228.7Kg, RIN 19.505</b></font></p>
                ]]>
            </description>
            <Point>
                <coordinates>-79.89991282,36.07894155</coordinates>
            </Point>
        </Placemark>
    </Document>
</kml>
```

Figure 11:
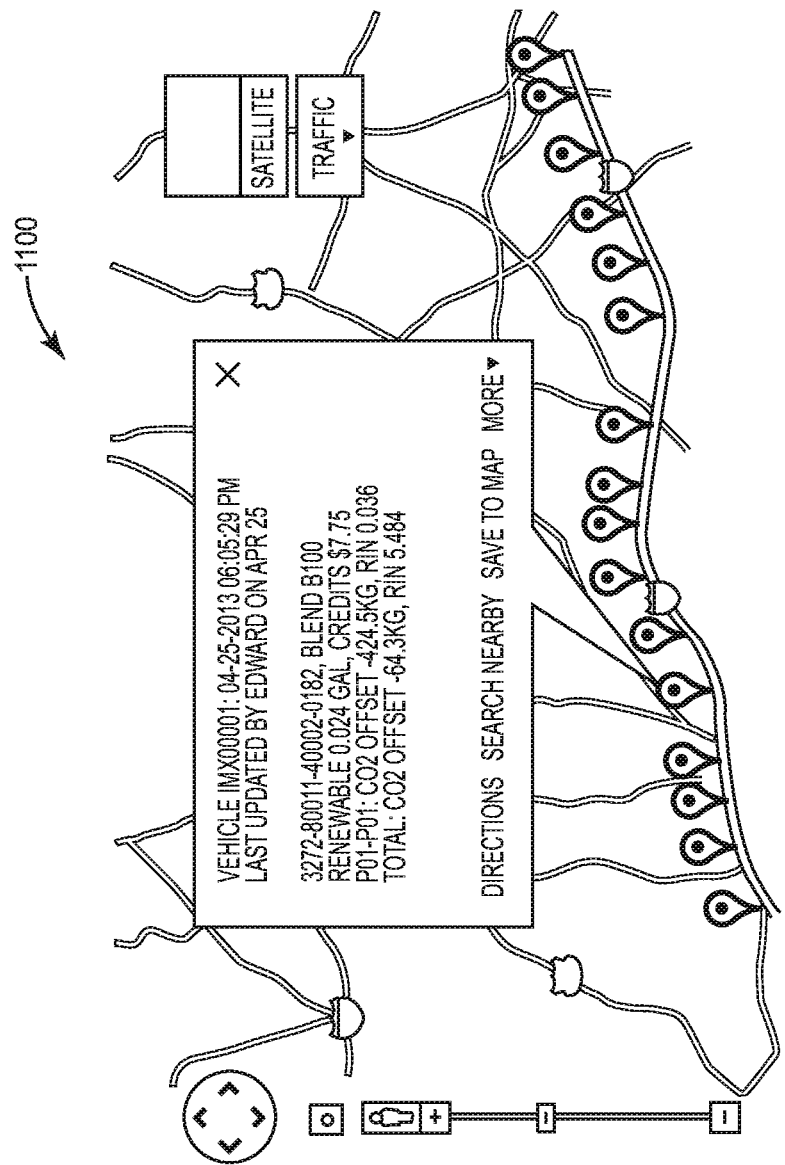
FIG. 11 is an example KML-encoded RIN Output File generated by an alternative fueling system that has been uploaded to and rendered by Google Maps, as an example.

Turning now to FIG. 11, an example KML-encoded RIN Output File as generated by alternative fueling system, uploaded to and rendered by Google Maps 1100. "Blend B100" means that no blending is taking place. It could alternatively state "B100 Neat".

Fundamentally, the RIN Stack is a stack or list structure to which RIN data pertaining to successive renewable fuel product transfers is added at the end of the stack and flagged as queued, while simultaneously, the fuel control system's state machine, seeking renewable fuel to consume, searches from index=1 until a queued RIN from a product transfer is found, flags it as active, and consumes from that index until it is depleted. Depletion is detected by subtracting the initial volume for that index until it reaches zero. Upon that index's depletion, it is then marked as being processed, and a new search beginning from index=1 is initiated to locate the next queued entry. If found, it is flagged active, and the process continues until and unless no more queued entries are found, whereby at such time use of renewable fuel is prohibited by the system.

During a prohibition period, the system continues to periodically scan in the background for a new queued entry, and if found, prohibitions to the use of renewable fuel are removed.

An embodiment of RIN Stack longitudinal data could also include the $CO_2$ offset potential associated with that RIN, or other variables allowing its determination, said offset potential varying according to feedstock and production methods, and then perform dynamic selection and de-selection (index swapping) according to geographic and jurisdictional criteria pertaining to additional credits for $CO_2$ offset beyond and separate of those provided by the retired RIN, whose credit if fixed regardless of feedstock and other offsetting factors. These dynamic selections and de-selections would be reflected within the RIN Output File, from which the metrologically significant data would be extracted, including the system geolocation at the time the more advantageous RIN(s) were detached.

A detailed description will be attempted by step-wise explanation of program flow pertaining to the RIN Stack. For simplicity, some code modules are omitted, however the entire source code is available by separate attachment.

During program initialization, if nonexistent, a RIN Stack file is created:

```
//-------------------------------------------------------------------------
// void instantiateRINStackFile(char *fileName) -- instantiate RIN Stack file
//-------------------------------------------------------------------------
void TForm1::instantiateRINStackFile(char *fileName)
{
  char dirName[FILE_NAME_BUFFER_SIZE];
  memset(dirName, 0, FILE_NAME_BUFFER_SIZE);
  strcpy(dirName, RIN_STACK_FILE_DIR);
  if(!DirectoryExists(dirName))    // create directory if required
  {
    CreateDir(dirName);
  }
  memset(fileName, 0, FILE_NAME_BUFFER_SIZE);
  createRINStackFileName(fileName);  // fixed name, not date dependent
  if(FileExists(fileName)) // if file already exists
  {
    RINStackFile->LoadFromFile(fileName);
  }
  else    // else create new RIN Stack file
  {
    RINStackFile->Clear( );
    RINStackFile->SaveToFile(fileName);
  }
}
```

The RIN Stack file is populated via a manual data entry form. The data entry form allows for RIN data associated with a product transfer to be entered by selecting "New RIN", entering the appropriate data, and then selecting "Enqueue RIN" to formally add it to the RIN Stack's file structure.

Figure 12:
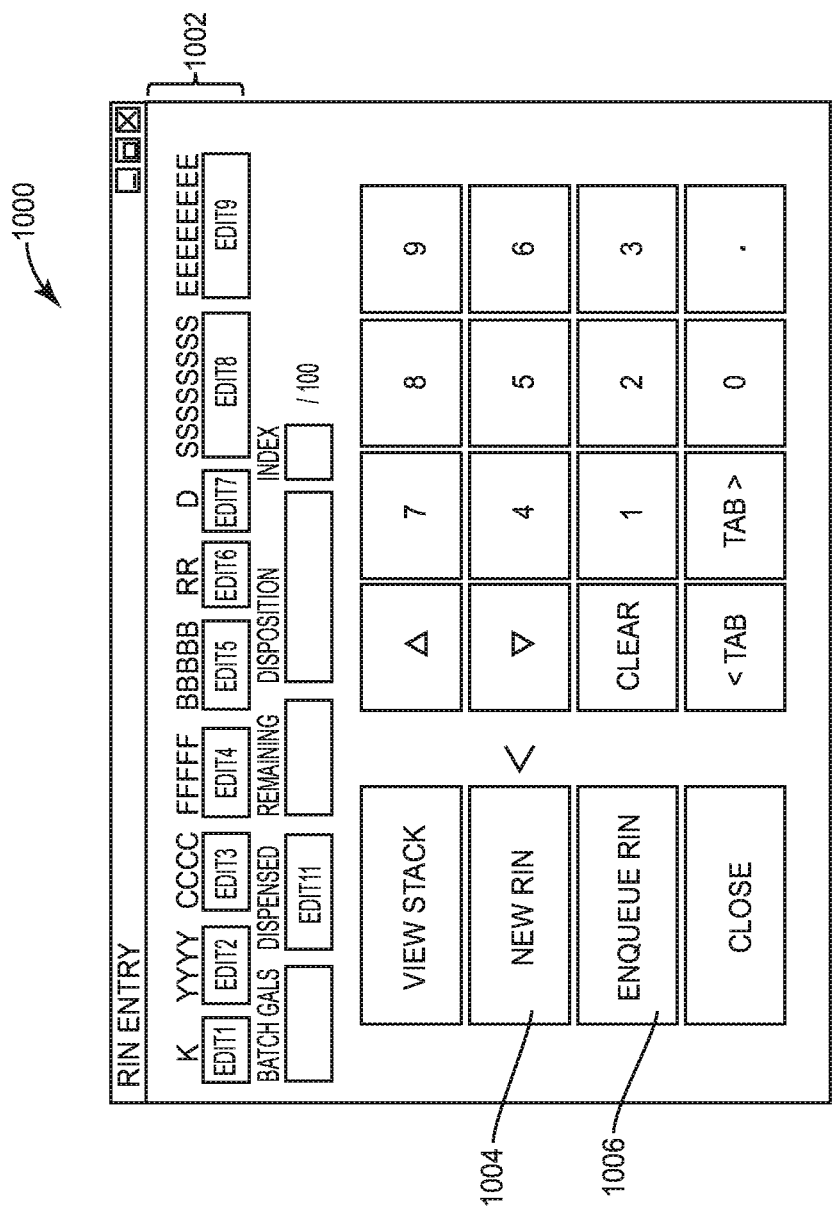
FIG. 12 is a diagram of an exemplary user interface that can be provided by an alternative fueling system to allow for manual entry of RIN entry.

Turning now to FIG. 12, the form is shown as captured from the compiler's Integrated Development Interface, with the pertinent data entry field objects being labeled Edit1, Edit2, etc.

The form is automatically parsed by software during user entry for completeness and against errors before the enablement of the "Enqueue RIN" button 1006; however for brevity this code has been omitted. Instead, the pertinent module that writes a new entry to the RIN Stack file is presented:

```
//-------------------------------------------------------------------------
// Function enqueueNewRIN(void)
//-------------------------------------------------------------------------
void TForm2::enqueueNewRIN(void)
{
  char buf[DT_BUFFER_SIZE], da[DT_BUFFER_SIZE],
    ti[DT_BUFFER_SIZE];
  String sDispo;
  getDateTimeStamp(da, ti);
  AnsiString sDa(da);
  AnsiString sTi(ti);
  if(RINStackFile->Count == 0)    // activate if first and only entry
    sDispo = "A";
  else
    sDispo = "Q";
  RINStackFile->Add(sDispo+","+Edit1->Text+"-"+Edit2->Text+"-"
    +Edit3->Text+"-"+Edit4->Text+"-"+Edit5->Text+"-"+Edit6->
    Text+"-"+Edit7->Text+"-"+Edit8->Text+"-"+Edit9->Text+","
    +Edit11->Text+","
    +Edit11->Text+","+sDa+","+sTi+",_/_/__,_:_:_");
  RINStackFile->SaveToFile(RINStackFileName);}
```

If there are no prior entries (file is empty), the initial entry logically has its disposition set to "A" active as there are no other RINs vying; however, transition from "Q" queued to "A" active may be and is similarly performed during instantiation.

While a manual and fully functional method of RIN entry has been shown, again, another embodiment would be automated via wired or wireless link, and be automatically initiated and completed during product transfer. Moreover, and again, if the RIN is not available at time of product transfer, a token would be transferred in lieu of the RIN, to be later reconciled, either within the vehicle, external to the vehicle (cloud), or both.

Having now described both file creation (if not prior existent), and a method capable of writing new RIN data associated with a product transfer, we now return to the system's software initialization; specifically, RIN instantiation.

During vehicle software initialization, the RIN Stack file is instantiated by a call to "instantiateRINQueue ( . . . )". At this point, a search is performed by a call to "indexToActiveRIN( . . . )", and if an active index is found, that index is stored in the global variable "RSActiveIndex" for convenient referenced by other modules. If an active index was not found, and a queued index is located, the queued index is transitioned to active, and that index is similarly stored in the global variable "RSActiveIndex".

A search is also performed during the call to "indexToActiveRIN( . . . )" to determine if a queued index is available beyond the current active index, and if so, the global variable "RSQueuedAvailable" is set true.

Note that success in activating an index whose K value is 1 (one) removes all renewable fuel use restrictions (all B-value selections are made available to the user), whereas activating an index whose K value is 2 (two) sets use restrictions that constrain system use to either neat biodiesel (B100), or neat diesel (B0).

```
//-------------------------------------------------------------------------
// void instantiateRINQueue(bool enableFullLogging)
//-------------------------------------------------------------------------
bool TForm1::instantiateRINQueue(bool enableFullLogging)
{
  bool instantiated = false;
  char buf[RIN_FIELD_BUFFER_SIZE];
  int indexPlusOne;
```

```
TDateTime dt;
AnsiString dateTime, RINNo;
typeRINStackKValue kValue;
switch(indexToActiveRIN(&RSActiveIndex, &RSStackLength, &RSQueuedAvailable))
   {
   case RS_ACTIVE:
      {
      dateTime = dt.CurrentDateTime( );
      RichEdit1->Lines->Add("S " + dateTime + " Active RIN Found And Instantiated");
      readIndexedRINNumber(&RSActiveIndex, buf);
      AnsiString RINNo(buf);
      RichEdit1->Lines->Add("S " + dateTime + " Active " + RINNo);
      instantiated = true;      // flag RIN instantiated
      readKValue(&RSActiveIndex, &kValue);
      switch(kValue)
         {
         case RS_K_RINS_PRESENT: // allow any blend, do not modify user blend setting
            {
            Button5->Enabled = true;     // B0
            Button6->Enabled = true;     // B20
            Button7->Enabled = true;     // B50
            Button8->Enabled = true;     // B80
            Button9->Enabled = true;     // B100
            break;
            }
         case RS_K_RINS_STRIPPED:        // allow only B0 and B100, modify blend setting
            {
            Button5->Enabled = true;     // B0
            Button6->Enabled = false;    // B20
            Button7->Enabled = false;    // B50
            Button8->Enabled = false;    // B80
            Button9->Enabled = true;     // B100
            userBlendSetting = 100; // set to B100
            DrawBlendSetting(userBlendSetting);
            DrawCellLevel(cellPercent, BlendColor(userBlendSetting));
            RichEdit1->Lines->Add("S " + dateTime + " K=2, Blending Is Prohibited");
            RichEdit1->Lines->Add("S " + dateTime + " B100 Neat Biodiesel Selected By System");
            break;
            }
         default:
            {
            Button5->Enabled = true;     // K value invalid, allow B0 only, modify blend setting
            Button6->Enabled = false;
            Button7->Enabled = false;
            Button8->Enabled = false;
            Button9->Enabled = false;
            userBlendSetting = 0;
            DrawBlendSetting(userBlendSetting);
            DrawCellLevel(cellPercent, BlendColor(userBlendSetting));
            dateTime = dt.CurrentDateTime( );
            RichEdit1->Lines->Add("S " + dateTime + " K Value Invalid");
            RichEdit1->Lines->Add("S " + dateTime + " B0 Neat Diesel Selected By System");
            RichEdit1->SetFocus( );
            RichEdit1->SelStart = RichEdit1->GetTextLen( );
            RichEdit1->Perform(EM_SCROLLCARET, 0, 0);
            break;
            }
         }
      if(RSQueuedAvailable == true)
         {
         RichEdit1->Lines->Add("S " + dateTime + " Queued RIN Found And Available");
         indexPlusOne = RSActiveIndex + 1;
         readIndexedRINNumber(&indexPlusOne, buf);
         AnsiString RINNo(buf);
         RichEdit1->Lines->Add("S " + dateTime + " Queued " + RINNo);
         }
      else
         {
         if(enableFullLogging == true)
            {
            RichEdit1->Lines->Add("S " + dateTime + " Queued RIN Not Available");
```

-continued

```
          }
        }
        RichEdit1->SetFocus( );
        RichEdit1->SelStart = RichEdit1->GetTextLen( );
        RichEdit1->Perform(EM_SCROLLCARET, 0, 0);
        break;
      }
      case RS_QUEUED:
      {
        writeDisposition(&RSActiveIndex, RS_ACTIVE, RINStackFileName);      // activate queued RIN
        instantiated = true;      // flag RIN instantiated
        batchCount = 0; // reset batch counter as new active RIN is instantiated
        dateTime = dt.CurrentDateTime( );
        RichEdit1->Lines->Add("S " + dateTime + " Queued RIN Found And Instantiated As Active");
        readIndexedRINNumber(&RSActiveIndex, buf);
        AnsiString RINNo(buf);
        RichEdit1->Lines->Add("S " + dateTime + " Active " + RINNo);
        readKValue(&RSActiveIndex, &kValue);
        switch(kValue)
        {
          case RS_K_RINS_PRESENT: // allow any blend, do not modify user blend setting
          {
            Button5->Enabled = true;       // B0
            Button6->Enabled = true;       // B20
            Button7->Enabled = true;       // B50
            Button8->Enabled = true;       // B80
            Button9->Enabled = true;       // B100
            break;
          }
          case RS_K_RINS_STRIPPED:        // allow only B0 and B100, modify blend setting
          {
            Button5->Enabled = true;       // B0
            Button6->Enabled = false;      // B20
            Button7->Enabled = false;      // B50
            Button8->Enabled = false;      // B80
            Button9->Enabled = true;       // B100
            userBlendSetting = 100; // set to B100
            DrawBlendSetting(userBlendSetting);
            DrawCellLevel(cellPercent, BlendColor(userBlendSetting));
            RichEdit1->Lines->Add("S " + dateTime + " K=2, Blending Is Prohibited");
            RichEdit1->Lines->Add("S " + dateTime + " B100 Neat Biodiesel Selected By System");
            break;
          }
          default:
          {
            Button5->Enabled = true;       // K value invalid, allow B0 only, modify blend setting
            Button6->Enabled = false;
            Button7->Enabled = false;
            Button8->Enabled = false;
            Button9->Enabled = false;
            userBlendSetting = 0;
            DrawBlendSetting(userBlendSetting);
            DrawCellLevel(cellPercent, BlendColor(userBlendSetting));
            if(enableFullLogging == true)
            {
              dateTime = dt.CurrentDateTime( );
              RichEdit1->Lines->Add("S " + dateTime + " K Value Invalid");
              RichEdit1->Lines->Add("S " + dateTime + " B0 Neat Diesel Selected By System");
              RichEdit1->SetFocus( );
              RichEdit1->SelStart = RichEdit1->GetTextLen( );
              RichEdit1->Perform(EM_SCROLLCARET, 0, 0);
            }
            break;
          }
        }
        RichEdit1->SetFocus( );
        RichEdit1->SelStart = RichEdit1->GetTextLen( );
        RichEdit1->Perform(EM_SCROLLCARET, 0, 0);
        break;
      }
      case RS_EMPTY:
```

```
      case RS_UNKNOWN:
      default:
        {
          Button5->Enabled = true;      // allow B0 only
          Button6->Enabled = false;
          Button7->Enabled = false;
          Button8->Enabled = false;
          Button9->Enabled = false;
          userBlendSetting = 0;
          DrawBlendSetting(userBlendSetting);
          DrawCellLevel(cellPercent, BlendColor(userBlendSetting));
          RSActiveIndex = 0;
          if(enableFullLogging == true)
          {
            dateTime = dt.CurrentDateTime( );
            RichEdit1->Lines->Add("S " + dateTime + " No Active Or Queued RIN
Found");
            RichEdit1->Lines->Add("S " + dateTime + " B0 Neat Diesel Selected By
System");
            RichEdit1->SetFocus( );
            RichEdit1->SelStart = RichEdit1->GetTextLen( );
            RichEdit1->Perform(EM_SCROLLCARET, 0, 0);
          }
          break;
        }
    }
    return instantiated;
}
```

The search for active and queued indexes, as was called above, was performed by "indexToActiveRIN( . . . )".

A reference to the RIN Stack structure is contained within comment delimiters beneath. Functions need merely index longitudinally to access the particular variable of interest:

```
//---------------------------------------------------------------------------
// int indexToActiveRIN(int *index, int *stkLen) -- auto index to active
// RIN and return stack index. If none active, returns the first queued RIN.
// Function returns status of search.
//---------------------------------------------------------------------------
int TForm1::indexToActiveRIN(int *index, int *stkLen, bool
*queuedAvailable)
{
  char *ptr, disposition[RIN_FIELD_BUFFER_SIZE];
  int i, j, result;
  String str1;
  // Q,K-YYYY-CCCC-FFFFF-BBBBB-RR-D-SSSSSSSSS-
EEEEEEEE,000.000,000.000,01/02/2013,14:01:02,01/03/2013,10:02:03
  //
0000000000000000000000000000000000000000000000000000000000000000
0000000000000000000000000000000000000000000000111
  //
00000000001111111111222222222233333333334444444444555555555
566666666667777777777888888888899999999990000
  //
01234567890123456789012345678901234567890123456789012345678
901234567890123456789012345678901234567890123
  if((*stkLen = RINStackFile->Count) > 0)
  {
    for(i = 0; i < *stkLen; i++)  // find active
    {
      memset(disposition 0, RIN_FIELD_BUFFER_SIZE);
      str1 = RINStackFile->Strings[i];
      ptr = str1.c_str( );
      for(j = 0; j < 1; j++)
        disposition[j] = *ptr++;
      if((disposition[0] == 'A') || (disposition[0] == 'Q'))
        break;
    }
    switch(disposition[0])   // display valid entry
    {
      case 'A':
        {
          result = RS_ACTIVE;
          break;
        }
      case 'Q':
        {
          result = RS_QUEUED;
          break;
        }
      case 'P':
        {
          result = RS_PROCESSED;
          break;
        }
      default:
        {
          result = RS_UNKNOWN;
          break;
        }
    }   // end switch
    *index = i + 1;
    if(i < *stkLen - 1)  // if another entry exists beyond the active RIN
    {
      str1 = RINStackFile->Strings[i + 1];
      ptr = str1.c_str( );
      for(j = 0; j < 1; j++)
        disposition[j] = *ptr++;
      if(disposition[0] == 'Q')    // test if queued
      {
        *queuedAvailable = true;
      }
      else
      {
        *queuedAvailable = false;
      }
    }
    else   // else no entry beyond active
    {
      *queuedAvailable = false;   // therefore false
    }
  }
  else   // else zero length queue table
  {
    *index = 0;
    result = RS_EMPTY;
  }
  return result;
}
```

Also called by "instantiateRINQueue( . . . )" was "read-KValue( . . . )" to determine the value of K associated with the active index.

For specifically reading the K value associated with the active index:

```
//---------------------------------------------------------------
// bool readKValue(int *index, typeRINStackKValue *kValue)
//---------------------------------------------------------------
bool TForm1::readKValue(int *index, typeRINStackKValue *kValue)
{
  bool result = false;
  char *ptr, kCh, recordBuf[STACK_RECORD_BUFFER_SIZE];
  String str1;
  // Q,K-YYYY-CCCC-FFFFF-BBBBB-RR-D-SSSSSSSS-
EEEEEEEE,000.000,000.000,01/02/2013,14:01:02,01/03/2013,10:02:03
  //
0000000000000000000000000000000000000000000000000000000000
0000000000000000000000000000000000000000000111
  //
000000000011111111112222222222333333333344444444445555555
5566666666667777777777888888888899999999999000
  //
01234567890123456789012345678901234567890123456789012345678
90123456789012345678901234567890123
  if((RINStackFile->Count > 0) && (*index > 0) && (*index <=
  RINStackFile->Count))
// if valid index
  {
    memset(recordBuf, 0, STACK_RECORD_BUFFER_SIZE);
    str1 = RINStackFile->Strings[*index - 1];   // string array index
starts at 0, *index starts at 1
    ptr = str1.c_str( );
    strcpy(recordBuf, ptr);
    kCh = recordBuf[2];
    switch (kCh)
    {
      case '1':
      {
        *kValue = RS_K_RINS_PRESENT;
        result = true;
        break;
      }
      case '2':
      {
        *kValue = RS_K_RINS_STRIPPED;
        result = true;
        break;
      }
      default:
      {
        *kValue = RS_K_UNKNOWN;
        break;
      }
    }
  }
  return result;
}
```

There is an entire class of similar functions for reading-from and writing-to various longitudinal elements within the active stack as pointed to by the global variable "RSActiveIndex" that function similarly to "readKValue( . . . )". For brevity, their associated source code will be omitted (but may be found attached). These functions include:

```
bool readIndexedRINNumber(int *index, char *RINNumber);
bool readIndexedShortRINNumber(int *index, char *shortRINNumber);
bool readIndexedVolumeDispensed(int *index, float *dispensed);
bool readIndexedVolumeRemaining(int *index, float *dispensed);
bool writeIndexedVolumeRemaining(int *index, float *dispensed,
char *filename);
bool clearIndexedVolumeRemaining(int *index, char *fileName);
bool writeProcessedDateTimeStamp(int *index, char *fileName);
bool readDisposition(int *index, typeRINStackDispositionValue *disp);
bool readDispositionCharacter(int *index, char *disp);
bool writeDisposition(int *index, typeRINStackDispositionValue disp,
char *filename);
bool readKValue(int *index, typeRINStackKValue *kValue);
bool writeKValue(int *index, typeRINStackKValue kValue, char
*filename);
```

If no active or queued index was found during program initialization, periodically the following is code segment is executed to make any product transfer available for immediate use:

```
// if no RIN instantiated, check periodically should a product transfer
occur
if(RINInstantiated == false)
{
  RINInstantiated = instantiateRINQueue(false);
}
```

Figure 13A:
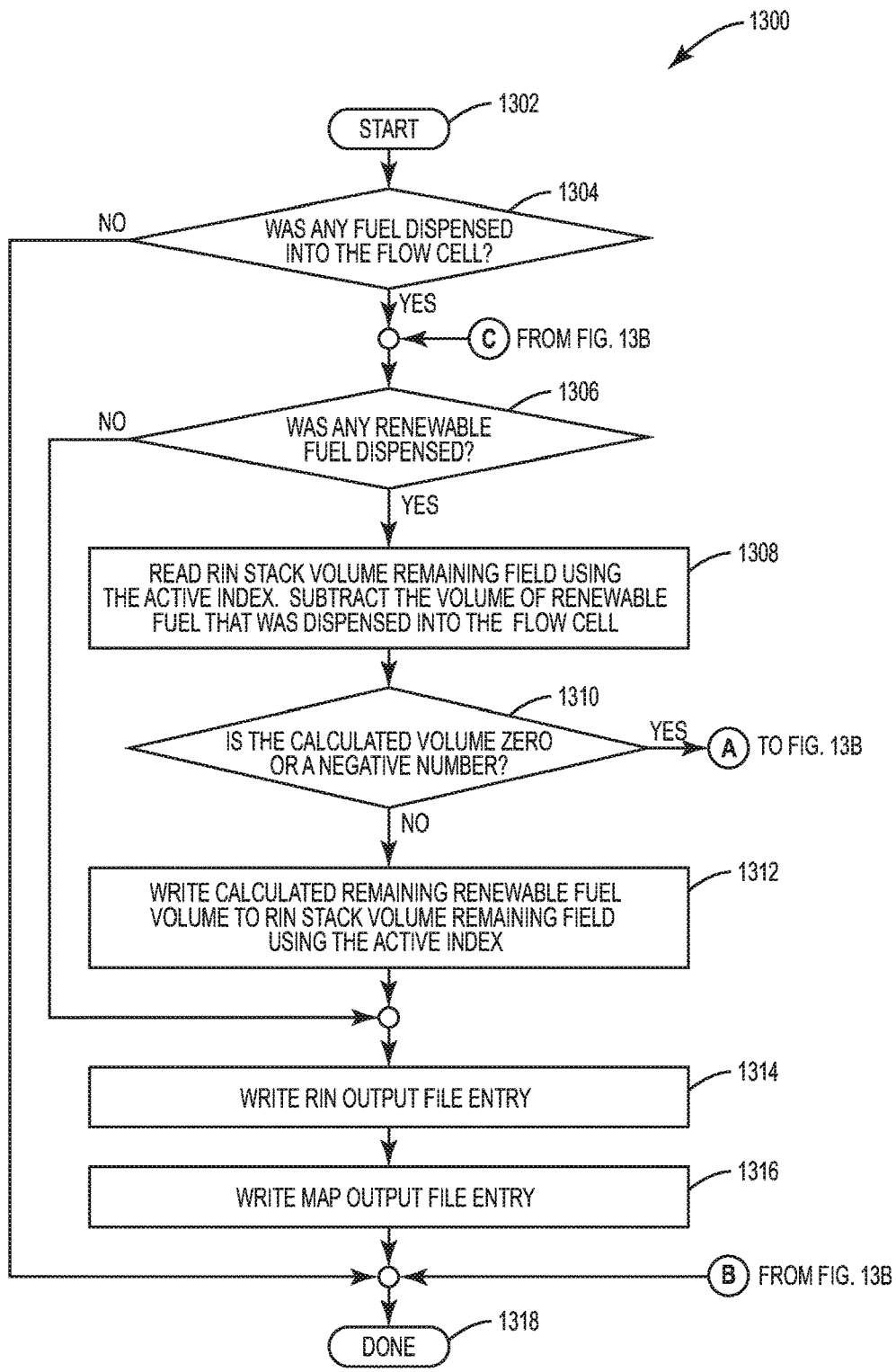
FIGS. 13A and 13B are a flowchart illustrating and exemplary process for RIN Stack utilization during vehicle in an alternative fueling system.
Figure 13B:
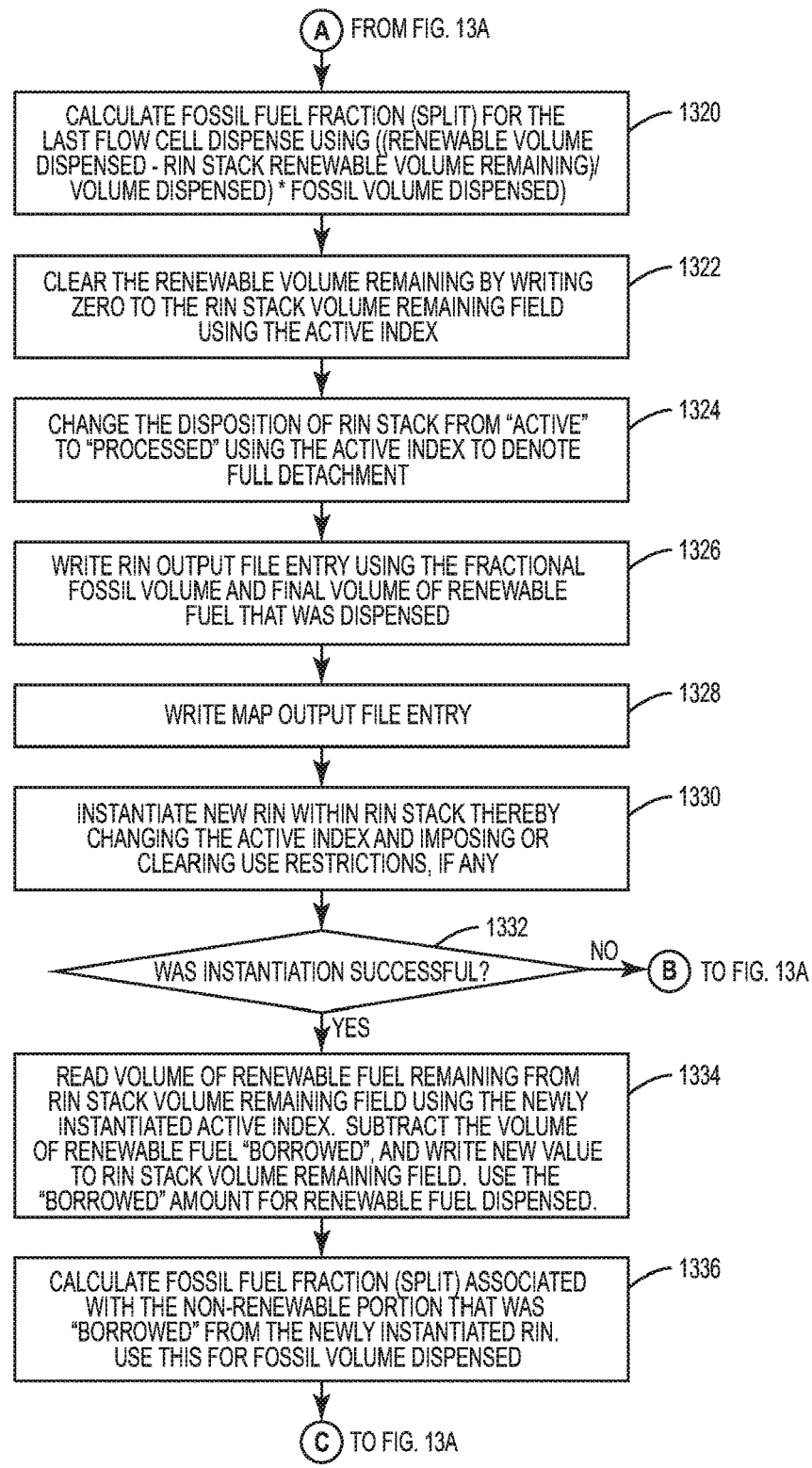

The flowchart in FIGS. 13A and 13B describes an exemplary process 1300 for RIN Stack utilization during vehicle operation that can be performed by any of the alternative fueling system described herein as an examples. The process 1300 may be carried out by any of the electronic controllers or control system disclosed herein, as examples.

With reference to FIGS. 13A and 13B, utilization of the RIN Stack is accomplished by a machine state that is transitioned through each time the Flow Cell has received fuel in response to a minimum level threshold having been detected, and then having reached a desired volume threshold from the dispense of either a fossil fuel, a renewable fuel, or combination thereof (blend). The corresponding volumes of each fuel type having been quantified during dispense are then made available via the variables local to all machine states.

Referring to the flowchart of FIG. 13A, the process starts (block 1302). If no fuel either fossil or renewable was dispensed to the Flow Cell (block 1304), the state is summarily existed without any action taken.

If a fuel dispensing was determined to be performed (block 1302), however involved no volume of renewable fuel to the Flow Cell, there is no need for RIN Stack management. Consequently, records are generated reflecting the fossil volume dispensed concurrent with no renewable volume dispensed, along with other nominal record fields.

If a fuel dispense to the Flow Cell was performed (block 1302), the process determines if such involved dispense of a volume of renewable fuel (block 1306). In this regard, the RIN Stack Volume Remaining field is read, the volume of renewable fuel dispensed is subtracted, thereby yielding a new volume remaining for that RIN, as pointed to by the active index to the RIN Stack (block 1308). If a positive volume remains for that RIN (block 1310), it is written to update the RIN Stack Volume Remaining field (block 1312), again as pointed to by the active index to the RIN Stack. Records are then generated reflecting the fossil volume dispensed, if any, concurrent renewable volume dispensed, the new volume remaining for the active RIN, along with other associated record fields (blocks 1314, 1316) and the process ends (block 1318).

If however the RIN Stack Volume Remaining field subtracted by of the volume of renewable fuel dispensed to the Flow Cell yields a zero or negative number (block 1310), this indicates that the RIN associated with RIN Stack as pointed to by the active index has been depleted, or moreover, renewable fuel may have been "borrowed" in advance from the next queued RIN. Consequently, two records must be generated, one for the newly depleted (and now fully detached) RIN, and one reflecting the renewable fuel "borrowed" from the next RIN, presently queued. Moreover, the fossil fuel co-dispensed, if any, must be divided (split) and appropriately proportioned across both records, reflecting the constant blend ratio for that dispense, if blending.

Specifically, the RIN Stack Volume Remaining value is subtracted from the renewable fuel dispensed into the flow cell (block 1320 in FIG. 13B), with this result further divided by the renewable fuel dispensed into the flow cell, thereby yielding the fractional volumetric contribution of the newly depleted RIN, a value from 0 to 100%, hereinafter the fossil fraction. The fossil fraction multiplied by the volume of fossil fuel co-dispensed yields the proper ratiometric volume of fossil fuel associated with the newly depleted RIN's final contributory volume. This value is kept as a temporary variable for record generation.

Closing of the newly depleted RIN is now performed by clearing (zeroing) the RIN Stack Volume Remaining field (block 1322), and then changing its disposition from "A" Active to "P" Processed by writing "P" into the RIN Stack Disposition Field for the active index (block 1324). Note that while the RIN was closed in part by appropriately zeroing its Volume Remaining field, the actual volume dispensed into the Flow Cell that subtracted it to this point is kept as a temporary variable for record generation.

Records may now be written reflecting the now volumetrically depleted (and fully detached) RIN stored within the RIN Stack, in conjunction with its "P" processed disposition, zero volume remaining, the final volume dispensed to achieve that depletion, the diesel fraction co-dispensed, if any, reflecting specified blend ratio, if blending, along with other associated informational fields (blocks 1326, 1328). With one RIN depleted, instantiation of the next queued RIN must be performed (block 1330).

If the instantiation is unsuccessful, i.e. there are no additional RINs available within the RIN Stack (block 1332); the program segment may exit (block 1318), as there are no additional actions or records to generate therefrom. Note also that the RIN instantiation function, when called, also imposes restrictions to the system during that call. Consequently, if no additional RINs exist, blending and/or neat consumption of renewable fuel is prohibited by the dispensing states. Consequently, if the RIN Stack utilization state is subsequently transitioned through with said restrictions, no renewable fuel will be involved, and the RIN Stack utilization state will merely document fossil fuel being dispensed singularly with no renewable fuel component.

If the instantiation is successful (block 1332), the RIN Stack active index will be pointing to a new RIN; however, fuel was possibly "borrowed" from this RIN from over-dispense of the previous RIN, and the RIN Stack Renewable Volume field must reflect this. Therefore, the RIN Stack Renewable Volume field is read from the new active index, the volume borrowed subtracted, and the resultant value is then written to the RIN Stack Renewable Volume field to accurately reflect the volume remaining for the new RIN (block 1334).

Records may now be written reflecting the newly instantiated RIN within the RIN Stack, in conjunction with instantiated or newly active disposition status, actual volume remaining, the borrowed volume dispensed to achieve that actual volume remaining, the diesel fraction co-dispensed with the "borrowed" volume, if any, reflecting specified blend ratio, if blending, along with other associated informational fields (block 1336).

The second and final record may be specifically coded prior to state exit, however as depicted within flow chart, by updating variables used to convey fossil and renewable volumes dispensed into the Flow Cell, those now being overwritten/replaced with the "borrowed" renewable volume and remaining fossil fraction volume, the program may re-enter at the point whereby the dispense of renewable fuel was tested, and progress forward, thereby generating the second record in similar execution manner as was the first.

This also provides an additional benefit that if the newly instantiated RIN has insufficient volume remaining for a single Flow Cell dispense, it will likewise be closed and another new RIN instantiated, all until all volume is precisely accounted for via multiple record generation. The exemplary associated RIN utilization state software code will now be presented. Once functional however, the RIN Stack methodology and structure itself, including subsequent modules for instantiating, constraining and permitting, reading-from and writing-to fields, all are well structured and suitable for documentation within the patent specification purposes.

Utilization of the RIN Stack is accomplished by a machine state, "CS_ACTIVE_RIN_MANAGEMENT", that is transitioned through each time the Flow Cell has received fuel in response to a minimum level threshold having been detected, and then having reached a desired volume threshold from the dispense of either a fossil fuel, renewable fuel, or combination thereof (blend). Those volumes having been quantified during dispense are then passed via the variables "renewableGallonsThisDispenseBatch" and "dieselGallonsThisDispenseBatch".

```
case CS_ACTIVE_RIN_MANAGEMENT:   // manage RIN stack, generate metrics for previous batch dispense
{
    if((renewableGallonsThisDispenseBatch > 0.001) || (dieselGallonsThisDispenseBatch >
0.001)) // if dispense event occurred
    {
      try
      {
        if(RINInstantiated == true)
        {
          readIndexedVolumeRemaining(&RSActiveIndex,
&renewableGallonsRemainingThisRIN);
             remaining = renewableGallonsRemainingThisRIN –
renewableGallonsThisDispenseBatch;   // biodiesel remaining in active RIN
             activeRINGallonsConsumed += renewableGallonsThisDispenseBatch;
        }
        else    // if no RIN
        {
          renewableGallonsRemainingThisRIN = 0.0;
```

```
            remaining = 0.0;
            activeRINGallonsConsumed = 0.0;
        }
    }
    catch(...)
    {
    }
    if((remaining > 0.0) || (RINInstantiated == false)) // if no need to process next
RIN
    {
        try
        {
          batchCount++;   // increment batch count
          if(RINInstantiated == true) // if something to write
          {
              writeIndexedVolumeRemaining(&RSActiveIndex, &remaining,
RINStackFileName);    // update volume remaining in active RIN
          }
          generateRINRecord(renewableGallonsThisDispenseBatch,
dieselGallonsThisDispenseBatch, "D", "Operational Batch");   // generate record
          generateMapRecord(renewableGallonsThisDispenseBatch, (RINDollarsAccrued +
endUserCreditDollarsAccrued + CaliforniaCO2CreditDollarsAccrued +
blendingCreditDollarsAccrued),
          (renewableGallonsThisDispenseBatch *
gramsCO2ReductionPerGallonBiodiesel),(renewableGallonsThisDispenseBatch * RINMultiplier),
CO2KilogramsAccrued, RINGallonsAccrued, batchCount);
          if(RINInstantiated == true) // if something to update
          {
              DrawRINQueue( ); // update RIN queue graphic
          }
          renewableGallonsThisDispenseBatch = 0.0;    // clear batch variables
          dieselGallonsThisDispenseBatch = 0.0;
        }
        catch(...)
        {
        }
        dateTime = dt.CurrentDateTime( );
        RichEdit1->Lines->Add("R " + dateTime + " RIN Records Generated
(CS_ACTIVE_RIN_MANAGEMENT)");
        RichEdit1->SetFocus( );
        RichEdit1->SelStart = RichEdit1->GetTextLen( );
        RichEdit1->Perform(EM_SCROLLCARET, 0, 0);
    }
    else   // else RIN stack index was exhausted or no RIN instantiated
    {
        // close out the previous RIN
        try
        {
          if(renewableGallonsThisDispenseBatch > 0.0001)
          {
            dieselFraction = renewableGallonsRemainingThisRIN /
renewableGallonsThisDispenseBatch;    // fraction of diesel allocated to exhausted blend
          }
          else
          {
            dieselFraction = 1.0;
          }
          clearIndexedVolumeRemaining(&RSActiveIndex, RINStackFileName);   // zero
remaining volume
          writeProcessedDateTimeStamp(&RSActiveIndex, RINStackFileName);    // time
stamp
          writeDisposition(&RSActiveIndex, RS_PROCESSED, RINStackFileName);   //
mark as processed
          generateRINRecord(renewableGallonsRemainingThisRIN,
(dieselGallonsThisDispenseBatch * dieselFraction), "P", "Processed Batch");    //
generate record ending this stack index
        }
        catch(...)
        {
        }
        dateTime = dt.CurrentDateTime( );
        RichEdit1->Lines->Add("D " + dateTime + " RIN Processed For This Stack Index
(CS_ACTIVE_RIN_MANAGEMENT)");
        RichEdit1->SetFocus( );
        RichEdit1->SelStart = RichEdit1->GetTextLen( );
        RichEdit1->Perform(EM_SCROLLCARET, 0, 0);
        // instantiate new RIN
```

```
            if(RSQueuedAvailable == true)
            {
              try
              {
                RINInstantiated = instantiateRINQueue(true);   // go to next active
and apply constraints
                batchCount++;   // increment batch count
                readIndexedVolumeDispensed(&RSActiveIndex, &initialDispensed);   // as
dispensed volume of new stack index
                initialOffset = initialDispensed + remaining;   // remaining is
negative value, borrowing fuel from the next stack index
                writeIndexedVolumeRemaining(&RSActiveIndex, &initialOffset,
RINStackFileName);   // now starting with corrected value
                generateRINRecord(initialOffset, (dieselGallonsThisDispenseBatch *
(1.0 − dieselFraction)), "I", "Instantiated Batch");   // generate record ending this stack
index
                if(RINInstantiated == true)
                {
                  DrawRINQueue( );   // update RIN queue graphic
                  if(soundUponDispenseEnable == true)
                  {
                    PlaySound("..\\Wav\\_NewRIN.wav", NULL, SND_ASYNC);
                  }
                }
                else
                {
                  EraseRINQueue( );
                }
              }
              catch(...)
              {
              }
              // new accrued variables reflect new RIN thus far
              try
              {
                resetAccrued( );   // reset accrued variables
                fossilGallonsAccrued += (dieselGallonsThisDispenseBatch * (1.0 −
dieselFraction));
                renewableGallonsAccrued += initialOffset;
                RINGallonsAccrued += (initialOffset * RINMultiplier);
                RINDollarsAccrued = RINGallonsAccrued * RINTypeD4BidValue;
                endUserCreditDollarsAccrued = renewableGallonsAccrued *
endUserCreditPerGallon;
                CO2KilogramsAccrued = (renewableGallonsAccrued *
gramsCO2ReductionPerGallonBiodiesel) / 1000.0;
                CaliforniaCO2CreditDollarsAccrued = (CO2KilogramsAccrued *
CaliforniaCO2CreditPerMetricTon) / 1000.0;
                if(userBlendSetting == B100)
                {
                  B100GallonsAccrued += initialOffset;   // log B100 gallons
                }
                if(userBlendSetting <= B80)
                {
                  blendingCreditDollarsAccrued += (initialOffset *
blendingCreditPerGallon);
                }
                UpdateDisplayVars( );   // update displayed variables
                generateMapRecord(initialOffset, (RINDollarsAccrued +
endUserCreditDollarsAccrued + CaliforniaCO2CreditDollarsAccrued +
blendingCreditDollarsAccrued),
                (initialOffset * gramsCO2ReductionPerGallonBiodiesel),(initialOffset
* RINMultiplier), CO2KilogramsAccrued, RINGallonsAccrued, batchCount);
                renewableGallonsThisDispenseBatch = 0.0;   // clear
                dieselGallonsThisDispenseBatch = 0.0;
              }
              catch(...)
              {
              }
              dateTime = dt.CurrentDateTime( );
              RichEdit1->Lines->Add("R " + dateTime + " RIN Records Generated
(CS_ACTIVE_RIN_MANAGEMENT)");
              RichEdit1->SetFocus( );
              RichEdit1->SelStart = RichEdit1->GetTextLen( );
              RichEdit1->Perform(EM_SCROLLCARET, 0, 0);
            }
            else
            {
              try
              {
```

```
          RINInstantiated = instantiateRINQueue(true);   // apply constraints
          resetAccrued( ); // reset accrued variables
          UpdateDisplayVars( );   // reset displayed accrued variables
          if(RINInstantiated == true)
             DrawRINQueue( );
          else
             EraseRINQueue( );
          renewableGallonsThisDispenseBatch = 0.0;   // clear
          dieselGallonsThisDispenseBatch = 0.0;
       }
       catch(...)
       {
       }
       dateTime = dt.CurrentDateTime( );
       RichEdit1->Lines->Add("R " + dateTime + " No RIN Found In Queue
(CS_ACTIVE_RIN_MANAGEMENT)");
       RichEdit1->SetFocus( );
       RichEdit1->SelStart = RichEdit1->GetTextLen( );
       RichEdit1->Perform(EM_SCROLLCARET, 0, 0);
      }
     }
   }
   cellState = CS_ACTIVE_TEST_LOWER_LEVEL;
   Timer1->Interval = TIMER_INTERVAL_FAST; // set interval timer
   break;
}    // end case CS_ACTIVE_RIN_MANAGEMENT
```

Both RIN Output File and RIN Output File filenames are derived dynamically to segment data across multiple files, thereby allowing the extraction of completed files by date.

To a fixed prefix name portion is appended the year, month and day. Upon program initialization, the associated filenames for that particular date are derived. If preexistent, they are loaded from memory with new data further appended, and resaved to memory upon each appending to assure the most recent data was captured should the system crash.

If non-preexistent for a given date, the files are created, saved (empty), with new data then appended, and resaved to memory upon each appending to assure the most recent data was captured should the system crash.

Addressing the RIN Output File, both instantiation and filename derivation are shown. Note that being CSV (Comma Separated Variable) formatted (to allow import by Microsoft Excel); a header row is appropriately created and appended as the first line:

```
//------------------------------------------------------------------------
// void instantiateRINOutputFile(char *fileName) -- instantiate RIN
Output file
//------------------------------------------------------------------------
void TForm1::instantiateRINOutputFile(char *fileName)
{
   char dateBuf[DATE_TIME_BUFFER_SIZE];
   char timeBuf[DATE_TIME_BUFFER_SIZE];
   char dirName[FILE_NAME_BUFFER_SIZE];
   memset(dirName, 0, FILE_NAME_BUFFER_SIZE);
   strcpy(dirName, RIN_OUTPUT_FILE_DIR);
   if(!DirectoryExists(dirName))    // create directory if required
   {
      CreateDir(dirName);
   }
   memset(fileName, 0, FILE_NAME_BUFFER_SIZE);
   createRINOutputFileName(fileName);   // if same day, returns same
name
   getDateTimeStamp(dateBuf, timeBuf);
   AnsiString sDate(dateBuf);
   AnsiString sTime(timeBuf);
   if(FileExists(fileName))  // if file already exists
   {
      RINOutputFile->Clear( );
      RINOutputFile->LoadFromFile(fileName);
```

```
      RINOutputFile->Add("C," + sDate + "," + sTime + ",,,,,,,,,," +
VERSION_COPYRIGHT);
      RINOutputFile->SaveToFile(fileName);
   }
   else   // else create new RIN output file
   {
      RINOutputFile->Clear( );
      RINOutputFile->Add(RIN_CSV_HEADER);
      RINOutputFile->Add("C," + sDate + "," + sTime + ",,,,,,,,,," +
VERSION_COPYRIGHT);
      RINOutputFile->SaveToFile(fileName);
   }
}
//------------------------------------------------------------------------
// void createRINOutputFileName(char *out) -- create RIN output file
name
//------------------------------------------------------------------------
void TForm1::createRINOutputFileName(char *out)
{
   char buf1[FILE_NAME_BUFFER_SIZE],
        buf2[FILE_NAME_BUFFER_SIZE];
   char *ptr, dirName[FILE_NAME_BUFFER_SIZE];
   int month, day, year, hour, minute, second;
   String str1;
   TDateTime dt;
   str1 = dt.CurrentDateTime( );
   ptr = str1.c_str( );
   memset(buf1, 0, FILE_NAME_BUFFER_SIZE);
   sscanf(ptr, "%d/%d/%d %d:%d:%d %s", &month, &day, &year,
&hour, &minute, &second, buf1);
   if (year < 2000)
      year += 2000;
   memset(dirName, 0, FILE_NAME_BUFFER_SIZE);
   memset(buf1, 0, FILE_NAME_BUFFER_SIZE);
   memset(buf2, 0, FILE_NAME_BUFFER_SIZE);
   strcpy(dirName, RIN_OUTPUT_FILE_DIR);
   strcpy(buf1, RIN_OUTPUT_FILE_PREFIX);
   strcpy(buf2, RIN_OUTPUT_FILE_SUFFIX);
   sprintf(out, "%s\\%s %d-%02d-%02d.%s", dirName, buf1, year,
   month, day, buf2);
}
```

Appending a new RIN Output record is accomplished by a function call. Some variables are passed locally, while others, such as RSActiveIndex, are global and therefore accessible anywhere within the system code. Note the use of the readIndexed( . . . ) group of function calls to access and read variables within the RIN Stack as pointed to by RSActiveIndex:

```
//-------------------------------------------------------------------------
// Function generateRINRecord(float RINGalsInitial, renewableGalsDispensed,
RINGalsConsumed)
//-------------------------------------------------------------------------
void TForm1::generateRINRecord(float renewableGalsDispensed, float dieselGalsDispensed,
char *recordType, char *comment)
{
    float activeRINGallonsInitial, activeRINGallonsRemaining;
    char buf[RIN_FIELD_BUFFER_SIZE], st[LAT_LON_BUFFER_SIZE];
    char da[DATE_TIME_BUFFER_SIZE], ti[DATE_TIME_BUFFER_SIZE];
    char la[LAT_LON_BUFFER_SIZE], lo[LAT_ION_BUFFER_SIZE];
    char al[LAT_LON_BUFFER_SIZE];
    getDateTimeStamp(da, ti);
    getStatusAndPosition (st, la, lo, al);
    AnsiString sDa(da);
    AnsiString sTi(ti);
    AnsiString sSt(st);
    AnsiString sLa(la);
    AnsiString sLo(lo);
    memset(buf, 0, RIN_FIELD_BUFFER_SIZE);   // for RIN or RIN status
    if(RINInstantiated == true) // if active RIN
    {
        readIndexedVolumeDispensed(&RSActiveIndex, &activeRINGallonsInitial);
        readIndexedVolumeRemaining(&RSActiveIndex, &activeRINGallonsRemaining);
        readIndexedRINNumber(&RSActiveIndex, buf);
    }
    else
    {
        activeRINGallonsInitial = 0.0;
        activeRINGallonsRemaining = 0.0;
        strcpy(buf, "None Instantiated");
    }
    AnsiString sRIN(buf);   // RIN number or RIN status
    memset(buf, 0, RIN_FIELD_BUFFER_SIZE);
    sprintf(buf, "B%d", userBlendSetting);
    AnsiString sBlend(buf);
    memset(buf, 0, RIN_FIELD_BUFFER_SIZE);
    sprintf(buf, "%1.4f", activeRINGallonsInitial);
    AnsiString sInit(buf);
    memset(buf, 0, RIN_FIELD_BUFFER_SIZE);
    sprintf(buf, "%1.4f", renewableGalsDispensed);
    AnsiString sRDisp(buf);
    memset(buf, 0, RIN_FIELD_BUFFER_SIZE);
    sprintf(buf, "%1.4f", activeRINGallonsRemaining);
    AnsiString sRemain(buf);
    memset(buf, 0, RIN_FIELD_BUFFER_SIZE);
    sprintf(buf, "%1.4f", dieselGalsDispensed);
    AnsiString sDDisp(buf);
    AnsiString sRec(recordType);
    AnsiString sCom(comment);
    RINOutputFile->Add(sRec + "," + sDa + "," + sTi + "," sRIN + "," + sBlend + "," +
sInit + "," + sRDisp + "," + sRemain + "," + sDDisp + "," + sSt + "," + sLa + "," + sLo +
"," + sCom);
    RINOutputFile->SaveToFile(RINOutFileName);
}
```

Addressing the RIN Output File, both instantiation and filename derivation are shown. Note that it being a KML file for import into map rendering software and/or websites such as Google Maps, both the KML header and delimiter structure is appended at file instantiation, with the vehicle data inserted between header and delimiter via function call:

```
//-------------------------------------------------------------------------
// void instantiateMapOutputFile(char *fileName) -- instantiate mapping output file
//-------------------------------------------------------------------------
void TForm1::instantiateMapOutputFile(char *fileName)
{
    char dateBuf[DATE_TIME_BUFFER_SIZE];
    char timeBuf[DATE_TIME_BUFFER_SIZE];
    char dirName[FILE_NAME_BUFFER_SIZE];
    memset(dirName, 0, FILE_NAME_BUFFER_SIZE);
    strcpy(dirName, MAPPING_OUTPUT_FILE_DIR);
    if(!DirectoryExists(dirName))   // create directory if required
    {
        CreateDir(dirName);
    }
    memset(fileName, 0, FILE_NAME_BUFFER_SIZE);
    createMapOutputFileName(fileName);   // if same day, returns same name
    getDateTimeStamp(dateBuf, timeBuf);
```

```
   AnsiString sDate(dateBuf);
   AnsiString sTime(timeBuf);
   if(FileExists(fileName)) // if file already exists
   {
      MapOutputFile->LoadFromFile(fileName);
   }
   else   // else create new map output file
   {
      MapOutputFile->Clear( );
      MapOutputFile->Add("<?xml version=\"1.0\" encoding=\"UTF-8\"?>");
      MapOutputFile->Add("<kml xmlns=\"http://www.opengis.net/kml/2.2\">");
      MapOutputFile->Add("   <Document>");
      MapOutputFile->Add("   </Document>");
      MapOutputFile->Add("</kml>");
      MapOutputFile->SaveToFile(fileName);
   }
}
//---------------------------------------------------------------------------
// void createMapOutputFileName(char *out) -- create RIN output file name
//---------------------------------------------------------------------------
void TForm1::createMapOutputFileName(char *out)
{
   char buf1[FILE_NAME_BUFFER_SIZE], buf2[FILE_NAME_BUFFER_SIZE];
   char *ptr, dirName[FILE_NAME_BUFFER_SIZE];
   int month, day, year, hour, minute, second;
   String str1;
   TDateTime dt;
   str1 = dt.CurrentDateTime( );
   ptr = str1.c_str( );
   memset(buf1, 0, FILE_NAME_BUFFER_SIZE);
   sscanf(ptr, "%d/%d/%d %d:%d:%d %s", &month, &day, &year, &hour, &minute, &second, buf1);
   if (year < 2000)
      year += 2000;
   memset(dirName, 0, FILE_NAME_BUFFER_SIZE);
   memset(buf1, 0, FILE_NAME_BUFFER_SIZE);
   memset(buf2, 0, FILE_NAME_BUFFER_SIZE);
   strcpy(dirName, MAPPING_OUTPUT_FILE_DIR);
   strcpy(buf1, MAPPING_OUTPUT_FILE_PREFIX);
   strcpy(buf2, MAPPING_OUTPUT_FILE_SUFFIX);
   sprintf(out, "%s\\%s %d-%02d-%02d.%s", dirName, buf11, year, month, day, buf2);
}
```

Generation of map records is accomplished by insertion of data. Most data is passed as function arguments, however GPS geolocation data is executed within a different thread, with the most recent status and position available via function call to getStatusAndPosition( . . . ):

```
//---------------------------------------------------------------------------
// Function generateMapRecord(float renewableGalsDispensed, float credits,
// float incrementalCO2, float incrementalRIN, float batchCO2, float batchRIN, int
batchCount)
//---------------------------------------------------------------------------
void TForm1::generateMapRecord(float renewableGalsDispensed, float credits, float
incrementalCO2, float incrementalRIN, float batchCO2, float batchRIN, int batchCount)
{
   char buf[RIN_FIELD_BUFFER_SIZE], st[LAT_ION_BUFFER_SIZE];
   char da[DATE_TIME_BUFFER_SIZE], ti[DATE_TIME_BUFFER_SIZE];
   char la [LAT_LON_BUFFER_SIZE], lo[LAT_LON_BUFFER_SIZE];
   char sr[RIN_FIELD_BUFFER_SIZE], al[LAT_LON_BUFFER_SIZE];
   char vn[RIN_FIELD_BUFFER_SIZE];
   int insertIndex;
   // prepare data
   getDateTimeStampAMPM(da, ti);
   getStatusAndPosition(st, la, lo, al);
   memset(vn, 0, RIN_FIELD_BUFFER_SIZE);
   strcpy(vn, VEHICLE_ID);
   memset(sr, 0, RIN_FIELD_BUFFER_SIZE);
   if(RINInstantiated == true) // if active RIN
   {
      readIndexedShortRINNumber(&RSActiveIndex, sr);
   }
   else   // else supply zeros for fields
   {
      strcpy(sr, "0000-00000-00000");
```

```
}
AnsiString sDa(da); // date
AnsiString sTi(ti); // time
AnsiString sLa(la); // latitude
AnsiString sLo(lo); // longitude
AnsiString sVn(vn); // vehicle ID
memset(buf, 0, RIN_FIELD_BUFFER_SIZE);   // user blend setting
sprintf(buf, "RIN# %s, µB# %d, B%d", sr, batchCount, userBlendSetting);
AnsiString cData1(buf);
if(renewableGalsDispensed > 0.1)
{
    memset(buf, 0, RIN_FIELD_BUFFER_SIZE);   // renewable gals dispensed
    sprintf(buf, "Renewable %1.1fGal, Credits $%1.2f", renewableGalsDispensed,
credits);
}
else
{
    memset(buf, 0, RIN_FIELD_BUFFER_SIZE);   // renewable gals dispensed
    sprintf(buf, "Renewable %1.3fGal, Credits $%1.2f", renewableGalsDispensed,
credits);
}
AnsiString cData2(buf);
if(incrementalRIN > 0.1)
{
    memset(buf, 0, RIN_FIELD_BUFFER_SIZE);   // incremental C02, RIN
    sprintf(buf, "\"POI-POI: CO2 Offset %1.1fKg, RIN %1.1f\"", incrementalCO2,
incrementalRIN);
}
else
{
    memset(buf, 0, RIN_FIELD_BUFFER_SIZE);   // incremental C02, RIN
    sprintf(buf, "POI-POI: CO2 Offset %1.1fKg, RIN %1.3f", incrementalCO2,
incrementalRIN);
}
AnsiString cData3(buf);
if(incrementalRIN > 0.1)
{
    memset(buf, 0, RIN_FIELD_BUFFER_SIZE);   // batch C02, RIN
    sprintf(buf, "Total: CO2 Offset %1.1fKg, RIN %1.1f", batchCO2, batchRIN);
}
else
{
    memset(buf, 0, RIN_FIELD_BUFFER_SIZE);   // batch C02, RIN
    sprintf(buf, "Total: CO2 Offset %1.1fKg, RIN %1.3f", batchCO2, batchRIN);
}
AnsiString cData4(buf);
// write elements
insertIndex = MapOutputFile->Count - 2; // point of line insertions
MapOutputFile->Insert(insertIndex++, "      <Placemark>");
MapOutputFile->Insert(insertIndex++, "        <name>" + sVn + ": " + sDa + " " + sTi +
"</name>");
MapOutputFile->Insert(insertIndex++, "        <description>");
MapOutputFile->Insert(insertIndex++, "          <![CDATA[");
MapOutputFile->Insert(insertIndex++, "            <h1><font color=\"blue\"><b>" +
cData1 + "</b></h1>");
MapOutputFile->Insert(insertIndex++, "            <p><font color=\"green\"><b>" +
cData2 + "</b></font></p>");
MapOutputFile->Insert(insertIndex++, "            <p><font color=\"green\"><b>" +
cData3 + "</b></font></p>");
MapOutputFile->Insert(insertIndex++, "            <p><font color=\"green\"><b>" +
cData4 + "</b></font></p>");
MapOutputFile->Insert(insertIndex++, "          ]]>");
MapOutputFile->Insert(insertIndex++, "        <description>");
MapOutputFile->Insert(insertIndex++, "      </Point>");
MapOutputFile->Insert(insertIndex++, "        <coordinate>" + sLo + "," + sLa +
"</coordinates>");
MapOutputFile->Insert(insertIndex++, "      </Point>");
MapOutputFile->Insert(insertIndex, "      </Placemark>");
MapOutputFile->SaveToFile(MapOutFileName);
}
```

Figure 14:
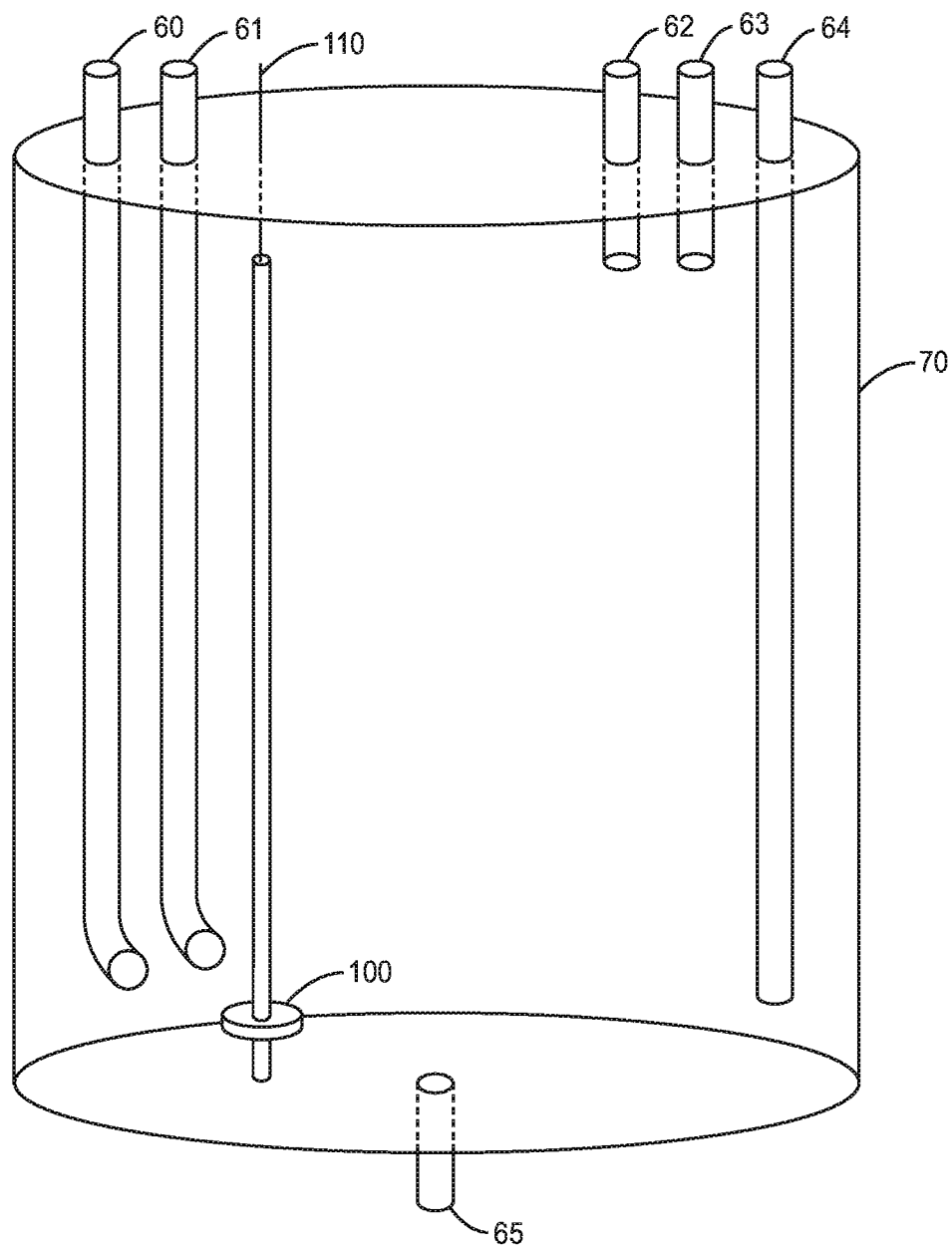
FIG. 14 is a schematic diagram of a flow cell according to an embodiment of the present disclosure, the flow cell shown ascertaining quantity of fuel within by a volume sensor.

Referring now to the drawings and, in particular, to FIG. 14, there is shown a fuel flow cell system 10 comprising flow cell 70 as was referenced by various embodiments and examples preceding.

Within the embodiment of flow cell system 10 depicted in FIG. 14, flow cell 70 serves to provide a limited reservoir of fuel for engine consumption, serving a both sourcing point of single fuel type, selected fuel type and/or blended fuel to the engine fuel system and also for the acceptance and receipt of engine fuel bypass, if and as required.

Flow cell 70 includes at least one fuel inlet. Two fuel inlets, specifically fuel inlet line 60 and fuel inlet line 61, are present as depicted in FIG. 14. Said inlets may introduce fuel into the volume of flow cell 70 in many manners, however it is desired to shape and/or place such inlets as to encourage mixing, if and as required, and to also ameliorate foaming and/or air entrainment within fuel.

Flow cell 70 includes at least one fuel outlet. One fuel outlet, specifically fuel outlet line 64, is depicted in FIG. 14. Said outlets may remove fuel from the volume of flow cell 70 in many manners, however it is desirable to shape and/or place such outlets as to permit extraction with minimal volume of fuel remaining within flow cell 70, however also as not to allow water, if present, to extracted by the outlet, but instead be allowed to separate to the bottom of flow cell 70 by virtue of higher density under the effect of gravity, such that any water may accumulate to limited degree before being at risk of being extracted by fuel outlet line 64.

Flow cell 70 may include at least one bypass fuel return inlet. One bypass fuel return inlet, specifically bypass fuel return line 63, is depicted in FIG. 14. Said bypass fuel return inlets may reintroduce bypassed fuel into the volume of flow cell 70 in many manners, however it is desired to shape and/or place such inlets as to both encourage mixing if required, and to also ameliorate foaming and/or air entrainment within fuel.

Flow cell 70 may include at least one vent to maintain the ullage within flow cell 70 at atmospheric pressure, other desired pressure or vacuum, or for scavenge of vapor, if any. One venting method, specifically vent port line 62, is depicted in FIG. 14. Said venting may of flow cell 70 may be accomplished in many manners, however it is desired to shape and/or place such venting as to prevent fuel introduction, and instead only expose the vent to ullage space within flow cell 70 under normal operation conditions.

Flow cell 70 may include at least one drain for the removal of water as may become entrained within fuel yet separated by density and gravity, or the removal of sum contents for servicing. One drainage method, specifically drain line 65, is shown in FIG. 14. Said drainage may be performed in many manners, however it is desirable to place the drain outlet at the lowest gravitational point within flow cell 70, and furthermore that the bottom surface of flow cell 70 be conical or sloped as to further facilitate drainage of density and/or gravity separated media. In normal construct, drain line 65 connects to a valve that remains closed during normal operation, and manually and/or automatically opened, if and as required.

Also within the embodiment of flow cell system 10 depicted in FIG. 14, flow cell 70 includes volume measurement device 100 with output signal line 110. Volume measurement device 100 may any device suitable for direct or inferential volume measurement, including but not limited to float, Archimedes principal, mass of fuel, or tare mass of fuel and flow cell combined. Volume measurement device 100 may be continuous in its measurement, or quantized. Volume measurement device 100 may also provide linear and/or digital output via signal line 110.

An electronic controller may input the volume contained or rate of volume change within flow cell 70 as indicated by measurement device 100 via signal line 110 to maintain a sufficient reservoir of neat, selected or blended fuel for engine consumption as demanded by the engine.

An electronic controller may by delivery of a single fuel type or sequential delivery of a primary fuel and an alternate fuel ascertain the volume of fuel transferred to flow cell 70 by measurement device 100 via signal line 110 to for a variety of control metric, financial and regulatory purposes, including but not limited to a feedback mechanism for effecting the desired blend ratio, the tabulation of primary fuel and alternate fuel metered, the ratio of blend at which it occurred, or verification of neat operation if prescribed.

Figure 15:
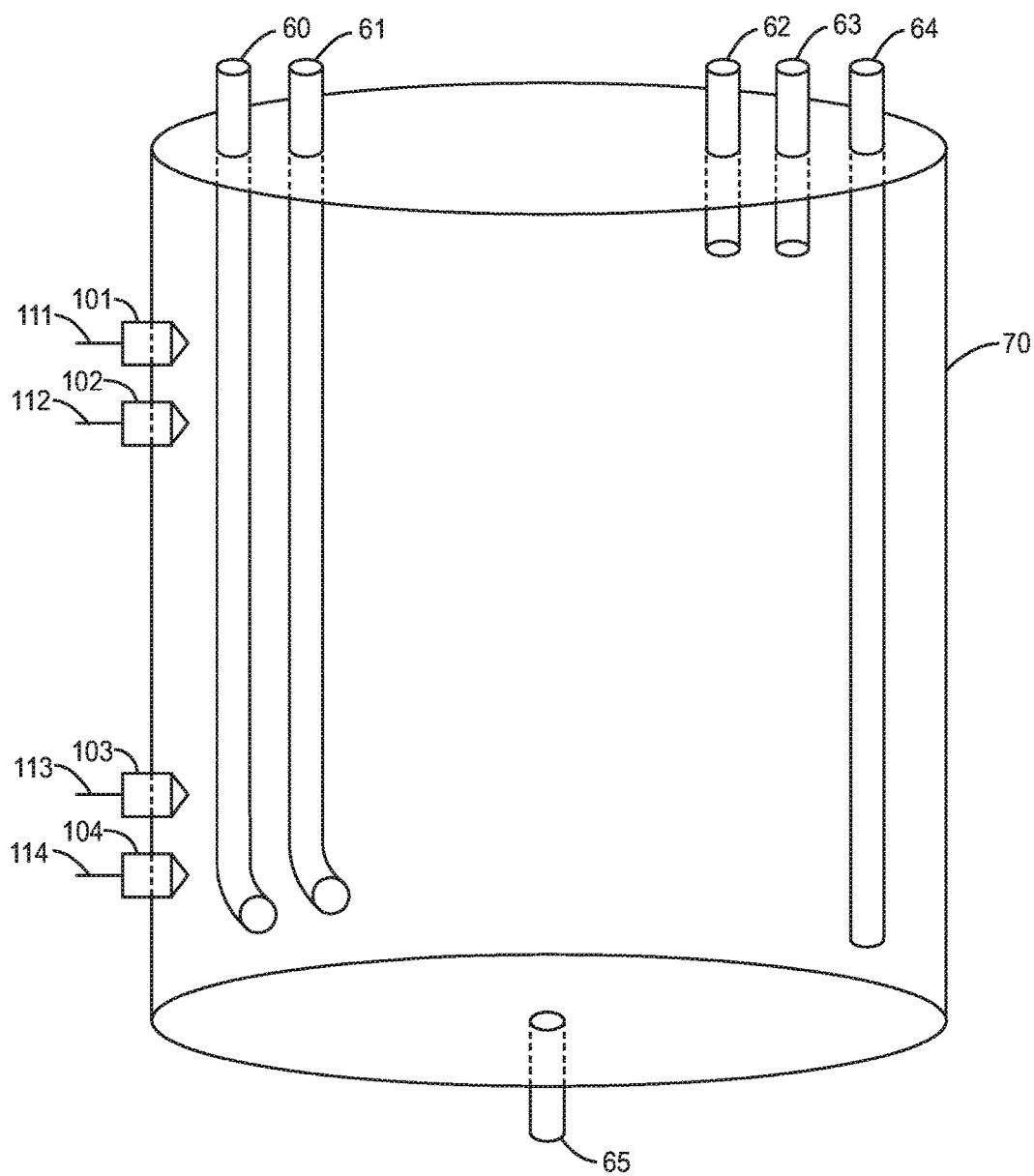
FIG. 15 is a schematic diagram of a flow cell according to an embodiment of the present disclosure, the flow cell shown ascertaining quantity of fuel within by at least one discrete volume sensor.

Referring now to the drawings and, in particular, to FIG. 15, there is shown a fuel flow cell system 11 comprising flow cell 70 as was referenced by the embodiments and examples preceding.

Unless otherwise specifically stated, fuel flow cell system 11 depicted in FIG. 11 inherits identical elements and corresponding functional descriptions as fuel flow cell system 10 depicted in FIG. 14, with like numbers referring to like elements throughout.

The fuel flow cell system 11 depicted in FIG. 15 differs from fuel control system 10 depicted in FIG. 14 in that measurement device 100 has been deleted and replaced by a at least one level detection devices to ascertain volume by displacement of fuel within flow cell 70. Four such level detection devices are shown in FIG. 15, specifically level detection devices 101, 102, 103 and 104.

While identical functionality can be obtained via measurement device 100 from fuel control system 10 depicted in FIG. 14, a plurality of level detection devices 101, 102, 103 and 104. within fuel flow cell system 11 depicted in FIG. 15 allow the implementation of a simplified fuel cell volume control method whereby volume is maintained within predetermined quantized levels, specifically as bounded by level detection sensor 103 as a minimum volume, and level detection sensor 102 as a maximum volume. As an example, as fuel is removed from flow cell 70 via fuel outlet line 64, at some point the fuel level will fall beneath level detection device 103, as communicated to an electronic controller via signal line 113, whereupon fuel of single fuel type, or sequential or simultaneous delivery of a primary fuel and an alternate fuel may be effected via fuel inlet lines 60 and/or 61 until level detection sensor 102, as communicated to an electronic controller via signal line 112, indicates a maximum volume has been achieved. As fuel is again removed from flow cell 70 via fuel outlet line 64, at some point the fuel level will again fall beneath level detection device 103, whereupon the cycle is repeated. And so on.

Level detection device 104, as communicated to an electronic controller via signal line 114, may be employed to detect the failure of level detection device 103, thus preventing flow cell 70 depletion of fuel. Level detection device 104, as communicated to an electronic controller via signal line 114, may further serve as a substitute for level detection device 103 until repair is made, thus allowing continued use of system operation.

Similarly, level detection device 101, as communicated to an electronic controller via signal line 111, may be employed to detect the failure of level detection device 102, thus preventing flow cell 70 overflow. Level detection device 101, as communicated to an electronic controller via signal line 111, may further serve as a substitute for level detection device 102 until repair is made, thus allowing continued use of system operation.

Figure 16:
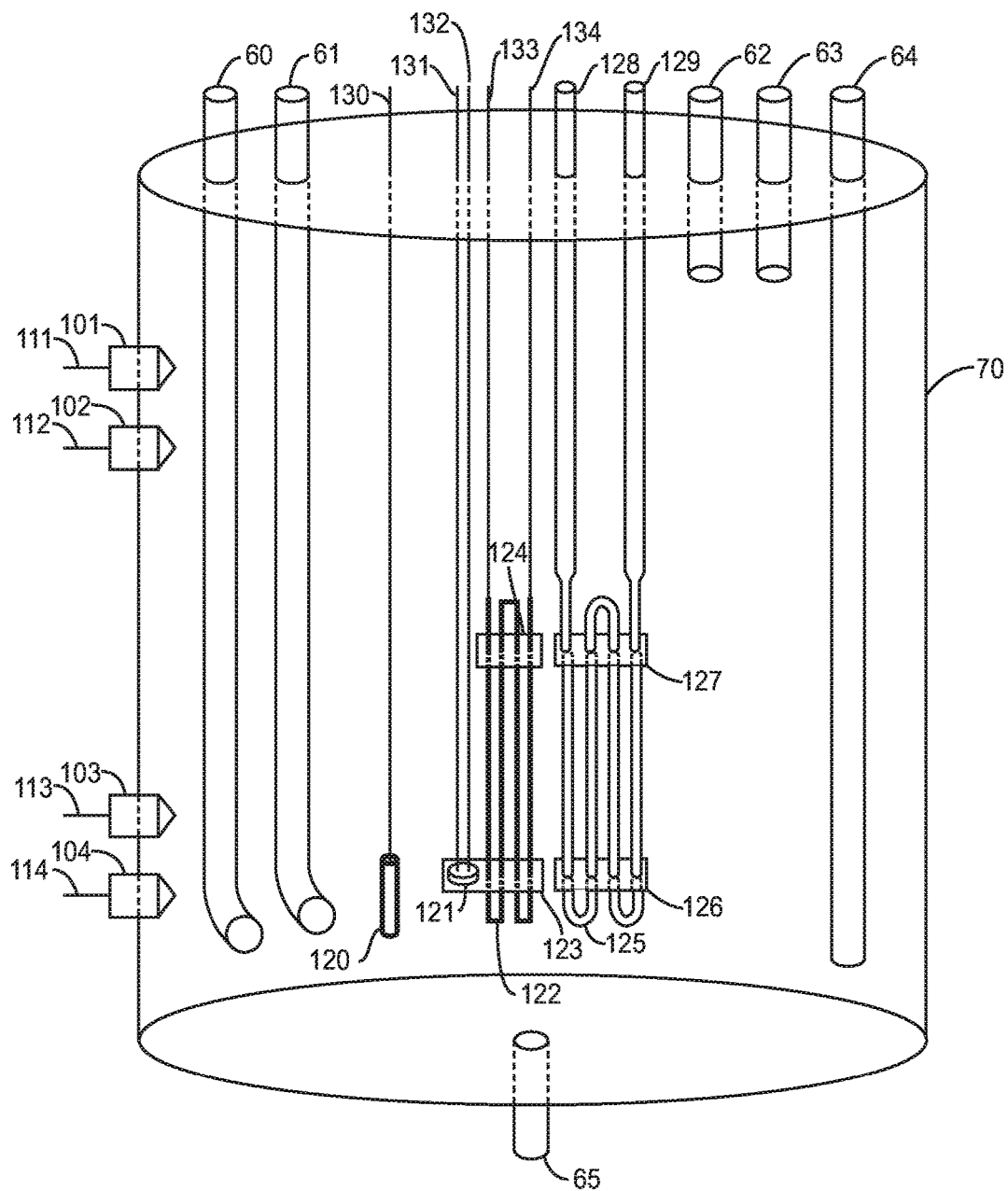
FIG. 16 is a schematic diagram of a flow cell according to an embodiment of the present disclosure, introducing various thermal management methods.

Referring now to the drawings and, in particular, to FIG. 16, there is shown a fuel flow cell system 12 comprising flow cell 70.

Unless otherwise specifically stated, fuel flow cell system 12 depicted in FIG. 16 inherits identical elements and corresponding functional descriptions as fuel flow cell system 10 depicted in FIG. 14 and as fuel flow cell system 11 depicted in FIG. 15, with like numbers referring to like elements throughout.

The fuel flow cell system 12 depicted in FIG. 16 serves to introduce thermal management elements to flow cell 70, said thermal management being desirable in that the viscosity of diesel fuel and especially some alternate fuels may fall above a usable viscosity if allowed to reach low temperatures as may be experienced within weather exposed, unheated structure, or vehicle engine compartments.

The flow cell may include fuel temperature sensor 120, as communicated to an electronic controller via signal line 130.

The flow cell may also include heat exchanger 125, sourced and scavenged via coolant lines 128 and 129. The term "coolant", as used here, while counterintuitive in name, is nevertheless common parlance for a liquid transporting thermal energy, useful both as a source of thermal energy and to remove thermal energy. Coolant flow may be further controlled by valves or thermostats as desired to maintain a predetermined fuel temperature within flow cell 70, albeit varying in accordance with the thermal mass of expected fuel introduction and removal occurring within flow cell 70 during normal operation. Heat exchanger efficiency may be enhanced by increased surface area, such as at least one fin, fins 126 and 127 being shown in FIG. 16. Heat exchanger 125 may be freestanding, or made part of flow cell 70 construct to increase surface area.

The flow cell may also include an electrical heat source 122, serving the same function as heat exchanger 125, said heat source 122 capable of operating in absence of, individually with, or in tandem with heat exchanger 125. Since heat source 122 is electrical, no engine coolant heat and therefore no prior engine operation are required before the transfer of heat to fuel within flow cell 70 may initiate. Heat source 122 is further is useful to preheat fuel within flow cell 70, and thus allow flow cell 70 to be maintained continuously ready. Heat exchanger efficiency may be enhanced by increased surface area, such as at least one fin, fins 123 and 124 being shown in FIG. 16. Since electrical elements by nature may exhibit thermal runaway should the media to which heat energy is being transferred be removed or absent, temperature sensor 121 may be provided to maintain regulation of the element in such case. Temperature sensor 121 may be thermostatic and designed to electrically open at a predetermined temperature, and may simply be wired in series with heat source 122 via lines 131 and 132. Heat source 122 may be freestanding, or made part of flow cell 70 construct to increase surface area.

Flow cell 70 may also include thermal insulation or barrier, not shown in FIG. 16. Thermal insulation methods may include an interstitial space.

Figure 17:
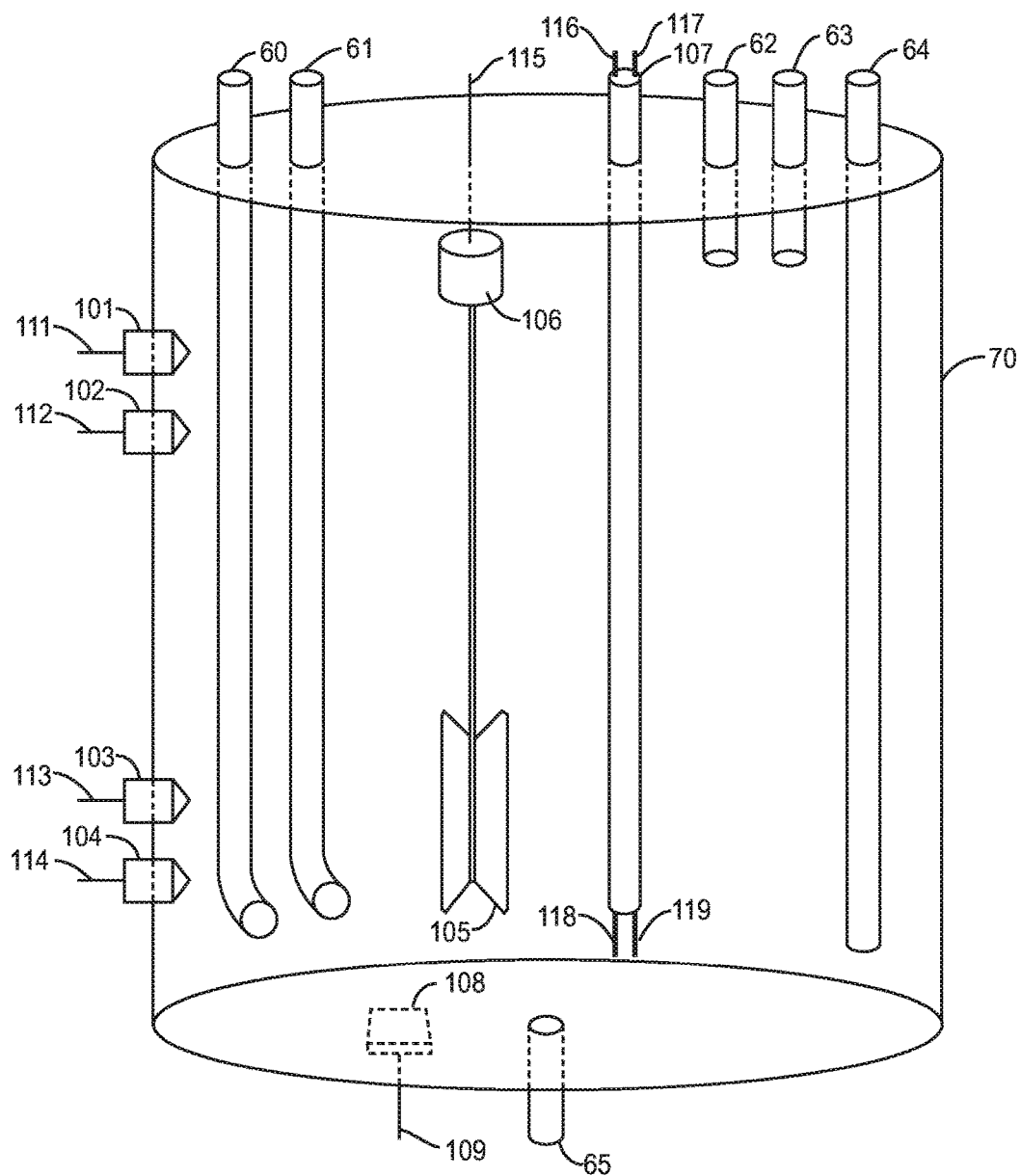
FIG. 17 is a schematic diagram of a flow cell according to an embodiment of the present disclosure, introducing mixing methods and contamination detection.

Referring now to the drawings and, in particular, to FIG. 17, there is shown a fuel flow cell system 13 comprising flow cell 70.

Unless otherwise specifically stated, fuel flow cell system 13 depicted in FIG. 17 inherits identical elements and corresponding functional descriptions as fuel flow cell system 10 depicted in FIG. 14, as fuel flow cell system 11 depicted in FIG. 15, and as fuel flow cell system 12 depicted in FIG. 16, with like numbers referring to like elements throughout.

The fuel flow cell system 13 depicted in FIG. 17 serves to introduce rheological elements and water detection, said rheological elements being desirable in promoting thorough and/or uniform mixing of primary fuel 21 and alternate fuel 41 within flow cell 70, and said water detection elements being useful for the detection of entrained water within fuel that has by nature tendency to separate by gravity and collect in topographically low points and/or volumes, as provided within flow cell 70.

The flow cell may include ultrasonic mixing driver 108 as controlled by signal line 109. Ultrasonic mixing driver 108 serves to promote uniform mixing when a primary fuel and an alternate fuel are present.

The flow cell may include vane 105, as driven by motor 106, and as controlled by signal line 115. Vane 105 serves to promote uniform mixing when a primary fuel and an alternate fuel are present.

While FIG. 17 shows examples of acoustical and mechanical mixing, there is nothing to preclude other active and passive rheological mixing methods, in substitution or in tandem, including but not limited to physical features such as convolutions within flow cell 70.

The flow cell may include a water sensing element. FIG. 17 depicts water sensing element 107 with conductivity sensing elements 118 and 119, where said conductivity is conveyed to an electronic controller via signal lines 116 and 117.

While FIG. 17 shows as example electrical conductivity water sensing element 107, there is nothing to preclude other sensing methods, including but not limited to detection by simple float device of specific density greater than fuel but less than water.

Figure 17A:
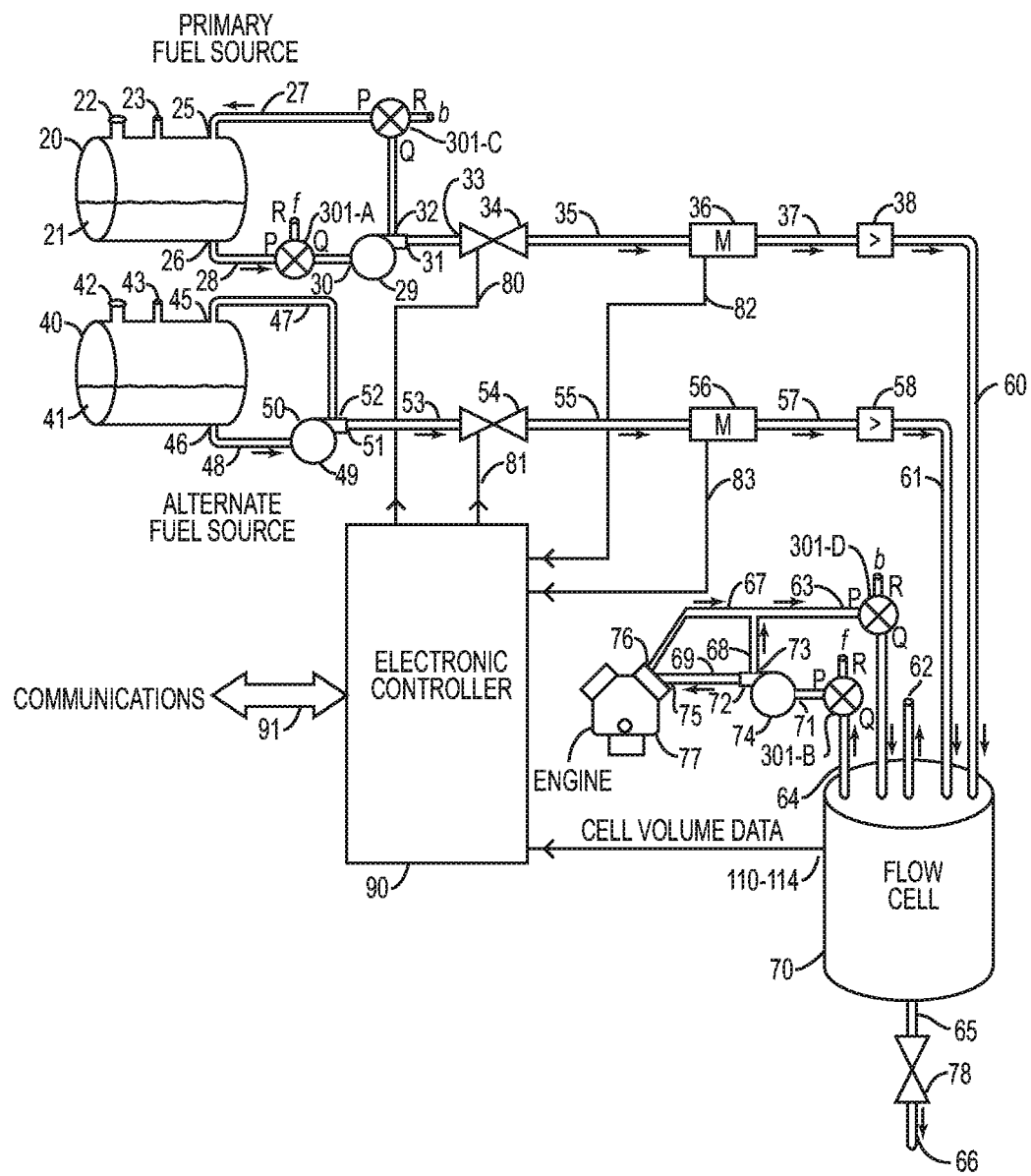
FIG. 17A is a schematic diagram of a bypassed alternate fuel blending system according to an embodiment of the present disclosure, whereby the alternate fuel blending system has been functionally removed to illustrate simplicity of system insertion and removal within an engine and engine fuel system originally designed to operate on a primary fuel.

Referring now to the drawings and, in particular, to FIG. 17A, there is shown a bypassed alternate fuel blending system 14, whereby the alternate fuel blending system has been functionally removed with primary fuel 21 directly sourcing pump 74 via primary fuel transmission line 28, and fuel bypass return line 27 directly returning engine 77 bypass fuel to primary fuel storage source 20. FIG. 17A serves to illustrate that the utilization of flow cell methodology as described herein provides both similar source point as primary fuel storage source 20, and also similar bypass return impedance as primary fuel source 20. Therefore, by simple change of connection, or more preferably the insertion of a control valve 301, a four-section three-port valve operated in tandem, the alternate fuel blending system described herein may be easily and cost effectively switched out of the system if and as required by deselecting flow via ports P-Q and instead selecting flow via ports P-R. As an example, the alternate fuel blending system may be manually or automatically switched out due to component failure or other malfunction. While the utilization of alternate fuel 41 is forfeited, nevertheless the engine-dependent application may continue to function on primary fuel 21 until such time repair is made.

The flow cell may include a water sensing element. FIG. 17 depicts water sensing element 107 with conductivity sensing elements 118 and 119, where said conductivity is conveyed to an electronic controller via signal lines 116 and 117.

Biodiesel, in the presence of both heat and oxygen, degrades forming carboxylic acids, including but not limited to, formic acid, acetic acid, propionic acid, and so on. Methods facilitating biodiesel degradation include, but are not limited to, the oxidation of esters; and oxidative cleavage of olefin (carbon-carbon double electron) bonds by ozonolysis, biodiesel nominally comprising esterized fatty acids containing olefin bonds. For example, omega-6 fatty acids contain olefin bonds beginning six carbon atoms from the non-esterized end of the molecule. In turn, these carboxylic acids attack and degrade certain polymer seals, and certain metals and alloys common to vehicle fuel systems in proportion to their duration of exposure.

In this regard, purging is another feature that can be important in an alternative fueling system, such as those described above. The alternative fuel control system can be configured to control the purging of alternate fuel in an internal combustion engine at shutdown. In this manner, an alternative fuel whose tendency is to congeal or solidify if not left within fuel supply and delivery components, as discussed and disclosed in U.S. Pat. Nos. 7,721,720 and 8,066,677, both of which are incorporated herein by reference in their entireties. However, if engine duress is detected, either from the vehicle being overloaded (for example, climbing a steep grade), or from energy deficient renewable fuel having been received, or from any mode of duress for that matter, the system is capable of automatically suspending renewable fuel operation for a period of time (for example, to overcome aforementioned grade); or, if duress is determined to be recurrent (for example, defective or deficient renewable fuel), suspension may remain invoked until the cause can be determined and corrected.

Detection of duress can be detected as wide open throttle operation concurrent with loss of vehicle speed as measured over a defined interval of time, i.e. vehicle deceleration, as an example. Suspension serves as an important additional measure to prevent interruption of commerce. Returning to aspects, the second being mechanical-hydraulic, being a dual-port flow-through fuel injector rail that alleviates the need of the engine to run to consume and combust any renewable fuel trapped within the fuel injector rail, as would be the case for a single-port (dead ended) fuel injector rail construct. Whereas in general there are many possible single and dual-port fuel injector rail embodiments due to Pascal's Law; for purposes of purging, constraints are imposed. Upon imposition of these constraints, three dual-port embodiments remain.

Due to the flow-through fuel injector rail art being a specially narrowed subset of all possible embodiments, inventiveness may have to be conveyed within the patent specification either in relationship to other novel system elements or art, and/or as being the special set of constraints itself.

As discussed above, a flow cell can be employed in an alternative fueling system to provide a limited reservoir of fuel for engine consumption, serving a both sourcing point of single fuel type, selected fuel type and/or blended fuel to the engine fuel system and also for the acceptance and receipt of engine fuel bypass, if and as required. In this regard, in one example discussed below, a flow cell is described as having up to three operational modes. Enumerated, there is (a) Decoupled Operation, whereby the engine receives fuel from the fossil storage tank and returns fuel to the fossil storage tank, the fossil storage tank serving as sole fuel reservoir for the vehicle with the Flow Cell functionally detached; there is (b) Active Operation, whereby the engine receives fuel from the Flow Cell and returns fuel to the Flow Cell, with the Flow Cell functionally enabled and serving as sole fuel reservoir for the vehicle; and there is (c) Purging Operation, whereby the engine receives fuel from the fossil storage tank and returns fuel to the Flow Cell, with the Flow Cell receiving the entrained fuel prior sourced by the Flow Cell, but with the entrained volume soon displaced by the fossil fuel being sourced from the fossil storage tank; this mode being transient until the displacement of entrained fuel is largely accomplished.

The system orderly transitions between operational modes to provide the vehicle with a source of renewable fuel, either neat (pure), or as a mixture of a fossil and renewable fuel (blended), or may be directed to source fossil only; the Flow Cell serving as a temporary reservoir of desired fuel type.

Figure 18A:
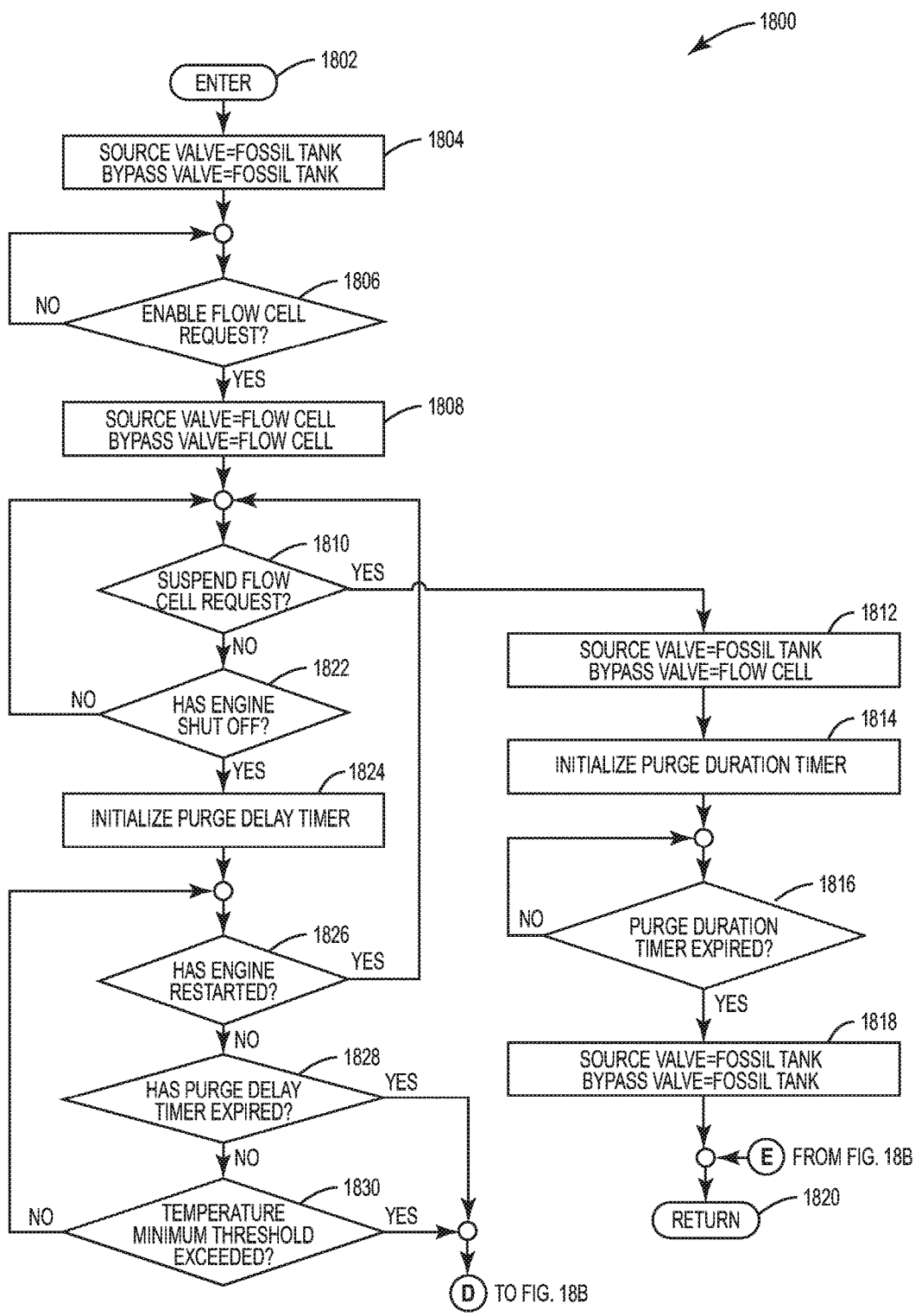
FIGS. 18A and 18B are a flowchart illustrating an exemplary process for purging an alternative fueling system.
Figure 18B:
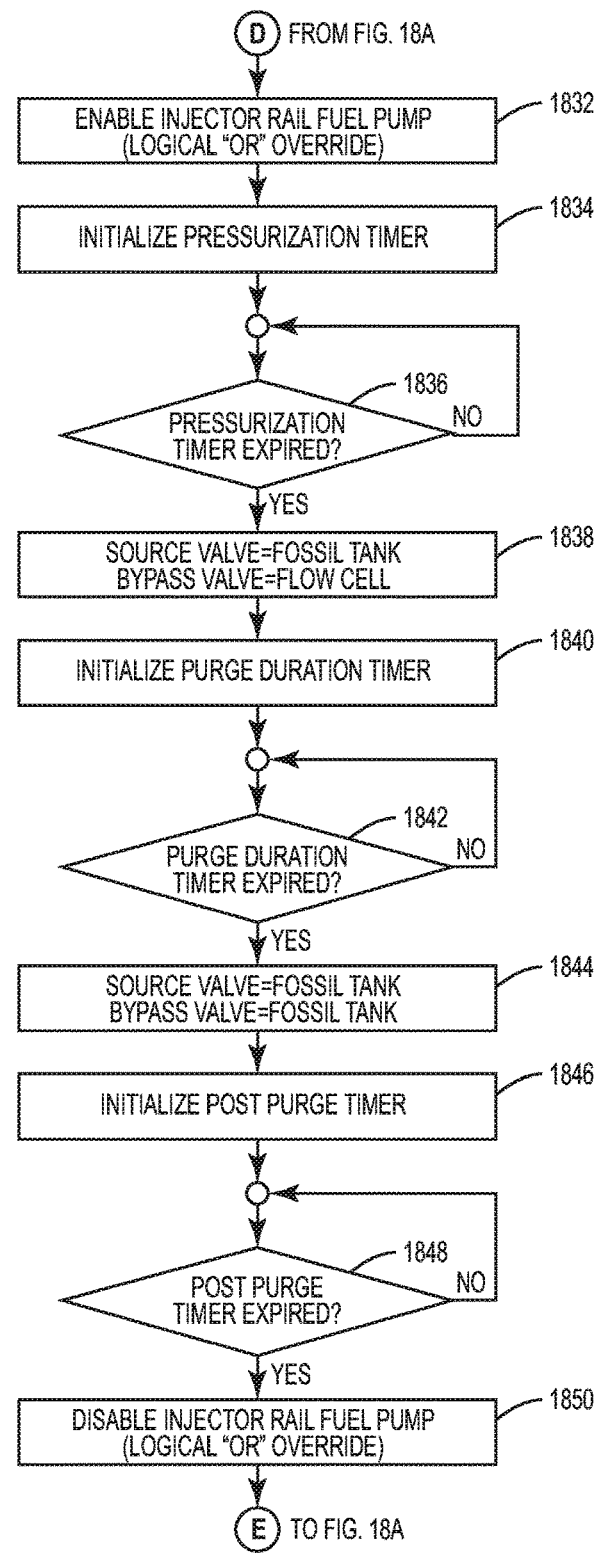

In this regard, FIGS. 18A and 18B are a flowchart illustrating an exemplary process 1800 of an exemplary flow cell operation for a flow cell that is provided in an alternative fueling system to provide a limited reservoir of fuel for engine consumption, serving a both sourcing point of single fuel type, selected fuel type and/or blended fuel to the engine fuel system and also for the acceptance and receipt of engine fuel bypass, if and as required.

Figure 19:
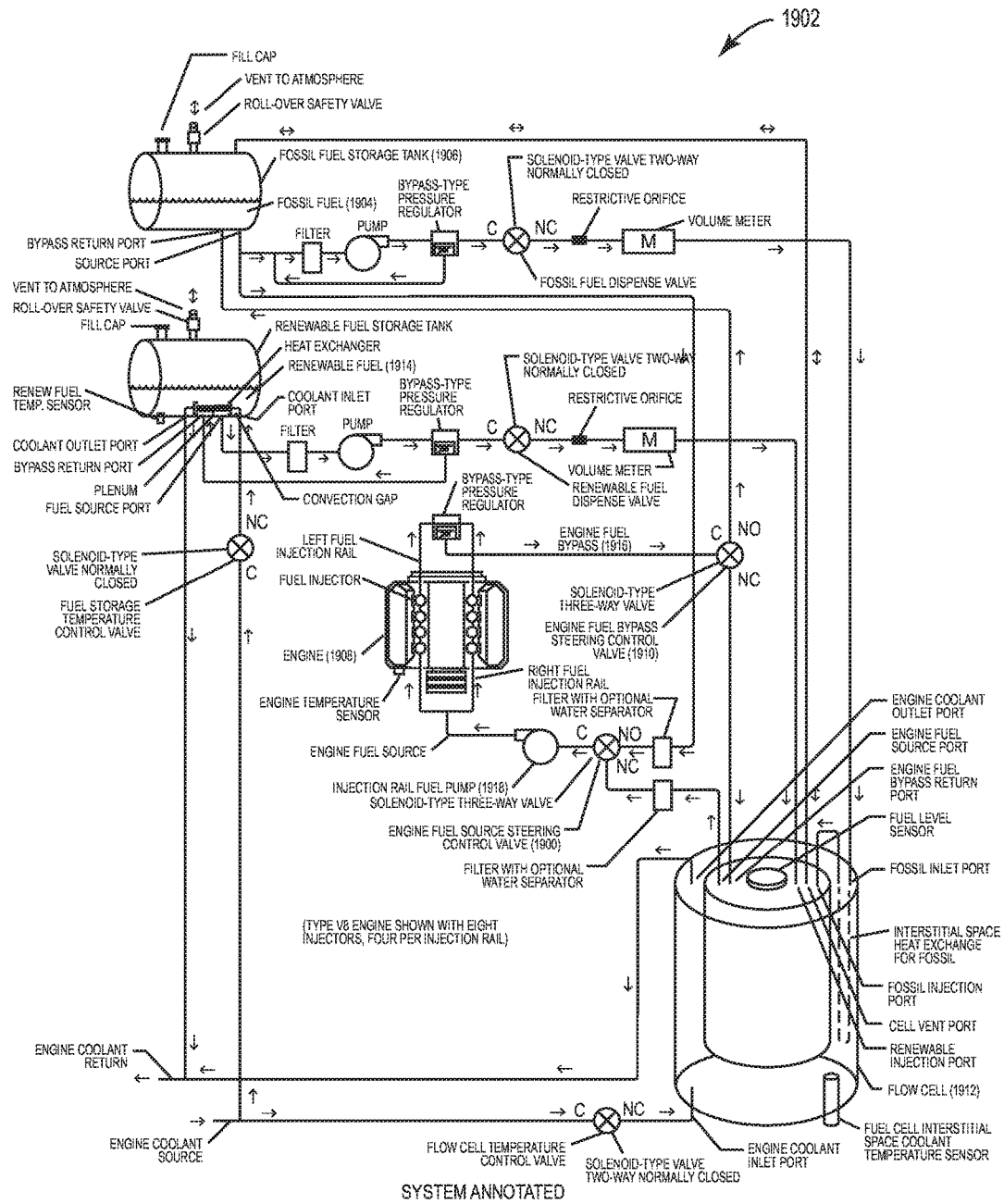
FIG. 19 is another exemplary alternative fueling system that can employ the process in FIGS. 18A and 18B for purging.

In this regard, with reference to FIG. 18A, upon start (block 1802), the system is initialized into the Decoupled Operation by a source valve shown as engine fuel bypass steering control valve 1900 shown in the alternative fueling system 1902 in FIG. 19. The engine fuel bypass steering control valve 1900 is configured to source fossil fuel 1904 from the fossil storage tank 1906 to engine 1908. An engine fuel bypass steering control valve 1910 is configured to return bypassed fuel from the engine 1908 to the fossil storage tank 1906, thereby operating the engine 1908 in a manner largely equivalent to the flow cell 1912 being physically absent.

Referring to FIG. 19, there is shown the fluidic paths selected by engine fuel bypass steering control valve 1900 and the engine fuel bypass steering control valve 1910, again depicting the engine fuel bypass steering control valve 1900 being configured to source fossil fuel 1904 from the fossil storage tank 1906 to engine 1908, and the engine fuel bypass steering control valve 1910 being configured to return bypassed fuel from the engine 1908 to the fossil storage tank 1906.

It should be noted that for decoupled operation, both the engine fuel bypass steering control valve 1900 and the engine fuel bypass steering control valve 1910 are electrically de-energized to perform these selection. Therefore, decoupled operation also represents the default state at vehicle start up (and correspondingly control system start up thereupon), and also system failure and/or power loss. Consequently, by default the engine 1908 is configured to receive fuel 1904 from the fossil storage tank 1906 and return fuel to the fossil storage tank 1906, i.e. invocation of this mode is redundant, however is shown to establish valve states (block 1804 in FIG. 18A).

Again referring to FIGS. 18A, 18B, and 19, upon receiving a flow cell 1912 operational request (block 1806 in FIG. 18A), the engine fuel bypass steering control valve 1900 is reconfigured to source fossil fuel from the flow cell 1912, and the engine fuel bypass steering control valve 1910 configured to return bypassed fuel from the engine 1908 to the flow cell 1912, operating the engine 1908 in a manner whereby the flow cell 1912 serves as a surrogate fuel storage reservoir, thereby achieving active operation (block 1808).

Until and unless requested otherwise, active operation continues with the flow cell 1912 serving as engine fuel reservoir, with the flow cell 1912 being automatically replenished in fuel volume at certain detected volume threshold by external means, moreover with a fossil fuel, a renewable fuel, or a mixture thereof.

Active operation may be transitioned to purging operation with the engine 1908 either operational (running) or stopped. Transitioning from active operation to the purging operation with engine 1908 remaining operational (hereinafter, "Suspension") will be first described.

The capability of suspension during engine 1908 operation serves the purpose of enabling the vehicle to continue uninterrupted in operation, without interference to commerce if applicable, upon a detectable system failure; for example, including but not limited to, loss of sensor(s), sensor range error, pump failure, pressure loss, depletion of renewable fuel source, software exception or error, etc.

More generally, suspension provides an orderly means of flow cell 1912 system shutdown without cross-contamination of the fossil fuel storage tank 1906 occurring from any renewable fuel 1914 entrained within the engine's fuel injection system or associated components, as would be the case if the engine's fuel source were summarily switched to the fossil storage tank 1906, both engine fuel source and engine fuel bypass, the source of cross-contamination being the latter.

Secondarily, in cases of engine 1908 duress or situations requiring maximum horsepower demand, including but not limited to, climbing steep grades, or utilization of a renewable fuel of diminished energy content, upon detection of duress the system may be directed to temporarily or permanently switch back to fossil fuel operation, again without cross-contamination of the fossil fuel storage tank 1906 occurring.

Again referring to FIGS. 18A, 18B, and 19, upon receipt of a Suspension request (block 1810 in FIG. 18A), the alternative fueling system 1902 in FIG. 19 is transitioned into the purging operation by configuration of the engine fuel bypass steering control valve 1900 and the engine fuel bypass steering control valve 1910 (block 1812). Specifically, the engine fuel bypass steering control valve 1900 is configured to source fossil fuel 1904 from the fossil storage tank 1906 to engine 1908. The engine fuel bypass steering control valve 1910 is configured to return bypassed fuel from the engine 1908 to the flow cell 1912, thereby operating the engine 1908 in a manner hybrid manner whereby any entrained renewable fuel is forced into the flow cell 1912 by the newly selected fossil fuel.

It should be noted that upon the engine fuel bypass steering control valve 1900 having selected fossil fuel 1904, its energy content and other characteristics are soon presented to the engine 1908, even while the purging operation continues, but has not yet been substantially completed, should the purging operation action have been initiated as the result of having detected engine 1908 duress.

The purging operation continues until substantially all entrained flow cell fuel is returned to the flow cell 1912. In one possible embodiment, with the entrained volume to purged calculable, measurable, or otherwise determinable, a flow meter could be inserted within the engine fuel bypass circuit 1916 (FIGS. 18A and 18B) to measure and assure the volume of entrained fuel has been substantially displaced. However, since the pressure and flow characteristics of the Injection rail fuel pump 1918 are quantifiable, predictable, or otherwise determinable, and the composite restriction characteristics engine fuel bypass circuit 1916 components such as valves, interconnecting fuel lines and couplings are calculable, measurable, or otherwise determinable, the measurement of time elapsed may be substituted for direct measurement of volume. Restated, for a given pressure and a given restriction (orifice), flow rate is a constant. Flow rate being volume divided by time, time thereby may be used to determine volume. Consequently, for simplicity in reduction to practice, measurement by time becomes the preferred embodiment.

Referring again to FIG. 18A, immediately following the configuration of Source and Bypass Valves for Purging Operation, a timing operation is initiated, that being performed by the Purge Duration Timer (block 1814). Upon initializing a time threshold within the purge duration timer sufficient to substantially allow the entrained fuel volume to be displaced and returned to the flow cell 1912, that time is then allowed to expire while the engine fuel source steering control valve 1900 and the engine fuel bypass steering control valve 1910 remain configured for purging operation.

Upon expiration of the purge duration timer (block 1816 in FIG. 18A), the engine fuel bypass steering control valve 1900 remains configured to source fossil fuel 1904 from the fossil storage tank 1906 to engine 1908, while the engine fuel bypass steering control valve 1910 is configured to return bypassed fuel from the engine 1908 to the fossil storage tank 1906, thereby once again operating the engine 1908 in a manner largely equivalent to the flow cell 1912 physically absent (block 1818 in FIG. 18A).

Purging for the case of continued engine 1908 operation now completed and being at the return point (block 1820 in FIG. 18A), the algorithm may thereupon transition to the entry point, as there is nothing to prohibit resumed flow cell 1912 operation should it be requested. Alternately, the system may retire, the flow cell 1912 having been invoked, and then removed from service. In both cases however, entrained fuel containing a fossil fuel, renewable fuel, or mixture thereof, were substantially returned to the flow cell 1912 without occurrence of cross-contamination within the fossil storage tank 1906. Moreover, this operation was performed without interruption of vehicular motion capability, and without interruption to commerce, if or when the vehicle is being utilized for such purpose.

Again, active operation may be transitioned to purging operation with the engine 1908 either operational (running) or stopped. Transitioning from active operation to purging operation with engine 1908 stopped (hereinafter, "Shutoff") will now be described.

The capability the purge without engine 1908 running, as will now be described, is substantial not only in improved safety, efficacy, familiarity of expected behavior by operator, and technically in that large portions of the vehicle engine control system need not be co-opted or overridden, but also that it provides a means whereby the vehicle may be used in start-stop operation, for example a school bus or delivery vehicle, while remaining operationally on renewable fuel, and receiving the benefits therefrom.

Moreover, with the flow cell 1912 entrained fuel for purposes of purging, and therefore must have sufficient volumetric capacity to receive multiple purges, the volumetric capacity requirement is reduced by allowing delayed purging, as facilitated by decoupling the requirement of engine 1908 running as constraint. To achieve this, the purging operation upon shutoff is made conditional as a variable of least one, those being but not limited to, time duration and/or temperature threshold, as examples.

One purpose of purging being the prevention of clouding and/or congealment of renewable fuel, in cold ambient environments sufficient to cause clouding and/or congealment, the measurement of temperature decreasing to a minimum threshold after shutoff (and subsequent loss of engine heat) serves as one indicator that the purging operation is required.

Another purpose of purging being the reduction of prolonged exposure of engine fuel components to carboxylic acids and other undesirous compounds originating from the degradation and/or breakdown of renewable fuels, the measurement of elapsed time serves as another indicator that the purging operation is required.

While both temperature measurement and time duration methods combined yield a more preferred embodiment as will be further described herein; nevertheless, the thermal loss of engine fuel components may be calculated, measured, or otherwise determined, therefore time duration singularly may be employed to both preclude clouding and/or congealment, while simultaneously reducing prolonged exposure of engine fuel components to undesirous compounds.

Again referring to FIG. 18A, upon transition into active operation, that being whereupon an enable flow cell request having been received and the Source Valve having been configured to source fuel from the Flow Cell to engine, and the Bypass Valve having been configured to return bypassed fuel from the engine to the Flow Cell, both Suspend Flow Cell Request and Engine Shutoff statuses are repeatedly queried (blocks 1810 and 1820). Having previously described the case for a suspect flow cell request being received and processed; the processes associated with engine shutoff will now be described.

Upon detection of shutoff (block 1812), a timing operation is initiated, that being performed by the purge delay timer (block 1824). The time delay chosen within the purge duration timer may be chosen to be sufficient to mitigate the effects of unnecessary continued exposure of undesirous compounds from the degradation of renewable fuel, yet sufficient and generous in time duration to facilitate start-stop operation as would be commonly encountered in the operation of a delivery vehicle or transportation bus, thereby allowing continued start-stop vehicle operation with the benefits of uninterrupted renewable fuel operation when possible.

Since the purge duration timer delay value will vary with vehicle type and purpose of utilization, the time delay may be optimized. Optimization may include, but not be limited to, a manual setting with a maximum limitation constraint, may be assigned by vehicle type, utilization, or may be self-learning. As an example of the latter, the vehicle may measure the average time duration between engine stop to engine start, to that duration value add a nominal margin, whose sum if not exceeding a maximal duration is then utilized as the delay value. Doing such both limits unnecessary exposure to undesirous compounds while maximizing renewable fuel utilization.

Upon initialization of the purge delay timer, three conditions are then monitored and tested, those being engine 1908 restart, purge delay timer expiry, and minimum temperature threshold.

The first condition will now be described, that being engine restart (block 1826). If the engine is restarted before expiry of the purge delay timer (1828), by benefit of the engine fuel source steering control valve 1900 and the engine fuel bypass steering control valve 1910 having had uninterrupted selection of the flow cell 1912, both as source and for bypass return, engine 1908 operation merely resumes with the flow cell 1912 serving as fuel reservoir, continuing the utilization of renewable fuel as was specified therein.

Furthermore, as shown in FIG. 18A, upon engine 1908 restart being detected before expiry of the purge delay timer (block 1828), the algorithm transitions back to the point whereby suspend flow cell (block 1810) requests and engine shutoff are monitored. Specifically, the point and mode of operation occurring before engine shutoff was detected.

The second and third conditions will now be described, those being purge delay timer expiry, and minimum temperature threshold, both yielding an identical algorithmic response.

Figure 20:
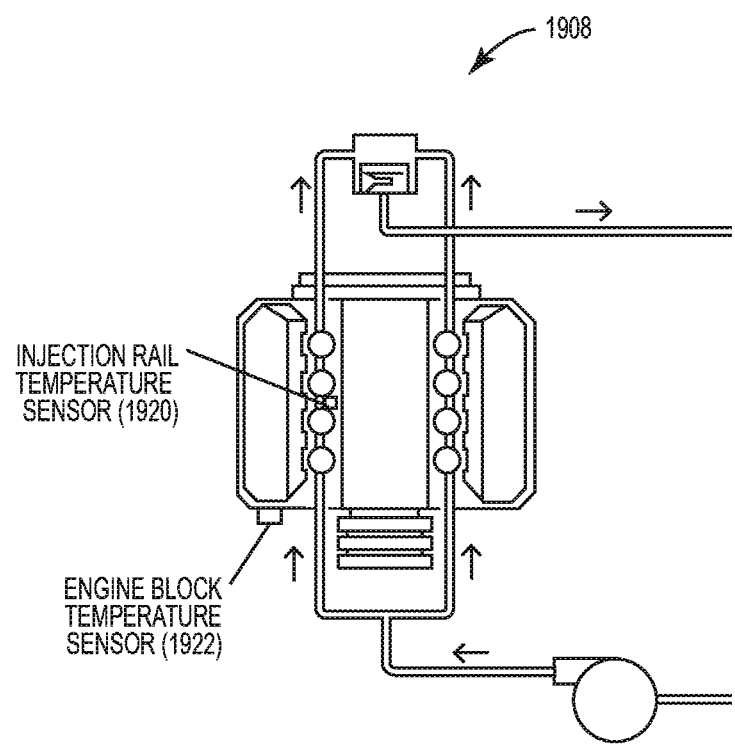
FIG. 20 is a more detailed diagram of the engine in the alternative fueling system in FIG. 19.

Returning again the point within the algorithm whereby engine restart, purge delay timer expiry, and minimum temperature threshold are monitored (blocks 1826-1830), upon the case of purge delay timer expiry detection, or a minimum temperature being detected by temperature measurement sensor at, proximate to, or representative of fuel injector rail temperature engine temperature sensor 1920 in FIG. 20; and placement(s) for the fuel injector rail temperature sensor 1922, the need for purging is therefore indicated, however the system must first be configured before a purging operation may commence.

Specifically, unlike the aforementioned methods of purging while the engine remained running and operational, with the engine stopped, the injector fuel rail pump 1918 (FIG. 19) has ceased operation, therefore there is no immediately available mechanism whereby to circulate and/or transport fuel within the engine fuel injector rails. Consequently, provision is made to enable the injector fuel rail pump 1918 independently of the vehicle engine control system; moreover, to override such control.

Again referring to FIGS. 18A and 18B, upon purge delay timer expiry, control is exerted over the injector fuel rail pump 1918 to reinitiate circulation within the fuel injector rails (block 1832 in FIG. 18B). The engine fuel source steering control valve 1900 and the engine fuel bypass steering control valve 1910 remain still respectively sourcing fuel from the flow cell 1912, and bypassing fuel to the flow cell 1912 (as was the configuration at time of shutdown).

Upon completion of injector fuel rail pump 1918 restart, a pressurization timer (block 1834 in FIG. 18B) is initialized with a time duration value sufficient for the fuel injector rail to come to full pressure, and moreover reestablish circulatory flow with the flow cell 1912. Restated, a time duration value is chosen and initialized that is sufficient for the steady-state operation of associated components to be established, largely equivalent to conditions (pressures and mass flows) normally occurring as if the engine were running and/or the vehicle being in operation.

Upon expiry of the pressurization timer and the corresponding establishment of steady-state conditions (block 1836), a purging operation largely algorithmically equivalent to that performed in the shutdown case were the engine remained running may now be performed. Specifically, and again referring to FIG. 18B, upon expiry of the pressurization timer (block 1836), the system 1902 is transitioned into the purging operation by configuration of the engine fuel source steering control valve 1900 and engine fuel bypass steering control valve 1910. Specifically, the engine fuel source steering control valve 1900 is configured to source fossil fuel 1904 from the fossil storage tank 1906 to engine 1908, and the engine fuel bypass steering control valve 1910 is configured to return bypassed fuel from the engine 1908 to the flow cell 1912, thereby operating the engine 1908 in a manner hybrid manner whereby any entrained renewable fuel is forced into the flow cell 1912 by the newly selected fossil fuel 1904 (block 1838).

As was the case for Suspension with engine running, for the case of pressurization by overridden enablement of the injection rail fuel pump 1918, the purging operation similarly continues until substantially all entrained flow cell fuel is returned to the flow cell 1912.

Referring again to FIG. 18B, immediately following the configuration of engine fuel source steering control valve 1900 and the engine fuel bypass steering control valve 1910 for purging operation, a timing operation is initiated, that being performed by the purge duration timer (block 1840). Upon initializing a time threshold within the purge duration timer sufficient to substantially allow the entrained fuel volume to be displaced and returned to the flow cell 1912, that time is then allowed to expire while the engine fuel source steering control valve 1900 and the engine fuel bypass steering control valve 1910 for remain configured for purging operation.

Upon expiration of the purge duration timer (block 1842), the engine fuel source steering control valve 1900 remains configured to source fossil fuel 1904 from the fossil storage tank 1906 to engine 1908, while the engine fuel bypass steering control valve 1910 for is configured to return bypassed fuel from the engine 1908 to the fossil storage tank 1906, thereby once again operating the engine 1908 in a manner largely equivalent to the flow cell 1912 being physically absent (block 1844). Purging for the case of engine stopped operation now completed; the algorithm again departs from the case whereby the engine remained running.

Upon completion of the purging operation, a post purge timer is initialized with a time duration value sufficient for the fuel injector rail to remain in its previous steady-state condition (pressures and mass flows) while now configured to source fossil fuel 1904 from the fossil storage tank 1906 to engine 1908, and the engine fuel bypass steering control valve 1910 for being configured to return bypassed fuel from the engine 1908 to the fossil storage tank 1906 (block 1846).

Post purge timer operation mimics the configuration, states and conditions existing at next engine start, that being decoupled operation, therefore this continued operation does not differ from those initial conditions. However, the time interval passing before the next engine start is typically unknown, and moreover may be lengthy. Consequently, continued steady-state operation immediately following a purging operation does additionally serve to immediately dilute any trace renewable fuel remaining entrained; this, vs. analog conditions occurring at an unknown time in the future, but with reduced benefit due to unnecessarily prolonged trace exposure.

Upon expiry of the post purge timer (block 1848), the injector rail fuel pump 1918 override is then disabled, thereby returning the engine fuel components to a depressurized and idle state (block 1850).

Being once again at the return point (block 1820), the algorithm may thereupon transition to the entry point (block 1802); or, with engine 1908 stopped and no alternator power being generated, the system 1902 may power off to preserve vehicle battery, to be later restarted upon engine start, and initialized at the entry point (block 1802).

Fuel injection rail manifolds occur in many embodiments, both single and dual port, are physically structured to deliver fuel to at least one fuel injector, and typically are mechanically formed and shaped to accommodate the various physical attributes of an engine.

Single port embodiments receive fuel largely under constant pressure, that pressure being regulated by an external device, typically by a bypass type pressure regulator.

A dual port embodiment may also receive fuel largely under constant pressure, that pressure being regulated by an external device, with the second port providing interconnection with a second fuel injection rail manifold, for the purpose of sourcing fuel thereto.

Alternately, a dual port embodiment may receive fuel not externally pressure regulated, with the second port providing convenient attachment of a pressure regulation device, typically by a bypass type pressure regulator.

Alternately, a dual port embodiment may receive fuel pressure regulated, with the second port providing convenient attachment of a pressure measurement transducer for purposes of monitoring or electronic pressure regulation by modulation of a fuel pump.

Such freedom and variability of embodiments arises from Pascal's Law, or The Principal of Transmission of Fluid Pressure, which states that pressure exerted anywhere within a confined incompressible fluid is transmitted equally in all directions throughout the fluid.

Consequently, for single port embodiments, the port receiving fuel (inlet port) may physically exist in any relationship to the ports supplying fuel to the fuel injectors (outlet ports). For example, for a four cylinder engine fuel whose fuel injectors are supplied by a single rail manifold, the inlet port may be at one extreme end of the rail, between any two outlet ports, or at the opposite extreme end of the rail, with all variations providing a similar pressure at each outlet port.

Similarly, for dual port embodiments, the inlet port may physically exist in any relationship to the ports supplying fuel to the fuel injectors (outlet ports) and the second port; moreover, the second port, for sourcing a second rail, providing means for the attachment of pressure regulator, and/or pressure measurement transducer, may likewise physically exist in any relationship to the ports supplying fuel to the fuel injectors (outlet ports) and inlet port.

However, for purposes of purging, constraints must be imposed, and optimizations may further be made.

Specifically, inlet and outlet ports are arraigned such that the entrained volume within the fuel injection rail manifold is substantially displaced by fuel entering the inlet port, and as aspirated at the outlet port.

Moreover, within the preferred embodiment the flow within the manifold is made largely laminar, thereby reducing portions within the manifold that would subjected to reduced displacing flow, or absent displacing flow.

Moreover, obstructions and irregularities inducing turbulent and chaotic flow would be eliminated or minimized, thereby reducing portions within the manifold that would subjected to reduced displacing flow, or absent displacing flow.

Moreover, entrained volume of the manifold would be minimized, thereby increasing fluid velocity, whereupon the energy from stagnated velocity upon obstructions or other irregularities would therefore receive this energy as a function of the square of velocity lost, further facilitating the removal of entrained fuel.

Moreover, entrained volume of the manifold would be minimized, thereby reducing the volumemetric requirements of the Flow Cell to receive purged fuel from the manifold.

Figure 21:
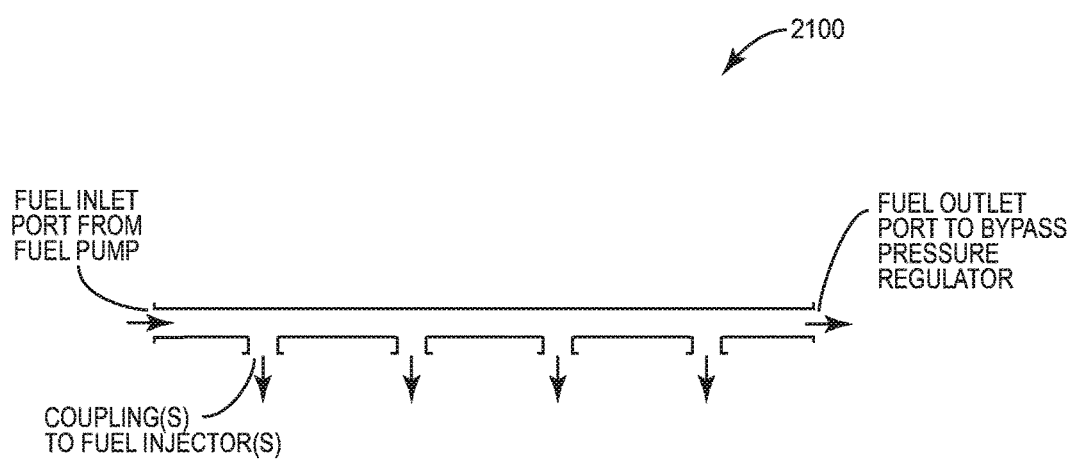
FIG. 21 is an exemplary fuel injection rail manifold that can be employed in the alternative fueling system in FIG. 19.

Referring to FIG. 21, there is shown one possible fuel injection rail manifold 2100 meeting aforementioned attributes. Such a manifold would be suitable for an engine with single or in-line cylinder placement, providing one fuel injector mating port per engine injector. Fuel enters an inlet port, and sweeps the entirety of the manifold's entrained volume as it transitions through to outlet port.

Figure 22:
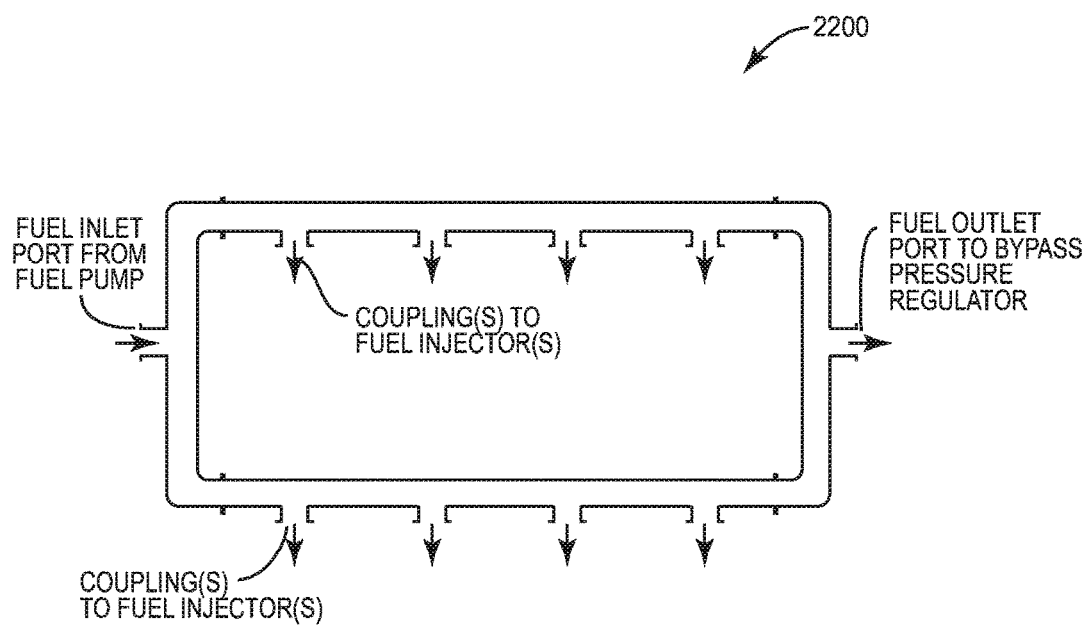
FIG. 22 is another exemplary fuel injection rail manifold that can be employed in the alternative fueling system in FIG. 19.

Referring to FIG. 22, there is shown one possible fuel injection rail manifold system 2200 meeting aforementioned attributes. Such a manifold would be suitable for an engine with V-configured or in-line cylinder placement whereby the manifold is segmented across multiple injector banks due to mechanical constraints, or to optimally distribute injector fuel demand due to timing sequence, providing one fuel injector mating port per engine injector. In this case, specifically paralleled interconnection, the preferred embodiment would also be configured to exhibit largely equivalent impedance to flow across each manifold.

Figure 23:
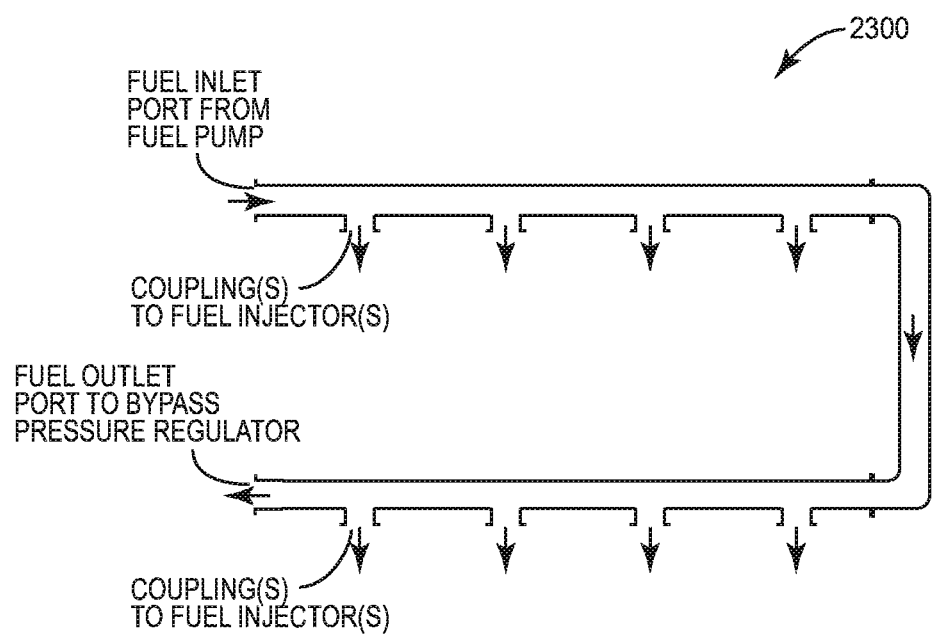
FIG. 23 is another exemplary fuel injection rail manifold that can be employed in the alternative fueling system in FIG. 19.

Referring to FIG. 23, there is shown one possible fuel injection rail manifold 2300 system meeting aforementioned attributes. Such a manifold would be suitable for an engine with V-configured or in-line cylinder placement whereby the manifold is segmented across multiple injector banks due to mechanical constraints, or to optimally distribute injector fuel demand due to timing sequence, providing one fuel injector mating port per engine injector.

There is nothing to prohibit additional ports for the purpose of instrumentation such as pressure transducers at any point or points, such ports by nature exhibiting near static flow.

As discussed above, FIGS. 24 through 29 depict systems to facilitate (1) the interconnection between the blending apparatus and engine, (2) divorced mode operation, i.e. the ability for the engine to return to its default diesel/fossil operation during blending apparatus disablement, deselection or fault, and (3) the ability to quickly purge blended fuel from the injector rails and other shared components, with shared components being defined as those required for divorced/pure-fossil mode of operation; for example, the fuel pump.

Figure 24:
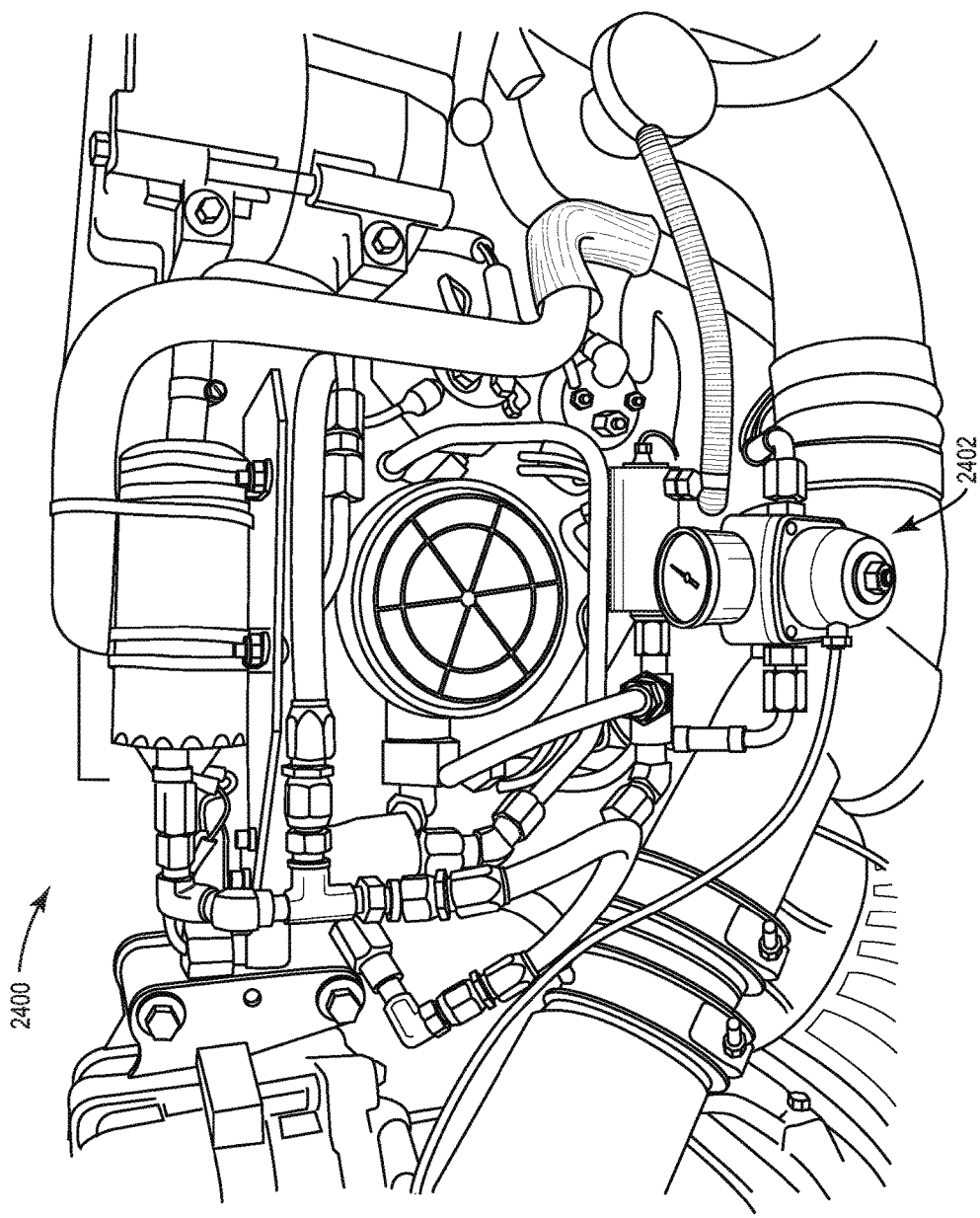
FIG. 24 is a top view, non-annotated, showing modified injector fuel rails (internal to cylinder heads for Ford 7.3 L, with ports now expanded to both front and rear), relocated fuel pump running in suction mode and positioned maximally upstream to reduce entrained volume, injector distribution manifold and lines, pressure regulator, and both source and bypass steering valves.
Figure 25:
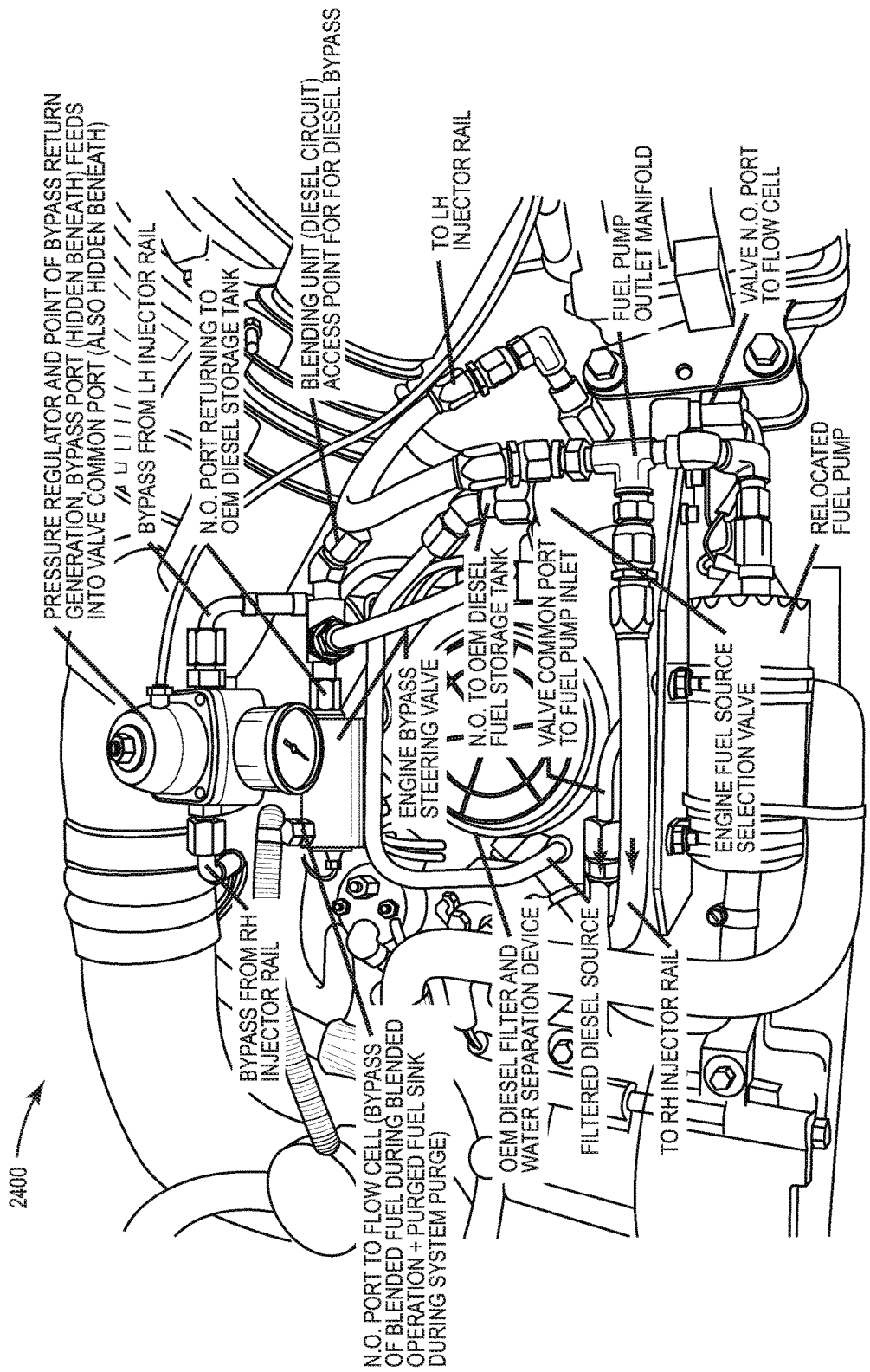
FIG. 25 is an annotated top view. Red x(s) denote interconnection ports to blending apparatus. Right-hand (RH) and left-hand (LH) conform to the standard automotive convention of driver's perspective.

FIGS. 24 and 25 depict non-annotated and annotated top views of a Ford 7.3 Liter diesel engine 2400. An engine fuel source selection valve has been placed (ideally immediately to minimize entrained volume) before the inlet of the fuel pump, and serves to select either (1) fossil diesel for divorced mode or purging mode, or (2) alternate select blended fuel as supplied by the flow cell.

The fuel selection valve's normally open (N.O.) and normally closed (N.C.) ports are chosen and thus structured such that when the coil is de-energized, diesel fossil fuel is selected to facilitate divorced and purge mode operation. It will be later described, however should be presently noted, that when both valves are simultaneously de-energized, only divorced mode operation occurs, i.e. the purge mode functional subdivision during fuel selection valve's de-energized state does not occur.

The fuel type (fossil or blended) chosen by the fuel selection valve feels into the inlet port of the fuel pump, whose outlet port via a 'tee' manifold and flexible lines distributes fuel under force to both the left-hand and right-hand injector rails, thus serving as engine fuel source. It should be noted that in the Ford 7.3 Liter engine, the injector rails are machined into the cylinder heads, and are therefore not visible. The cylinder heads have been modified such that the OEM single-port injection rail method whereby fuel is introduced at a single port under pressure and essentially dead-ends and remains within each injector rail unless demanded and consumed by one or more injectors residing on that rail. Instead, a second outlet port has been introduced, whereby fuel still exists within the injector rail under identical pressure (respect to atmospheric) as before, however further exists as a moving and transient volume whereby unused fuel not otherwise consumed by an injector during volume passage is now exits and is exhausted via a newly introduced second port on each rail.

Also prior regarding the OEM single-port injection rail method, as aforementioned, fuel is introduced into an injector rail under constant pressure, this pressure being regulated typically by a poppet-style (or alternately but rarely diaphragm style) pressure regulator, either as separate device or sometimes integral to the fuel pump, and therefore produces bypass fuel at the regulator apparatus by the regulation method's nature. Notably, for single port injector, this bypass is being produced (and is constrained to be by the topology) prior to input to an injection rail's inlet port. Consequently, if fuel types at the rail inlet are switched, any prior fuel type within the rail is fully entrained, and the rail may only be purged of the prior fuel type by consumption of the prior fuel type via the injectors, i.e. must be combusted to be eliminated.

By providing both a dual port (separate inlet and outlet) injector rail embodiment, and a bypass pressure regulator residing at the injector rail outlet ports(s), a fuel mass flowthrough is achieved. Consequently, if fuel types are switched, the mass flow through the injector rails will rapidly scavenge and remove the prior fuel type without requiring the comparatively slow process of combustion for elimination.

Furthermore and notably, the prior fuel purging process may be performed without the engine running. The fuel pump may be enabled independently of engine operation, thus ensuring mass flow through the injector rails. Notably, this may be performed immediately upon engine stop, or may be delayed a period of time. The delay may also be a function of either injector rail fuel temperature (as the alternate fuel is fine above the clouding point), or time. Importantly, this allows for frequent start-stop vehicle operation; for example, a diesel delivery van. Volume generated from excessive and/or non-necessary purging is prevented from accumulating within the flow cell, which serves as the sink point for purged fuel and has the limitation of finite volume and thus the containment capability for a maximum number of purge cycles.

Figure 26:
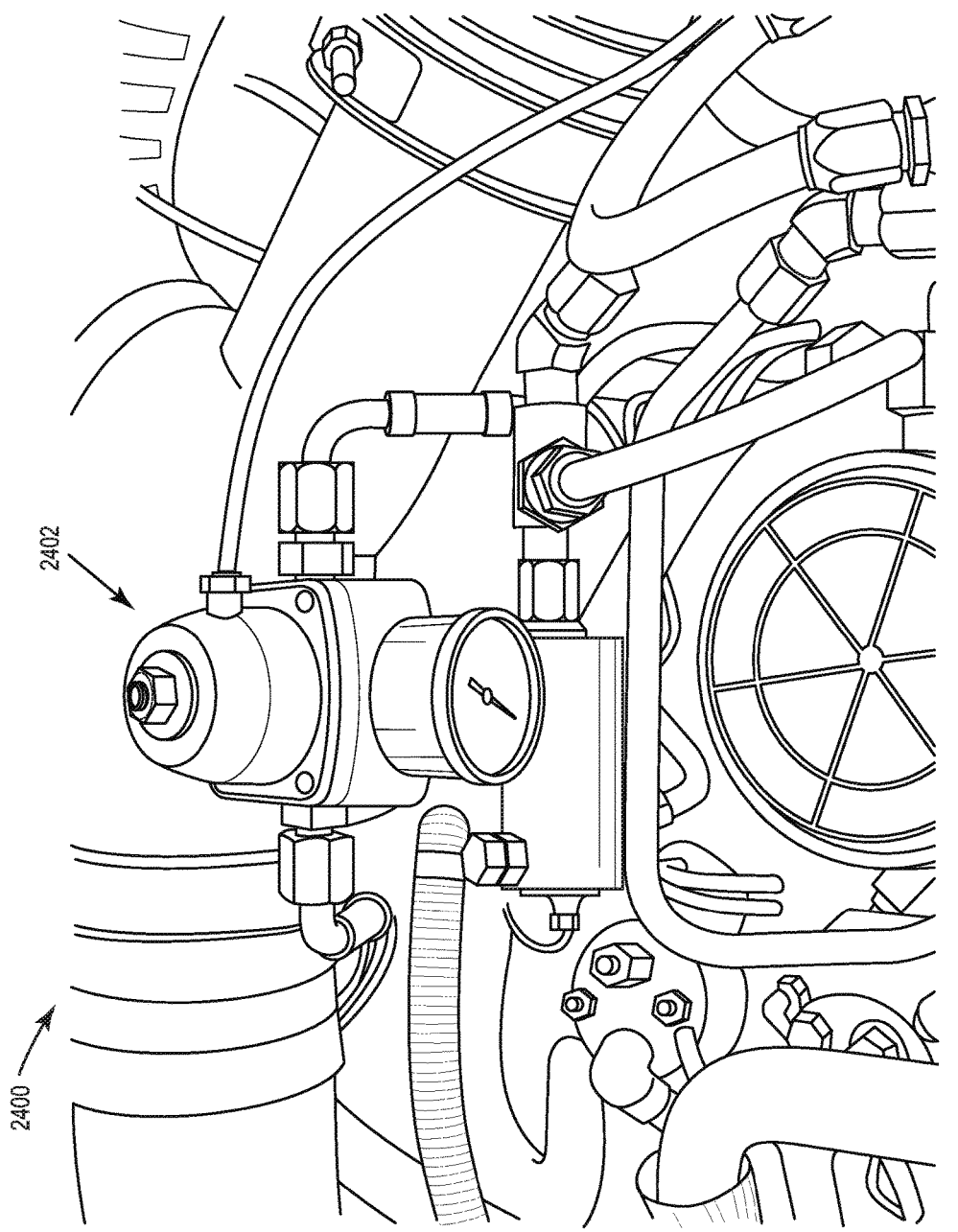
FIG. 26 is a non-annotated, view of pressure regulator, bypass steering valve and bypass return manifold.
Figure 27:
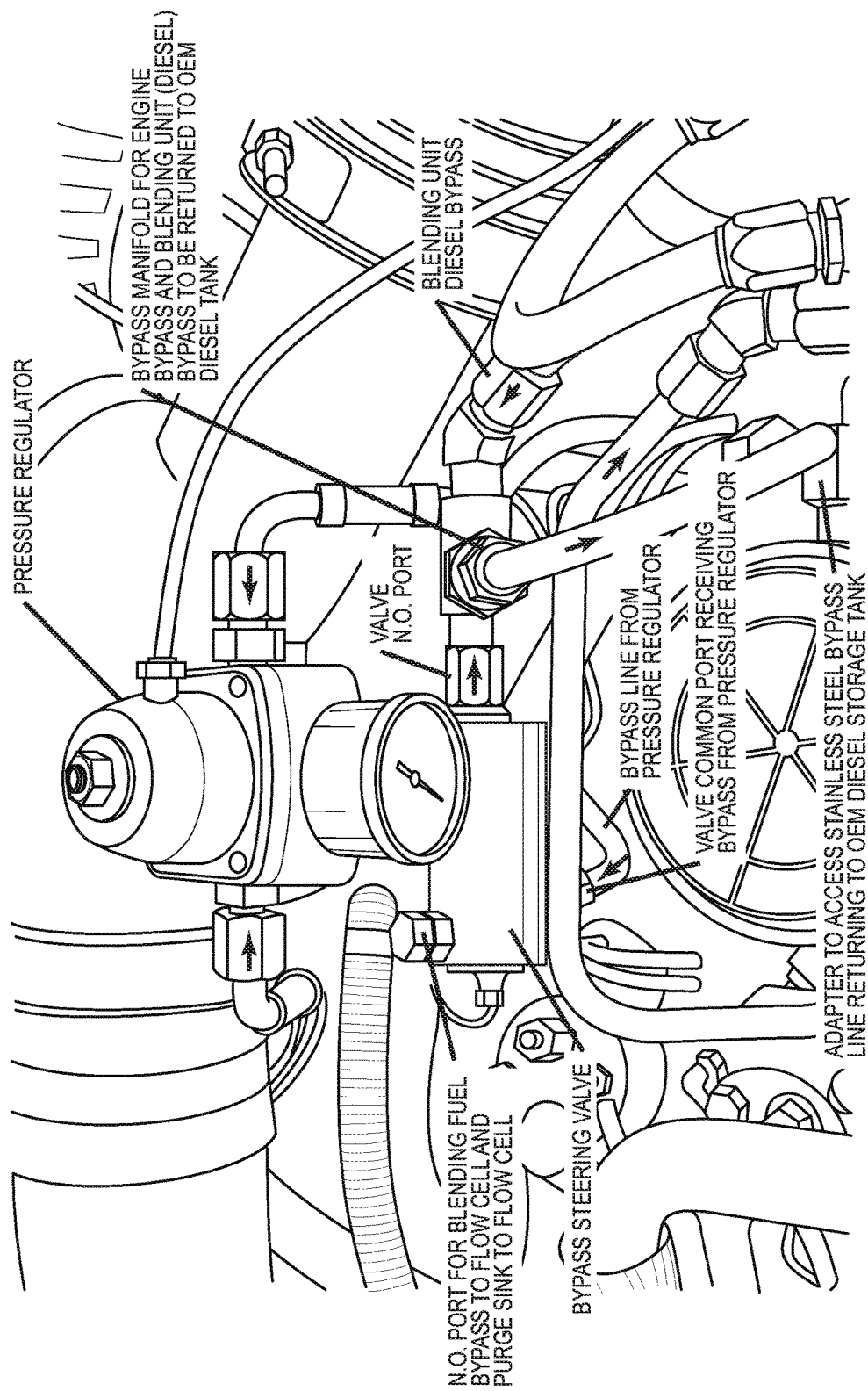
FIG. 27 is an annotated close-up view of pressure regulator and bypass steering valve. Red x(s) denote interconnection ports to blending apparatus.

Referring back to FIGS. 24 and 25, and with a closer view of elements available via FIGS. 26 and 27, the bypass from both left-hand and right-hand injector rails both feed a diaphragm-style pressure regulator 2402, both combined by integral manifold within the pressure regulator. At the regulator's set pressure (65 PSI in the prototype), regulator flow-through occurs, with the regulator's composite bypass output routed to the common port on the bypass steering valve.

If de-energized, the bypass steering valve's normally-open (N.O.) port is selected, with bypassed fuel routed back to the OEM diesel storage tank via manifold (for blending system access to OEM bypass), and ultimately through the OEM fuel bypass return line specific for that purpose.

Alternately, if energized, the bypass steering valve's normally-closed (N.C.) port is selected, with bypassed fuel as outputted by the pressure regulator now routed back to the flow cell.

Combining everything thus far, the fuel selection valve together with the bypass steering valve permits three distinct modes of operation.

| Case | Fuel Selection | Bypass Steering | Function Performed |
|---|---|---|---|
| 1 | De-energized | De-energized | Divorced operation. Engine runs from OEM fossil diesel tank and returns bypassed fuel to OEM fossil diesel tank. |
| 2 | Energized | Energized | Blended fuel operation. Engine runs from flow cell blended fuel source and returns bypassed fuel to flow cell. |
| 3 | De-energized | Energized | Purging. Fuel pump sources fuel from OEM fossil diesel tank, passes diesel through injector rails thus scavenging |

Case 1 is exemplified by the present prototype's status. Both valves are presently installed yet electrically disconnected thus defaulting to Case 1, and the vehicle remains fully operable, functioning normally on diesel.

Case 2 represents blended operation, with the flow cell serving as fuel reservoir, providing both fuel source and bypass return. Secondarily, a minimum level of operational fuel is maintained by the flow cell control electronics, with fossil and renewable fuel types added in desired ratio to replenish the reserve as required. However, a sufficient ullage reserve is also maintained to serve as a sink for purged fuel in Case 3.

Case 3 represents receipt of purged fuel, with fossil fuel selected and forced under pressure through the injector rails (and pump itself in the process), scavenging blended fuel (if any), and returning this mixture to the flow cell for receipt. Upon resumed operation of Case 2, this purged fuel is com busted until ullage is again achieved, then a normal reserve level of the desired blended ratio is reestablished and maintained.

Esterification may be required to cap the freed fatty acid moiety as separated from the glycerol moiety that binds the three fatty acid chains per molecule that constitutes vegetable oils and animal fats. It's analogous to a comb with three teeth, breaking off and tossing the bridge, and then capping the three freed teeth's rough edges after separation. With the glycerol removed, the three resulting capped molecules are smaller, less viscous, and compare in combustion energy output per volume with diesel. However, the alkyl ester (methyl esters predominately in the US, ethyl esters predominately in the EU, with propyl esters also used) degrade in the presence of both heat and oxygen over time resulting in the formation formic acid, aldehydes, peroxides and other compounds. Formic acid and other short chain organic acids are known to destroy 0-rings, seals and other engine components, and their occurrence in renewable fuels is a widely known negative factor when considering the use of or conversion to biodiesel.

This degradation is commonly referred to in the industry as thermal oxidation. Autooxidation also occurs in fatty oils, more specifically the formation of peroxides; however the latter is a much slower process and not of primary concern. Referring to FIGS. 7 and 8, the prototype presently addresses thermal oxidation by limiting otherwise necessary heating within the renewable fuel storage tank. Specifically, a heat exchanger is included to eliminate renewable fuel clouding or congealment at low temperatures (must-have), and was originally unregulated, having engine coolant allowed to freely circulate within the heat exchanger. Upon gained knowledge, the prototype was expanded to include a thermostatic temperature sensor and valve. If and only if the renewable fuel temperature falls to a point near clouding, presently a modest 50F setpoint to provide margin, with the worst case fuel clouding being approximately 35F, the valve opens and engine coolant is only then allowed to circulate through the heat exchanger. If the temperature of the fuel exceeds the 50 F set-point, the valve closes and heating ceases.

Regarding the flow cell, it is also heated, and likewise uses engine coolant. A control valve and thermostatic control is added. While it could be thermostatically reduced in operational temperature, the blended fuel is nevertheless circulating through hot engine components and returning to the flow cell, thus assuring exposure to heat elsewhere. However, it is important to note that the mitigating limitations here are oxygen and time. Specifically, the surface area exposed to atmospheric oxygen within the flow cell is limited due to its relatively small diameter (and elongated vertical height to achieve desired volume); and also time is limited, as the fuel is destined for immediate or near-immediate consumption. Consequently, the art of thermostatic control is important, has been incorporated into the prototype, and is being documented here.

Further, as a first aspect, the present disclosure provides a fuel control system for controlling the use of a primary fuel and an alternate fuel in an internal combustion engine without cross-contamination of fuel types occurring from bypassed fuel. The present disclosure is further capable of the tabulation and reporting of primary fuel and alternate fuel consumed by both volume and ratio, wherein the measurement occurs at the primary and alternate fuel reservoirs.

Further, in one embodiment, the present disclosure comprises a first fuel source structured to provide a primary fuel to a pump, a device for measurement of fuel volume and/or rate of consumption within the first fuel source, a pump, a valve or other mechanism controlling the flow of said pump, a second fuel source structured to provide an alternate fuel to a pump, a device for measurement of fuel volume and/or rate of consumption within the second fuel source, a pump, a valve or other mechanism controlling the flow of said pump, and a flow cell receiving both primary and alternate fuels.

The flow cell provides a limited reservoir of fuel for engine consumption, and further serves as both sourcing point of the selected or blended fuel to the engine fuel system and also for the acceptance and receipt of engine fuel system bypass, if and as required.

The embodiment also comprises the indication of the volume of fuel contained within the flow cell and/or rate of consumption of fuel contained within the flow cell.

The embodiment also comprises an electronic controller that by internal algorithm or as requested by external communications effects primary fuel and alternate fuel selection or blending by the control of primary fuel and secondary fuel control valves.

The electronic controller further inputs the volume contained within the flow cell and/or rate of consumption to maintain a sufficient reservoir of the selected or blended fuel for engine consumption.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store financial incentives, such as governmental credits, subsidies and/or restrictions of use, applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred from the fuel sources for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

The embodiment may also include check valves or other methods to prevent reverse flow from the flow cell back into the primary fuel source and the alternate fuel source and thereby maintain the purity and differentiation of individual fuel types.

The flow cell may also include a drain port, manually or automatically controlled.

The flow cell may also include a water contamination sensor.

The flow cell may also include passive and/or active mixing devices.

The flow cell may also include one or more heating devices.

The flow cell may also include passive and active methods of temperature control, including but not limited to thermal insulation, thermostatic or temperature transducers, and control devices and methods as used to regulate said heating devices.

As a second aspect, the present disclosure provides a fuel control system for controlling the use of a primary fuel and an alternate fuel in an internal combustion engine without cross-contamination of fuel types occurring from bypassed fuel. The present disclosure is further capable of the tabulation and reporting of primary fuel and alternate fuel consumed by both volume and ratio, wherein the measurement occurs at a flow cell.

In this embodiment, the present disclosure comprises a first fuel source structured to provide a primary fuel to a pump, a pump, a valve or other mechanism controlling the flow of said pump, a second fuel source structured to provide a alternate fuel to a pump, a pump, a valve or other mechanism controlling the flow of said pump, and a flow cell receiving both primary and alternate fuels.

The flow cell provides a limited reservoir of fuel for engine consumption, and further serves as both sourcing point of the selected or blended fuel to the engine fuel system and also for the acceptance and receipt of engine fuel system bypass, if and as required.

The embodiment also comprises the indication of the volume of fuel contained within the flow cell, and/or rate of consumption of fuel contained within the flow cell.

The embodiment also comprises an electronic controller that by internal algorithm or as requested by external communications effects primary fuel and alternate fuel selection or blending by the control of primary fuel and secondary fuel control valves. The electronic controller may further input the volume contained within the flow cell or rate of consumption to maintain a sufficient reservoir of the selected or blended fuel for engine consumption as demanded by the engine.

The electronic controller may further input by communications the alternate fuel MN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store governmental credits, subsidies and/or restrictions of use applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred to the flow cell for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

The embodiment may also include check valves or other methods to prevent reverse flow from the flow cell back into the primary fuel source and the alternate fuel source and thereby maintain the purity and differentiation of individual fuel types.

The flow cell may also include a drain port, manually or automatically controlled.

The flow cell may also include a water contamination sensor.

The flow cell may also include passive and/or active mixing devices.

The flow cell may also include one or more heating devices.

The flow cell may also include passive and active methods of temperature control, including but not limited to thermal insulation, thermostatic or temperature transducers, and control devices and methods as used to regulate said heating devices.

As a third aspect, the present disclosure provides a fuel control system for controlling the use of a primary fuel and an alternate fuel in an internal combustion engine without cross-contamination of fuel types. The present disclosure is further capable of the tabulation and reporting of primary fuel and alternate fuel consumed by both volume and ratio, wherein the measurement occurs within metering devices.

In this embodiment, the present disclosure comprises a first fuel source structured to provide a primary fuel to a pump, a pump, a valve or other mechanism controlling the flow of said pump, a metering device to measure primary fuel quantity, a second fuel source structured to provide a alternate fuel to a pump, a pump, a valve or other mechanism controlling the flow of said pump, a metering device to measure alternate fuel quantity, and a flow cell receiving both primary and alternate fuels.

The flow cell provides a limited reservoir of fuel for engine consumption, and further serves as both sourcing point of the selected or blended fuel to the engine fuel system and also for the acceptance and receipt of engine fuel system bypass, if and as required.

The embodiment also comprises the indication of the volume of fuel contained within the flow cell, and/or rate of consumption of fuel contained within the flow cell.

The embodiment also comprises an electronic controller that by internal algorithm or as requested by external communications effects primary fuel and alternate fuel selection or blending by the control of primary fuel and secondary fuel control valves. The electronic controller may further input the volume contained within the flow cell or rate of consumption to maintain a sufficient reservoir of the selected or blended fuel for engine consumption as demanded by the engine.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store governmental credits, subsidies and/or restrictions of use applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred to the flow cell by separate metering for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

The embodiment may also include check valves or other methods to prevent reverse flow from the flow cell back into the primary fuel source and the alternate fuel source and thereby maintain the purity and differentiation of individual fuel types.

The flow cell may also include a drain port, manually or automatically controlled.

The flow cell may also include a water contamination sensor.

The flow cell may also include passive and/or active mixing devices.

The flow cell may also include one or more heating devices.

The flow cell may also include passive and active methods of temperature control, including but not limited to thermal insulation, thermostatic or temperature transducers, and control devices and methods as used to regulate said heating devices.

As a fourth aspect, the present disclosure provides a fuel control system for controlling the use of a primary fuel and an alternate fuel in an internal combustion engine capable of operating on primary and alternate fuels without cross-contamination of fuel types. The present disclosure is further capable of the tabulation and reporting of primary fuel and alternate fuel consumed by both volume and ratio, wherein the volume measurement may occur at the primary and alternate fuel reservoirs, and/or by separate metering devices, and wherein the ratio measurement may occur at the primary and alternate fuel reservoirs, by metering devices, and/or at the engine.

In this embodiment, the present disclosure comprises a first fuel source structured to provide a primary fuel to a pump, a pump, a metering device to measure primary fuel quantity, a second fuel source structured to provide a alternate fuel to a pump, a pump, a metering device to measure alternate fuel quantity.

The embodiment may also comprise data received by an electronic controller from the engine to determine blend ratio.

The embodiment may also comprise data transmitted by an electronic controller to the engine to instruct primary fuel and alternate fuel selection and/or blend ratio. The electronic controller may do so by internal algorithm or as requested by external communications.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store governmental credits, subsidies and/or restrictions of use applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred to the flow cell for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

As a fifth aspect, the present disclosure provides a fuel control system for controlling the use of a primary fuel and an alternate fuel in an internal combustion engine capable of operating on primary and alternate fuels. The present disclosure is further capable of the tabulation and reporting of primary fuel and alternate fuel consumed by both volume and ratio, wherein the volume measurement may occur at the primary and alternate fuel reservoirs, at flow cells, and/or by metering devices, and wherein the ratio measurement may occur at the primary and alternate fuel reservoirs, at flow cells, by metering devices, and/or at the engine.

In this embodiment, the present disclosure comprises a first fuel source structured to provide a primary fuel to a pump, a pump, a valve or other mechanism controlling the flow of said pump, a metering device to measure primary fuel quantity, a flow cell receiving primary fuel, a second fuel source structured to provide a alternate fuel to a pump, a pump, a valve or other mechanism controlling the flow of said pump, a metering device to measure alternate fuel quantity, and a flow cell receiving alternate fuel.

The flow cells provide separate limited reservoirs of primary fuel and alternate fuel for engine consumption, and further serve for the acceptance and receipt of respective primary and alternate engine fuel system bypass, if and as required.

The embodiment also comprises the indication of the volume of fuel contained within the flow cells, and/or rate of consumption of fuel contained within the flow cells.

The embodiment also comprises an electronic controller. The electronic controller may further input the volume contained within the flow cells or rate of consumption to maintain a sufficient reservoir of primary and alternate fuels for engine consumption as demanded by the engine.

The embodiment may also comprise data received by an electronic controller from the engine to determine blend ratio.

The embodiment may also comprise data transmitted by an electronic controller to the engine to instruct primary fuel and alternate fuel selection and/or blend ratio. The electronic controller may do so by internal algorithm or as requested by external communications.

The electronic controller may further input by communications the alternate fuel RIN number, or equivalent or similar identification and/or tracking methodology, if so assigned to the alternate fuel, and/or vendor or source.

The electronic controller may further input by communications the primary fuel and/or alternate fuel type or chemistry, or mixture of types or chemistries including composite mixtures of alternate fuel types and/or mixtures of alternate and primary fuels.

The electronic controller may further input by communications primary fuel and alternate fuel cost.

The electronic controller may further input by communications and/or store governmental credits, subsidies and/or restrictions of use applicable for jurisdictions of operation.

The electronic controller may further input by communications user preferences, including but not limited to desired modes of operations, restrictions of modes of operation, including but not limited to optimized utilization of alternate fuel, optimized economy, optimized use of credits and/or subsidies, optimized engine horsepower, or combinations or tradeoffs thereof.

The electronic controller may further input by communications Global Positioning Satellite (hereinafter GPS) data or other geographical location or jurisdiction indicative data by continuous or intermittent stream.

The electronic controller further ascertains the volume of primary fuel and secondary fuel transferred to the flow cells by separate metering for a variety of control, metric, financial and regulatory purposes, including but not limited to a feedback mechanism for effecting the desired blend ratio, the tabulation of primary fuel and alternate fuel metered, the ratio of blend at which it occurred, or enforcement of neat operation if prescribed by RIN number or equivalent, other regulatory use restrictions, or user preference.

The electronic controller may further communicate the tabulation of primary and alternate fuel metered, the ratio of blend at which it occurred, or verification of neat mode compliance.

The flow cell may also include a drain port, manually or automatically controlled.

The flow cell may also include a water contamination sensor.

The flow cell may also include passive and/or active mixing devices.

The flow cell may also include one or more heating devices.

The flow cell may also include passive and active methods of temperature control, including but not limited to thermal insulation, thermostatic or temperature transducers, and control devices and methods as used to regulate said heating devices.

Many modifications and other embodiments of the disclosures set forth herein will come to mind to one skilled in the art to which this disclosure pertains having the benefit of the teachings presented in the foregoing descriptions and associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A fuel control system, comprising:
an electronic controller configured to:
concurrently (i) control a source valve in fluid communication with a flow cell, a primary fuel tank, and an internal combustion engine to source supply fuel from the primary fuel tank to the engine, the source valve configured to selectively source fluid to the engine from one of (1) the primary fuel tank and (2) the flow cell, and (ii) control a bypass valve in fluid communication with the flow cell, the primary fuel tank, and the engine to direct unconsumed excess fuel from the engine to the primary fuel tank, the bypass valve configured to selectively direct fluid from the engine to one of (1) the primary fuel tank and (2) the flow cell; and
concurrently (i) control the source valve to source supply fuel from the flow cell to the engine, and (ii) control the bypass valve to direct unconsumed excess fuel from the engine to the flow cell.

2. The fuel control system of claim 1, wherein the electronic controller is further configured to concurrently (i) control the source valve to source supply fuel from the primary fuel tank to the engine and (ii) control the bypass valve to direct unconsumed excess fuel from the engine to the flow cell.

3. The fuel control system of claim 1, wherein:
the electronic controller is further configured to control delivery of a primary fuel and an alternate fuel to a flow cell, and
the primary fuel comprises diesel and the alternate fuel comprises biodiesel.

4. The fuel control system of claim 1, wherein the electronic controller is configured to automatically replenish fuel volume of the flow cell at a detected volume threshold with delivery of at least one of a primary fuel or an alternate fuel.

5. The fuel control system of claim 1, wherein the electronic controller is configured to, with the engine running, operate the bypass valve for unconsumed excess fuel from the engine to transition from being directed to the primary fuel tank to being directed to the flow cell.

6. The fuel control system of claim 1, wherein upon detection of engine duress or system failure the electronic controller is configured to operate the source valve to transition from sourcing supply fuel from the flow cell to sourcing supply fuel from the primary fuel tank.

7. The fuel control system of claim 6, wherein detection of engine duress comprises detection of vehicle deceleration concurrent with a wide open throttle of a vehicle.

8. The fuel control system of claim 1, wherein the electronic controller is configured to operate in a plurality of modes, the plurality of modes comprising:
a decoupled mode to control the source valve to source supply fuel from the primary fuel tank to the engine and control the bypass valve to direct unconsumed excess fuel from the engine to the primary fuel tank;
an active mode to control the source valve to source supply fuel from the flow cell to the engine and control the bypass valve to direct unconsumed excess fuel from the engine to the flow cell; and
a purging mode to control the source valve to source supply fuel from the primary fuel tank to the engine and control the bypass valve to direct unconsumed excess fuel from the engine to the flow cell.

9. The fuel control system of claim 8, wherein the electronic controller is configured to switch operation from the active mode upon recurrence of engine duress detection within a preconfigured time interval.

10. The fuel control system of claim 8, wherein the electronic controller is configured to switch operation from the active mode to the purging mode to the decoupled mode.

11. The fuel control system of claim 8, wherein the electronic controller is configured to operate in the purging mode for a predetermined time period as measured by a purge duration timer.

12. The fuel control system of claim 8, wherein upon detection of shutoff, the electronic controller is configured to operate in the purging mode for a predetermined time period as measured by a purge delay timer.

13. The fuel control system of claim 12, wherein upon initialization of the purge delay timer, the electronic controller is configured to monitor for engine restart and expiration of the predetermined time period.

14. The fuel control system of claim 13, wherein if engine restart is detected, the electronic controller is configured to return to a previous operating mode.

15. The fuel control system of claim 12, wherein upon initialization of the purge delay timer, the electronic controller is configured to monitor for engine restart, expiration of the predetermined time period, and a minimum temperature threshold corresponding to a fuel injector rail temperature.

16. The fuel control system of claim 15, wherein if the electronic controller detects expiration of the predetermined time period of the purge delay timer or crossing the minimum temperature threshold corresponding to the fuel injector rail temperature, the electronic controller is configured to restart an injector rail fuel pump to reinitiate circulation within fuel injector rails.

17. The fuel control system of claim 16, wherein upon restart of the injector rail fuel pump, a pressurization timer is initialized to reestablish full pressure conditions of the inject rail fuel pump, and upon expiration of the pressurization timer, the electronic controller is configured to operate in the purging mode.

18. The fuel control system of claim 1, further comprising a multi port fuel injector rail comprising an inlet port configured to receive fuel, one or more coupling ports configured to supply fuel to fuel injectors, and an outlet port in fluid communication with a bypass pressure regulator.

19. The fuel control system of claim 1, further comprising a multi port fuel injector rail comprising an inlet port configured to receive fuel, one or more coupling ports configured to supply fuel to fuel injectors, and an outlet port in fluid communication with a second fuel injection rail.

\* \* \* \* \*